US009538220B2

(12) United States Patent
ElArabawy et al.

(10) Patent No.: US 9,538,220 B2
(45) Date of Patent: Jan. 3, 2017

(54) VIDEO STREAMING QUALITY OF EXPERIENCE DEGRADATION CONTROL USING A VIDEO QUALITY METRIC

(71) Applicant: Cygnus Broadband, Inc., San Diego, CA (US)

(72) Inventors: Ahmed ElArabawy, San Diego, CA (US); David Gell, San Diego, CA (US); Kenneth L. Stanwood, Vista, CA (US)

(73) Assignee: WI-LAN Labs, Inc., San Diego, CA (US)

( * ) Notice: Subject to any disclaimer, the term of this patent is extended or adjusted under 35 U.S.C. 154(b) by 222 days.

(21) Appl. No.: 13/931,245

(22) Filed: Jun. 28, 2013

(65) Prior Publication Data
US 2013/0286879 A1 Oct. 31, 2013

Related U.S. Application Data

(63) Continuation-in-part of application No. 13/607,559, filed on Sep. 7, 2012, which is a continuation-in-part of
(Continued)

(51) Int. Cl.
*H04N 21/262* (2011.01)
*H04W 28/02* (2009.01)
(Continued)

(52) U.S. Cl.
CPC .... *H04N 21/26208* (2013.01); *H04L 47/2416* (2013.01); *H04L 47/30* (2013.01);
(Continued)

(58) Field of Classification Search
CPC .............. H04N 21/26208; H04N 7/106; H04N 21/4781; H04L 43/0852; H04L 43/0829; H04L 41/5003; H04L 65/80
(Continued)

(56) References Cited

U.S. PATENT DOCUMENTS

| 6,603,738 B1 | 8/2003 | Kari et al. |
| 7,974,233 B2 | 7/2011 | Banerjee |

(Continued)

FOREIGN PATENT DOCUMENTS

| EP | 2448174 A1 | 5/2012 |
| EP | 2480001 A2 | 7/2012 |

(Continued)

OTHER PUBLICATIONS

Guraya et al. "A Non-Reference Perceptual Quality Metric Based on Visual Attention Model for Videos." 10th International Conference on Information Sciences Signal Processing and their Applications (ISSPA), 2010, in 4 pages.

(Continued)

*Primary Examiner* — Jamal Javaid
(74) *Attorney, Agent, or Firm* — Procopio, Cory, Hargreaves & Savitch LLP

(57) ABSTRACT

Degradation control management is provided for a plurality of video streams associated with a plurality of user terminals in a communication network, based at least in part on an overall video quality metric, by determining a video quality metric for each video stream based on at least a set of video quality metric input parameters, and calculating an overall video quality metric based on the determined video quality metrics for the video streams, determining, with an objective function, at least one objective parameter based on at least the overall video quality metric, calculating a scheduling parameter for each video stream using a degradation control algorithm based on at least the determined video quality metric for the respective video stream and on the at least one objective parameter, and scheduling network resources for each video stream based on at least the scheduling parameter for the video stream.

30 Claims, 20 Drawing Sheets

Related U.S. Application Data application No. 13/549,106, filed on Jul. 13, 2012, which is a continuation-in-part of application No. 13/396,503, filed on Feb. 14, 2012, now Pat. No. 8,665,724, which is a continuation-in-part of application No. 13/236,308, filed on Sep. 19, 2011, which is a continuation-in-part of application No. 13/166,660, filed on Jun. 22, 2011, which is a continuation-in-part of application No. 13/155,102, filed on Jun. 7, 2011, now Pat. No. 8,627,396, said application No. 13/607,559 is a continuation-in-part of application No. PCT/US2012/043888, filed on Jun. 22, 2012, said application No. 13/166,660 is a continuation-in-part of application No. 12/813,856, filed on Jun. 11, 2010, now Pat. No. 8,068,440, application No. 13/931,245, which is a continuation-in-part of application No. 13/761,645, filed on Feb. 7, 2013, and a continuation-in-part of application No. 13/789,462, filed on Mar. 7, 2013, and a continuation-in-part of application No. 13/744,101, filed on Jan. 17, 2013, which is a continuation-in-part of application No. 13/653,239, filed on Oct. 16, 2012.

(60) Provisional application No. 61/421,510, filed on Dec. 9, 2010, provisional application No. 61/186,707, filed on Jun. 12, 2009, provisional application No. 61/187,113, filed on Jun. 15, 2009, provisional application No. 61/187,118, filed on Jun. 15, 2009, provisional application No. 61/625,459, filed on Apr. 17, 2012, provisional application No. 61/640,984, filed on May 1, 2012, provisional application No. 61/658,854, filed on Jun. 12, 2012, provisional application No. 61/658,774, filed on Jun. 12, 2012, provisional application No. 61/579,324, filed on Dec. 22, 2011.

(51) Int. Cl.

| | | |
|---|---|---|
| *H04L 12/853* | (2013.01) | |
| *H04L 12/835* | (2013.01) | |
| *H04L 29/06* | (2006.01) | |
| *H04W 72/12* | (2009.01) | |
| *H04L 12/801* | (2013.01) | |

(52) U.S. Cl.
CPC .......... *H04L 65/1083* (2013.01); *H04L 65/80* (2013.01); *H04W 28/0231* (2013.01); *H04W 28/0289* (2013.01); *H04L 47/33* (2013.01); *H04W 72/1242* (2013.01)

(58) Field of Classification Search
USPC .................. 370/252, 235, 230, 241; 709/241
See application file for complete search history.

(56) References Cited

U.S. PATENT DOCUMENTS

| 8,472,520 | B2 | 6/2013 | Banerjee |
|---|---|---|---|
| 2002/0038216 | A1 | 3/2002 | Suzuki |
| 2003/0011679 | A1 | 1/2003 | Jung |
| 2003/0012137 | A1 | 1/2003 | Abdelilah et al. |
| 2004/0208120 | A1 | 10/2004 | Shenoi |
| 2006/0136597 | A1 | 6/2006 | Shabtai |
| 2006/0153216 | A1* | 7/2006 | Hosein et al. ................ 370/412 |
| 2006/0165035 | A1 | 7/2006 | Chandra et al. |
| 2007/0091801 | A1 | 4/2007 | Shahidi et al. |
| 2008/0098446 | A1 | 4/2008 | Seckin et al. |
| 2008/0293494 | A1 | 11/2008 | Adiraju |
| 2009/0187958 | A1 | 7/2009 | Reibman |
| 2009/0219937 | A1 | 9/2009 | Liu et al. |
| 2009/0219990 | A1 | 9/2009 | Han |
| 2009/0273678 | A1 | 11/2009 | Huynh-Thu |
| 2010/0017836 | A1 | 1/2010 | Trojer |
| 2010/0043044 | A1 | 2/2010 | Li et al. |
| 2010/0066805 | A1 | 3/2010 | Tucker et al. |
| 2010/0333156 | A1 | 12/2010 | Abdolsalehi |
| 2011/0167445 | A1 | 7/2011 | Reams et al. |
| 2011/0235630 | A1 | 9/2011 | Hui et al. |
| 2011/0314394 | A1 | 12/2011 | Kilmer |
| 2012/0005716 | A1 | 1/2012 | Milne et al. |
| 2012/0013748 | A1 | 1/2012 | Stanwood et al. |
| 2012/0124629 | A1 | 5/2012 | Musick |
| 2012/0207143 | A1 | 8/2012 | Banerjee et al. |
| 2012/0281536 | A1 | 11/2012 | Gell et al. |
| 2013/0159498 | A1* | 6/2013 | Funge et al. ................... 709/224 |

FOREIGN PATENT DOCUMENTS

| EP | 2563030 | A1 | 2/2013 |
|---|---|---|---|
| FR | 2928231 | A1 | 9/2009 |
| WO | 2007/073362 | A1 | 6/2007 |
| WO | 2009/112720 | A1 | 9/2009 |

OTHER PUBLICATIONS

International Telecommunication Union, Telecommunication Standardization Sector of ITU. "Objective perceptual multimedia video quality measurement in the presence of a full reference." Series J: Cable Networks and Transmission of Television, Sound Programme and other Multimedia Signals, Measurement of the quality of service. J.247, Aug. 2008, in 108 pages.

Winkler et al. "Perceptual Video Quality and Blockiness Metrics for Multimedia Streaming Applications." Proceedings of the International Symposium on Wireless Personal Multimedia Communications, 2001, in 4 pages.

International Search Report and Written Opinion for related PCT/US2014/036230, mailed on Oct. 27, 2014, in 19 pages.

International Search Report and Written Opinion for related PCT/US2014/036221, mailed on Dec. 17, 2014, in 18 pages.

Falik et al. "Transmission algorithm for video streaming over cellular networks." The Journal of Mobile Communication, Computation and Information. 16(5):1459-1475 (Sep. 29, 2009).

International Search Report and Written Opinion for related PCT/US2014/036217, mailed on Jul. 29, 2014, in 12 pages.

Invitation to Pay Additional Fees, and, Where Applicable, Protest Fee, mailed on Aug. 6, 2014 in related PCT/US2014/036221 (9 pages).

Invitation to Pay Additional Fees, and, Where Applicable, Protest Fee, mailed on Jul. 29, 2014 in related PCT/US2014/036230 (7 pages).

Johanson et al. "Audiovisual Network Service Optimization by Quality of Experience Estimation." Proceedings of the NEM Summit 2012, Istanbul, Oct. 16-18, 2012.

Serral-Garcia et al. "An Overview of Quality of Experience Measurement Challenges for Video Applications in IP Networks." Field Programmable Logic and Application. 6074:252-263 (Jun. 1, 2010).

* cited by examiner

VIDEO STREAMING QUALITY OF EXPERIENCE DEGRADATION CONTROL USING A VIDEO QUALITY METRIC

CROSS-REFERENCE TO RELATED APPLICATIONS

[1] This application is a continuation-in-part of U.S. patent application Ser. No. 13/607,559 (C00244US5), filed on Sep. 7, 2012, which is a continuation-in-part of U.S. patent application Ser. No. 13/549,106 (C00244US4), filed Jul. 13, 2012, which is a continuation-in-part of U.S. patent application Ser. No. 13/396,503 (C00244US3), filed Feb. 14, 2012, which is a continuation-in-part of U.S. patent application Ser. No. 13/236,308 (C00244US2), filed Sep. 19, 2011, which is a continuation-in-part of U.S. patent application Ser. No. 13/166,660 (C00244US1), filed Jun. 22, 2011, which are hereby incorporated by reference herein. U.S. patent application Ser. No. 13/607,559 (C00244US5) is also a continuation-in-part of international patent application No. PCT/US12/43888, filed Jun. 22, 2012, which is hereby incorporated by reference herein. U.S. patent application Ser. No. 13/166,660 (C00244US1) is a continuation-in-part of U.S. patent application Ser. No. 13/155,102 (C00240US1), filed Jun. 7, 2011, which claims the benefit of U.S. provisional patent application Ser. No. 61/421,510, filed Dec. 9, 2010, all of which are hereby incorporated by reference herein. U.S. patent application Ser. No. 13/166,660 (C00244US1) is also a continuation-in-part of U.S. patent application Ser. No. 12/813,856 (C00241US1), filed Jun. 11, 2010, now U.S. Pat. No. 8,068,440, which claims the benefit of U.S. provisional patent application Ser. No. 61/186,707, filed Jun. 12, 2009, U.S. provisional patent application Ser. No. 61/187,113, filed Jun. 15, 2009, and U.S. provisional patent application Ser. No. 61/187,118, filed Jun. 15, 2009, all of which are hereby incorporated by reference herein. [2] This application is also a continuation-in-part of U.S. patent application Ser. No. 13/761,645 (C00249US1), filed Feb. 7, 2013, which claims the benefit of U.S. provisional patent application Ser. No. 61/625,459, filed Apr. 17, 2012, and U.S. provisional patent application Ser. No. 61/640,984, filed May 1, 2012, all of which are hereby incorporated by reference herein. [3] This application is also a continuation-in-part of U.S. patent application Ser. No. 13/789,462 (C00251US1), filed Mar. 7, 2013, which claims the benefit of U.S. provisional patent application Ser. No. 61/658,854, filed Jun. 12, 2012, all of which are hereby incorporated by reference herein. [4] This application is also a continuation-in-part of U.S. patent application Ser. No. 13/744,101 (C00250US2), filed Jan. 17, 2013, which is a continuation-in-part of U.S. patent application Ser. No. 13/653,239 (C00250US1), filed Oct. 16, 2012, which claims the benefit of U.S. provisional patent application Ser. No. 61/658,774, filed Jun. 12, 2012, and U.S. provisional patent application Ser. No. 61/579,324, filed Dec. 22, 2011, all of which are hereby incorporated by reference herein.

BACKGROUND

The present invention generally relates to the field of video streaming in a communication system, such as a wireless, or a wireline communication network.

In a video streaming system, such as HTTP video streaming, a tension exists between the limited network resources and the resolution and quality of the received video content that can impact the quality of experience (QoE) for the user of a terminal device, such as a mobile phone, receiving the video content via a wireless communication network.

Situations can occur in a wireless communication network in which there are insufficient radio resources to maintain multiple video streaming sessions at the desired QoE level for each of the video streaming sessions, which may result in degradation of the QoE for one or more users of the terminal nodes receiving the video streaming sessions. For example, such QoE degradation in the received video streaming session may result in freezing or skipping of the video being displayed on the terminal device resulting in lost portions of the video session not being displayed or in recurring glitches/freezes in the video display, which significantly degrades the user's QoE for the video session. In other extreme situations, a video session being watched by the user at a terminal node can be unintentionally and randomly terminated because of insufficient resources in the wireless communication network to support the video session.

SUMMARY

In an aspect, a method is provided for degradation control management of a plurality of video streams associated with a plurality of user terminals in a communication network based at least in part on an overall video quality metric, the method comprising determining a video quality metric for each of the plurality of video streams based on at least a set of video quality metric input parameters, and calculating an overall video quality metric based on the determined video quality metrics for the plurality of video streams, determining, with an objective function, at least one objective parameter based on at least the overall video quality metric, calculating a scheduling parameter for each of the plurality of video streams using a degradation control algorithm that is based on at least the determined video quality metric for the respective video stream and on the at least one objective parameter, and scheduling network resources for each of the plurality of video streams based on at least the scheduling parameter for the respective video stream.

In an aspect, an access node is provided for communicating with a plurality of user terminals in a communication network, the access node comprising a transceiver module configured to communicate with the plurality of user terminals, and a processor coupled to the transceiver and configured to determine a video quality metric for each of a plurality of video streams respectively associated with each of the plurality of user terminals, the determination of the video quality metric being based on at least a set of video quality metric input parameters, and calculating an overall video quality metric based on the determined video quality metrics for the plurality of video streams, determine, with an objective function, at least one objective parameter based on at least the overall video quality metric, calculate a scheduling parameter for each of the plurality of video streams using a degradation control algorithm that is based on at least the determined video quality metric for the respective video stream and on the at least one objective parameter, and schedule network resources for each of the plurality of video streams based on at least the scheduling parameter for the respective video stream.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Improved quality of experience (QoE) is provided for users of video streaming is provided herein. Specifically, descriptions of quality of experience (QoE) degradation control and QoE recovery for video streaming are provided, which can improve one or more user's quality of experience (QoE) for received video streams. In an aspect, a QoE degradation control state is provided when it is determined that an overall QoE parameter, such as a video quality metric, has dropped below a quality threshold, wherein scheduling parameters are used to adjust the scheduling of network resources for multiple video streams in a manner that maximizes the overall QoE parameter. In an aspect, a QoE recovery state is provided when it is determined that the overall QoE parameter, such as a video quality metric, has dropped below an unacceptable threshold, wherein load reduction actions are taken on one or more video streams in a manner that maximizes the overall QoE parameter. The aspects disclosed herein can be used in communication systems including, but not limited to, wireless communication systems and wireline communication systems.

The features disclosed herein can be applied to various communication systems, including wireline and wireless technologies. Such communication systems may be capacity-limited. For example, the features disclosed herein can be used with Cellular 2G, 3G, 4G (including Long Term Evolution (LTE), LTE Advanced, and WiMAX), cellular backhaul, Wi-Fi, Ultra Mobile Broadband (UMB), cable modem, and other point-to-point or point-to-multipoint wireline or wireless technologies. For concise exposition, various aspects are described using terminology and organization of particular technologies and standards. However, the features described herein are broadly applicable to other technologies and standards.

Figure 1:
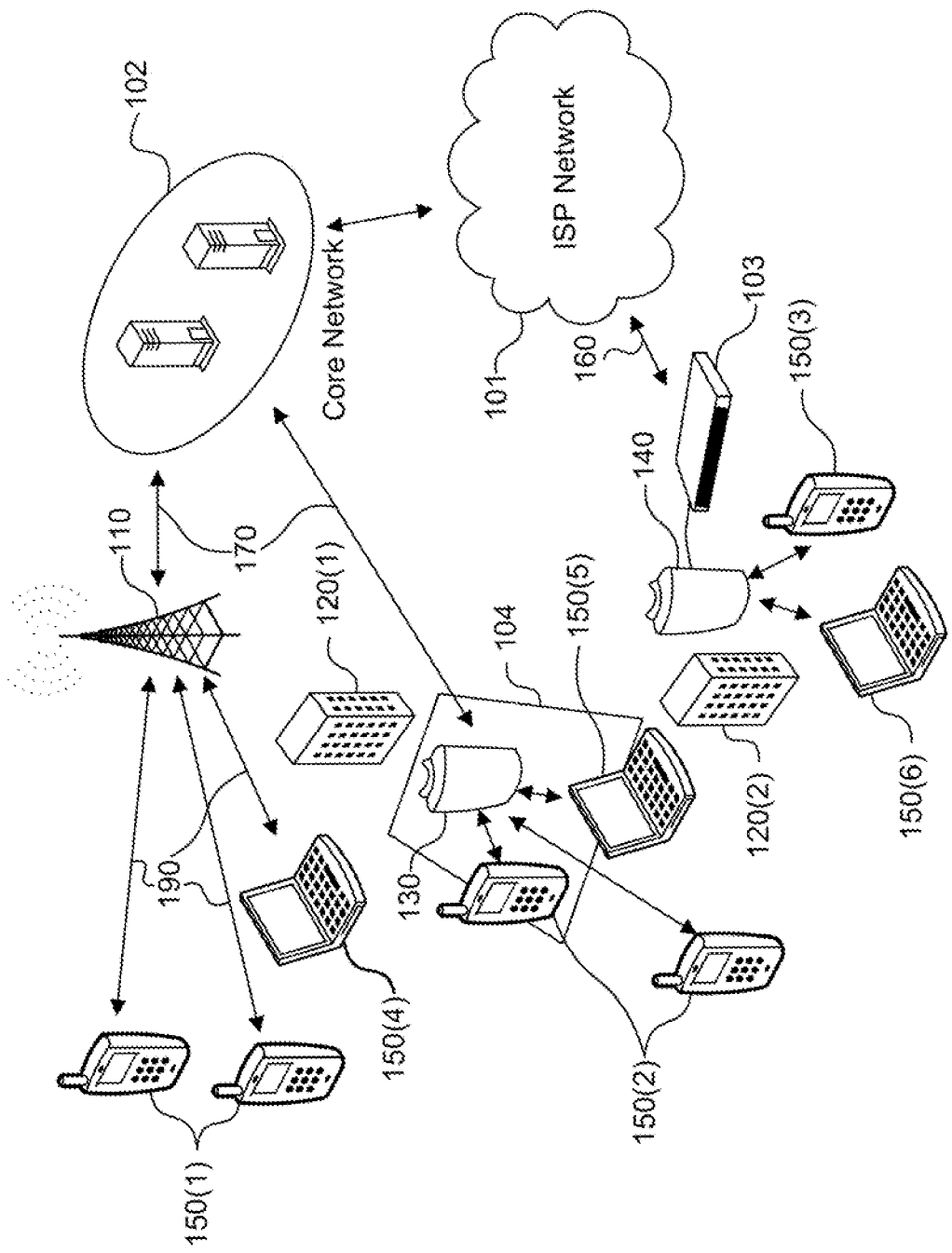
FIG. 1 is a block diagram of a communication network in which embodiments disclosed herein can be implemented in accordance with aspects of the invention.

FIG. 1 is a block diagram of a communication network in which features disclosed herein can be implemented in accordance with aspects of the invention. A macro base station 110 is connected to a core network 102 through a backhaul connection 170. In an embodiment, the backhaul connection 170 is a bidirectional link or two unidirectional links. The direction from the core network 102 to the macro base station 110 is referred to as the downstream or downlink (DL) direction. The direction from the macro base station 110 to the core network 102 is referred to as the upstream or uplink (UL) direction. Subscriber stations 150(1) and 150(4) can connect to the core network 102 through the macro base station 110. Wireless links 190 between subscriber stations 150(1) and 150(4) and the macro base station 110 are bidirectional point-to-multipoint links, in an embodiment. The direction of the wireless links 190 from the macro base station 110 to the subscriber stations 150(1) and 150(4) is referred to as the downlink or downstream direction. The direction of the wireless links 190 from the subscriber stations 150(1) and 150(4) to the macro base station 110 is referred to as the uplink or upstream direction. Subscriber stations are sometimes referred to as user equipment (UE), users, user devices, handsets, terminal nodes, or user terminals and are often mobile devices such as smart phones or tablets. The subscriber stations 150 access content over the wireless links 190 using base stations, such as the macro base station 110, as a bridge. That is to say, the base stations generally pass user application data and any user application control messages between the subscriber stations 150 and the core network 102 without the base station being a destination for the application data and application control messages or a source of the application data and application control messages. In other aspects, as mentioned above, the embodiments of systems and methods disclosed herein may also apply to wireline communication systems, such as implementation within a cable head end of a cable network.

In the network configuration illustrated in FIG. 1, an office building 120(1) causes a coverage shadow 104. A pico station 130 can provide coverage to subscriber stations 150(2) and 150(5) in the coverage shadow 104. The pico station 130 is connected to the core network 102 via a backhaul connection 170. The subscriber stations 150(2) and 150(5) may be connected to the pico station 130 via links that are similar to or the same as the wireless links 190 between subscriber stations 150(1) and 150(4) and the macro base station 110.

In office building 120(2), an enterprise femtocell 140 provides in-building coverage to subscriber stations 150(3) and 150(6). The enterprise femtocell 140 can connect to the core network 102 via an internet service provider network 101 by utilizing a broadband connection 160 provided by an enterprise gateway 103.

Figure 2:
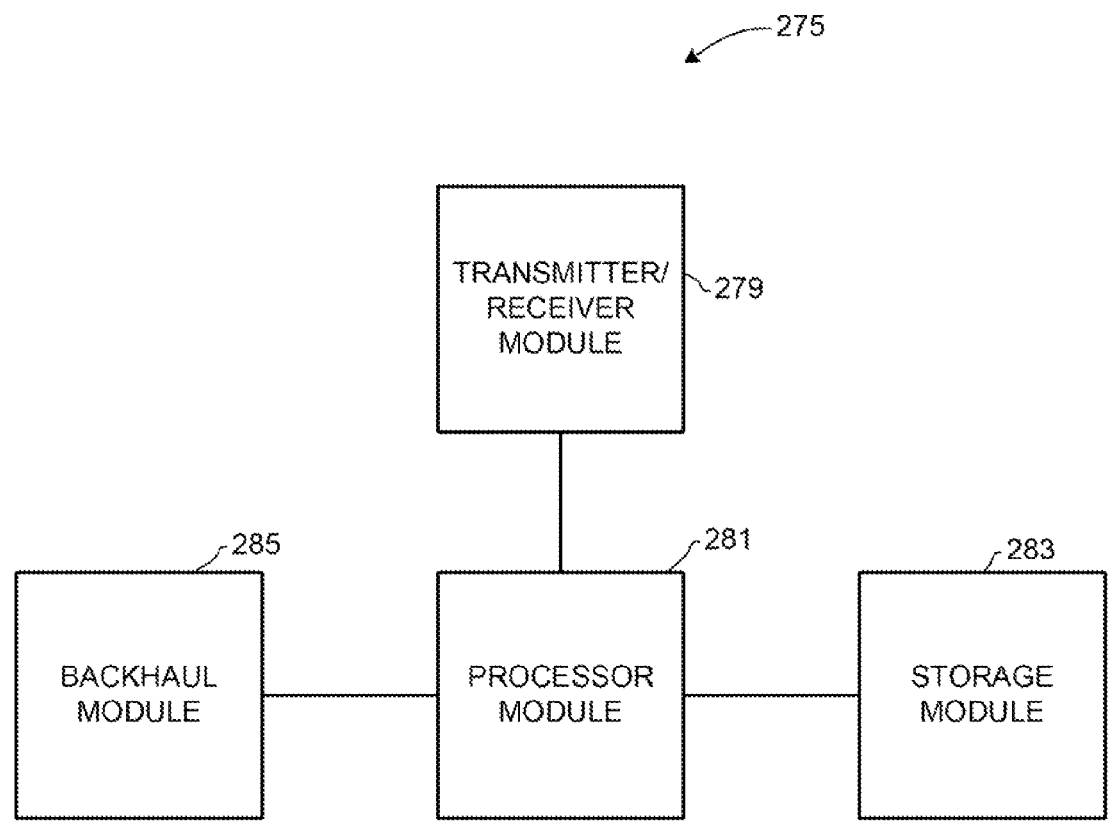
FIG. 2 is a block diagram of an access node in accordance with aspects of the invention.

FIG. 2 is a functional block diagram of an access node 275 in accordance with aspects of the invention. In various embodiments, the access node 275 may be a mobile WiMAX base station, a global system for mobile (GSM) wireless base transceiver station (BTS), a Universal Mobile Telecommunications System (UMTS) NodeB, an LTE evolved Node B (eNB or eNodeB), a cable modem head end, or other wireline or wireless access node of various form factors. For example, the macro base station 110, the pico station 130, or the enterprise femtocell 140 of FIG. 1 may be provided, for example, by the access node 275 of FIG. 2. The access node 275 includes a processor module 281. The processor module 281 is coupled to a transmitter-receiver (transceiver) module 279, a backhaul interface module 285, and a storage module 283.

The transmitter-receiver module 279 is configured to transmit and receive communications with other devices. In many aspects, the communications are transmitted and received wirelessly. In such aspects, the access node 275 generally includes one or more antennae for transmission and reception of radio signals. In some aspects, multiple transmitter-receiver modules, with multiple antennae, may be provided in an access node and may support multiple-in-multiple-out (MIMO) and/or multi-sector functionality in the access node. In other aspects, the communications are transmitted and received over physical connections such as wires or optical cables. The communications of the transmitter-receiver module 279 may be with terminal nodes.

The backhaul interface module 285 provides communication between the access node 275 and a core network. The communication may be over a backhaul connection, for example, the backhaul connection 170 of FIG. 1. Communications received via the transmitter-receiver module 279 may be transmitted, after processing, on the backhaul connection. Similarly, communication received from the backhaul connection may be transmitted by the transmitter-receiver module 279. Although the access node 275 of FIG. 2 is shown with a single backhaul interface module 285, other embodiments of the access node 275 may include multiple backhaul interface modules. Similarly, the access node 275 may include multiple transmitter-receiver modules. The multiple backhaul interface modules and transmitter-receiver modules may operate according to different protocols.

The processor module 281 can process communications being received and transmitted by the access node 275. In an aspect, processor module 281 may comprise multiple processors or a multi-core processor. The storage module 283 stores data for use by the processor module 281. The storage module 283 may also be used to store computer readable instructions for execution by the processor module 281. The computer readable instructions can be used by the access node 275 for accomplishing the various functions of the access node 275, and in one aspect can be used by the access node 275 for conducting the various functions described in the embodiments set forth herein. In an embodiment, the storage module 283 or parts of the storage module 283 may be considered a non-transitory machine readable medium. For concise explanation, the access node 275 or aspects of it are described as having certain functionality. It will be appreciated that in some aspects, this functionality is accomplished by the processor module 281 in conjunction with the storage module 283, transmitter-receiver module 279, and backhaul interface module 285. Furthermore, in addition to executing instructions, the processor module 281 may include specific purpose hardware to accomplish some functions.

Figure 3:
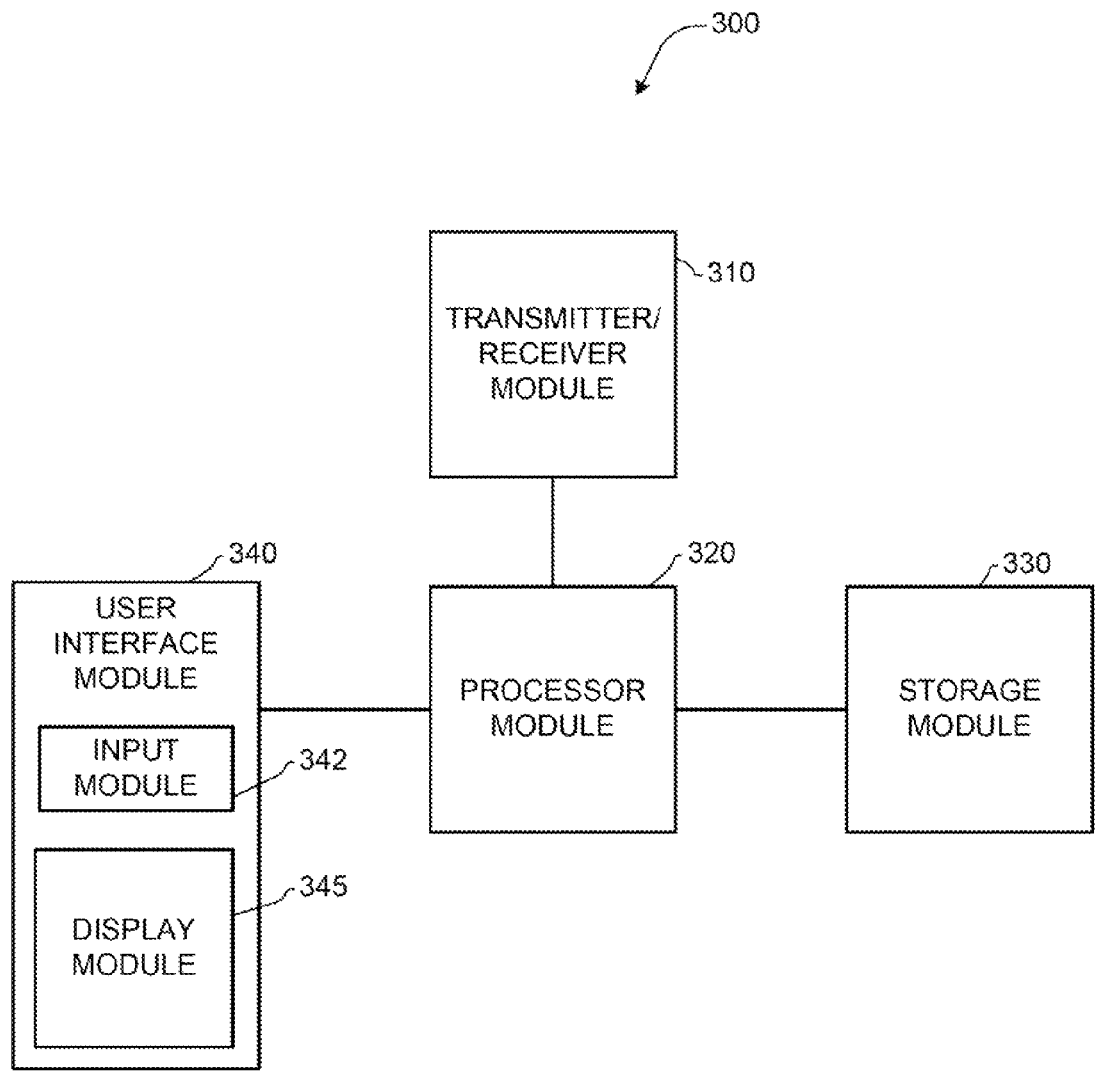
FIG. 3 is a block diagram of a terminal node in accordance with aspects of the invention.

FIG. 3 is a functional block diagram of a mobile device 300 for viewing video according to an example embodiment. In various example embodiments, the mobile device 300 may be, for example, but not limited to, a smartphone, a laptop or computer with an integrated or attached camera, or the like. The mobile device 300 includes a processor module 320. The processor module 320 is communicatively coupled to a transmitter-receiver module (transceiver) 310, a storage module 330 and a user interface module 340. The processor module 320 may be a single processor, multiple processors, a multi-core processor, or a combination of one or more processors and additional logic such as application-specific integrated circuits (ASIC) or field programmable gate arrays (FPGA).

The transmitter-receiver module 310 is configured to transmit and receive communications with other devices. For example, the transmitter-receiver module 310 may communicate with a cellular or broadband base station such as an LTE evolved node B (eNodeB) or WiFi access point (AP). In example embodiments where the communications are wireless, the mobile device 300 generally includes one or more antennae for transmission and reception of radio signals. In other example embodiments, the communications may be transmitted and received over physical connections such as wires or optical cables and the transmitter/receiver module 310 may be an Ethernet adapter or cable modem. Although the mobile device 300 of FIG. 3 is shown with a single transmitter-receiver module 310, other example embodiments of the mobile device 300 may include multiple transmitter-receiver modules. The multiple transmitter-receiver modules may operate according to different protocols.

The mobile device 300, in some example embodiments, provides data to and receives data from a person (user). Accordingly, the mobile device 300 includes user interface module 340. The user interface module 340 includes modules for communicating with a person such as input module 342, which can be a keyboard, a touchscreen interface, a keypad, a menu button, a microphone or other known user input device. The user interface module 340, in an exemplary embodiment, may include a display module 345 for providing visual information to the user, including displaying video content. Display module 345 can include a touchscreen device which interfaces with input module 342. The touch screen may allow graphical selection of inputs in addition to alphanumeric inputs.

In an alternative example embodiment, the user interface module 340 may include a computer interface, for example, but not limited to, a universal serial bus (USB) interface, to interface the mobile device 300 to a computer. For example, the device 300 may be in the form of a dongle that can be connected, by a wired connection or a wireless connection, to a notebook computer via the user interface module 340. The combination of computer and dongle may also be considered a device 300. The user interface module 340 may have other configurations and include functions such as audio speakers, vibrating devices and lights.

The processor module 320 can process communications received and transmitted by the mobile device 300. The processor module 320 can also process inputs from and outputs to the user interface module 340. The storage module 330 may store data for use by the processor module 320, including video stream data and related information. The storage module 330 may also be used to store computer readable instructions for execution by the processor module 320. The computer readable instructions can be used by the mobile device 300 for accomplishing the various functions of the mobile device 300. Storage module 330 can also store received content, such as video content and related information that is received via transmitter/receiver module 310.

In an aspect, the storage module 330 or parts of the storage module 330 may be considered a non-transitory machine readable medium. In an example aspect, storage module 330 may include a subscriber identity module (SIM) or machine identity module (MIM).

For concise explanation, the mobile device 300 or example embodiments of it are described as having certain functionality. It will be appreciated that in some example embodiments, this functionality is accomplished by the processor module 320 in conjunction with the storage module 330, the transmitter-receiver module 310, and the user interface module 340. Furthermore, in addition to executing instructions, the processor module 320 may include specific purpose hardware to accomplish some functions.

Figure 4:
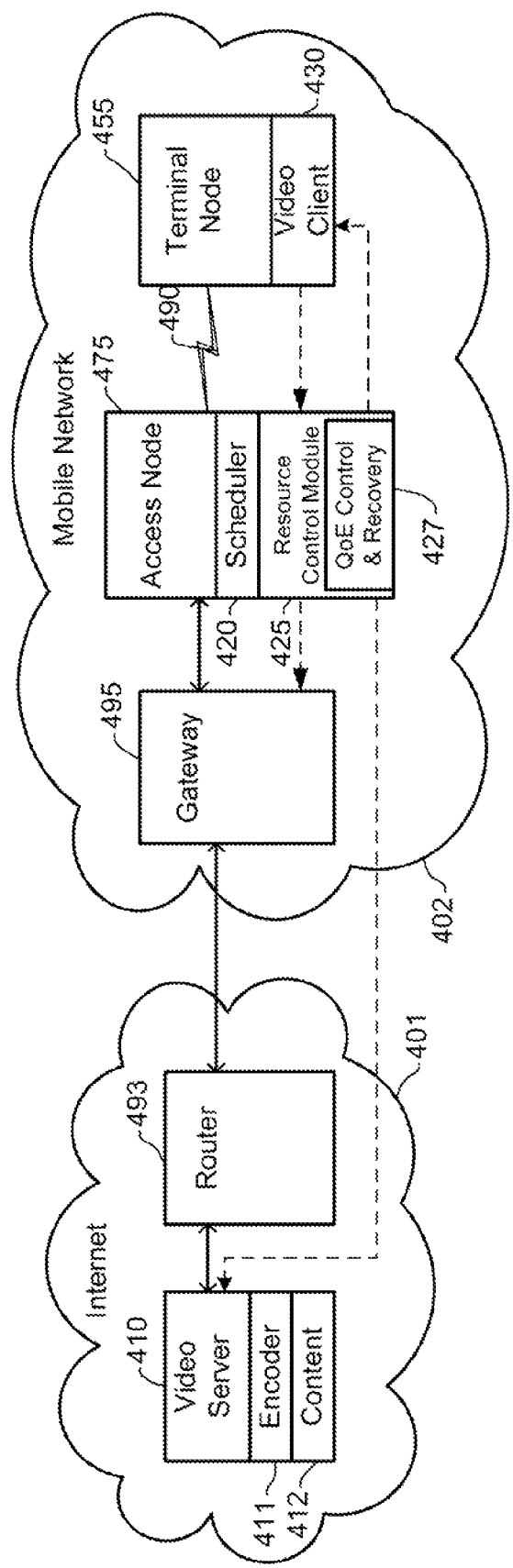
FIG. 4 is a block diagram of a video streaming environment in accordance with aspects of the invention.

FIG. 4 is a block diagram of a communication system supporting a video streaming environment in accordance with aspects of the invention. A terminal node 455 communicates with a video server 410 to facilitate providing video to a video client 430 at the terminal node 455. Various elements of the communication system may be the same or similar to like named elements described above. Terminal node 455 may be a mobile device, such as described above with respect to FIG. 3.

The terminal node 455 in the communication system shown in FIG. 4 communicates with an access node 475 over a channel 490. The access node 475 is connected to a gateway node 495. The gateway node 495 provides access to the Internet via connectivity to a router node 493. The router node 493 provides access to the video server 410. Video data passes from the Internet 401 to the mobile network 402 via the gateway 495 which transfers the video to the access node 475.

The video server 410 stores video content 412. The video server 410 may provide video content 412 to a video encoder 411. The video encoder 411 encodes the video for use by the video client at the terminal node 455. The video encoder 411 may encode the video content 412 as it is streamed (e.g., for live streaming events) or may encode the video in advance for storage and later streaming. The video encoder 411 may encode the video in different formats, profiles, or quality levels, for example, formats with different data rates. The format, profile, or quality level streamed can be switched while streaming. The different formats, profiles, or quality levels can be stored in advance or generated while streaming. The video server 410 provides video clients with access to the encoded video.

The access node 475 controls the transmission of data to and from the terminal node 455 via the channel 490. Accordingly, the access node 475 may include an admission control module, a scheduler module, and a transmission-reception module. The access node 475 may also include a packet inspection module. Alternatively, the gateway 495 may include a packet inspection module. Access node 475 in FIG. 4 is shown to include scheduler 420 and resource control module 425, which may include quality of experience (QoE) control and recovery module 427, and other modules such as an admission control module and a transmission-reception module.

The access node 475 monitors congestion on the channel 490. The congestion may be with respect to particular terminal nodes. The access node 475 may, for example, detect that video transmissions to the terminal node 455 are of a type that uses an adaptive video client that monitors its packet reception rates and decoder queue depths and will request a different video rate from the video server 410 when the terminal node 455 deems that such action will preserve or improve user quality of experience. The access node 475 may (e.g., under the control of an admission control module) intentionally reduce or increase transmissions to the terminal node 455 in order to trigger the terminal node 455 to request a different video rate. Alternatively, the access node 475 may communicate with an application on the terminal node 455 to allow terminal node 455 to determine whether to request a video rate change for the video transmissions.

Figure 5:
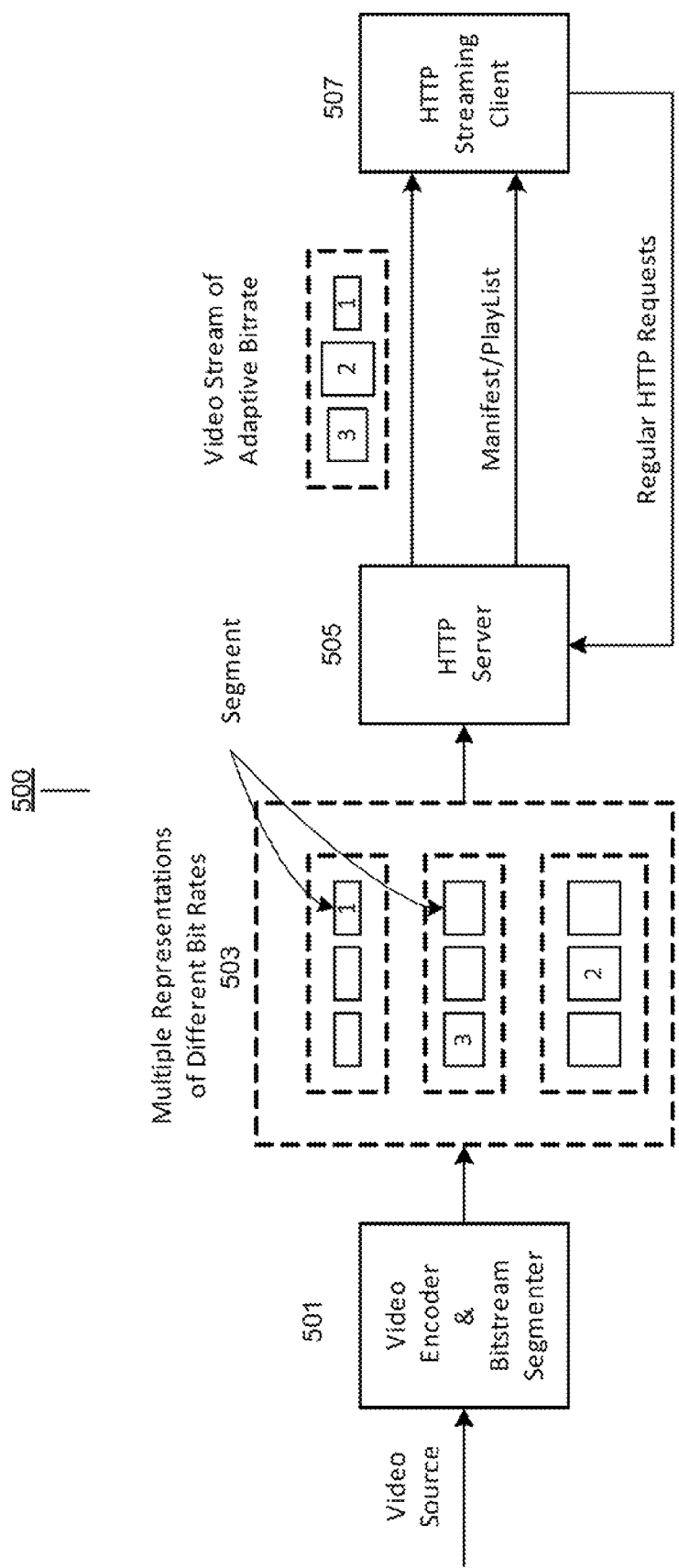
FIG. 5 is a block diagram of a video streaming environment with adaptive bit rate in accordance with aspects of the invention.

FIG. 5 is a block diagram of a video streaming environment with adaptive bit rate. As seen in FIG. 5, video streaming environment 500 is seen to include video encoder and bitstream segmenter 501, video representation blocks 503 (which includes a manifest file), HTTP server 505 and HTTP streaming client 507. In aspects, with reference back to FIG. 4, video encoder and bitstream segmenter 501 may be implemented in encoder 411, HTTP server 505 may be implemented in video server 410 and HTTP streaming client 507 may be implemented in video client 430. The video streaming environment shown in FIG. 5 is an HTTP video streaming environment; however video streaming environments according to other standards and protocols, such as UDP, may be used with aspects of the invention.

HTTP video streaming often uses a manifest file which provides information of a presentation to the client to control the playback process. Some general information about a manifest file is given below, and Tables 1 and 2 provide details about a specific type of manifest file, the Media Presentation Description (MPD) file defined in MPEG/3GPP DASH.

The video encoder 501 generates multiple representations of different bit rates for the same video presentation. Each representation consists of independently decodable segments. The segments are aligned in decoding time across different representations. The information of all representations such as average bit rate of each representation, and URLs of all segments inside each representation, is summarized in a manifest file. The video segments and manifest file can be stored in a single HTTP server 505, or distributed across multiple servers.

An HTTP streaming client 507 first retrieves the manifest file. It can then play the video by fetching the video segments, which are individually accessible through HTTP, based on network conditions. If the bandwidth is not sufficient, the client may fetch following segments from a representation of lower quality. Once the bandwidth increases at another time, the client may fetch segments from a representation of higher quality.

Since the network conditions may vary over time for a client, the video stream received by a client in a video streaming session may have video segments from more than one representation. Additionally, since the network conditions may vary differently for different clients, each client's video stream may consist of a different set of representations for video streaming sessions of the same video presentation.

The duration of a segment is usually a few seconds in playback time. Using segments of longer duration can make the compression and transport more efficient, but it will incur longer latency in switching across representations. The size of a segment in bytes depends on a few factors, including the segment duration, video content, and the compression setting.

In this document, the segment length or segment size normally refers to the number of bytes in a segment, while the segment duration refers to how long in time the segment can be played.

Figure 6:
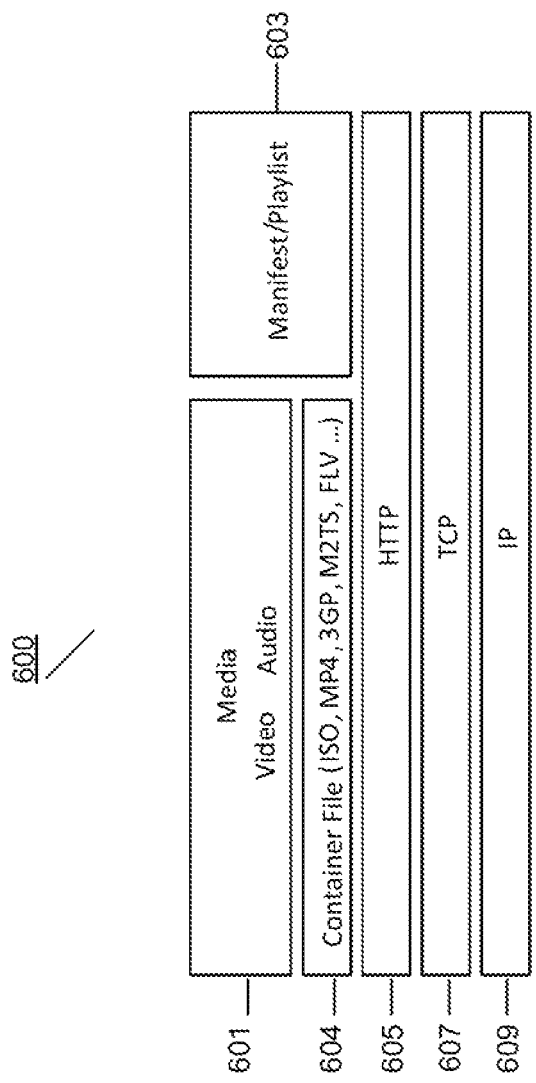
FIG. 6 is a block diagram of a protocol stack to support video streaming in accordance with aspects of the invention.

FIG. 6 depicts an example protocol stack 600 for HTTP video streaming. There are currently many proprietary HTTP streaming technologies, such as Apple HTTP Live Streaming, Microsoft Smooth Streaming, and Adobe Dynamic Streaming. The basic concepts are similar, but they differ in the format of the manifest file and the video container file which encapsulates video data into segments. The protocol stack shown in FIG. 6 includes the following layers: IP 609, TCP 607, HTTP 605, Manifest/Playlist 603, Container File 604 and Media (Audio/Video) 601. While the above protocol stack 600 is based on HTTP/TCP, it should be appreciated that the methods and systems described herein can be implemented with other protocols, such as but not limited to UDP, etc.

Apple's HTTP streaming protocol is HTTP Live Streaming (HLS). HLS uses MPEG-2 transport stream (TS) to encapsulate video data. Instead of using a comprehensive manifest file, HLS uses simple playlist file for retrieving the basic information about representations and the movie segments in representations.

Microsoft's HTTP streaming protocol is called Microsoft Smooth Streaming. Microsoft Smooth Streaming uses a fragmented movie file format derived from ISO base media file format (ISOBMFF) and its proprietary XML-based manifest file format. Microsoft Smooth Streaming uses PIFF (The Protected Interoperable File Format) as the video container format.

Adobe's HTTP streaming protocol is called HTTP Dynamic Streaming. Adobe HTTP Dynamic Streaming is similar to Microsoft HTTP Smooth Streaming in that it uses a fragmented movie file format based on ISOBMFF, so the data packetization process is similar. However, two HTTP streaming protocols define extensions to ISOBMFF differently, and the manifest file formats are also different.

MPEG/3GPP standardization groups have specified DASH (Dynamic Adaptive Streaming over HTTP) as an open standard alternative to multiple incompatible, proprietary HTTP streaming technologies in the market.

DASH uses an XML-based manifest file called MPD (Media Presentation Description) file. While 3GPP DASH adopts a video container file format based solely on the ISO based media file format (ISOBMFF), MPEG DASH supports an additional video container file format based on MPEG-2 transport stream format in some profiles, such as full profile, MPEG-2 TS simple profile and MPEG-2 TS main profile.

The general HTTP streaming framework described above has three levels in the media data hierarchy, presentation, representation, and segmentation. DASH has more levels in media data hierarchy than the general HTTP streaming framework. DASH defines the following media data hierarchy.

A presentation consists of one or more periods.

Each period has one or more adaptation sets.

An adaptation set contains one or more representations of one or several media content components. Each representation usually has a different quality setting. For example, if the representation contains video, the video quality may be varied by having a different resolution, or a different frame rate, or a bit rate or a combination of these variations.

A representation is comprised of one or more segments. The duration of a segment in playback time is typically a few seconds.

A segment may further consist of subsegments.

The additional levels in the media data hierarch add more flexibility in supporting additional features, but the quality adaptation algorithms to be discussed in the later sections are equally applicable.

Table 1 (below) lists an example MPD file for 3GPP/DASH On-Demand Service. For the first period whose duration is 30 seconds, the URL of each segment is explicitly defined. For the second period, which starts after 30 seconds, the segment URL is not specified individually. The client should derive the segment URL for the second and subsequent periods using a template, "http://example.com/$RepresentationId$/$Number$.3gp", specified in the element <SegmentTemplate>. For example, the URL of segment number "4" in representation of id "1" is "http://example.com/1/4.3gp". Using the template reduces the size of MPD file.

TABLE 1

Example MPD File for 3GPP/DASH On-Demand Service

```
<?xml version="1.0"?>
<MPD
  profiles="urn:3GPP:PSS:profile:DASH10"
  type="static"
  minBufferTime="PT10S"
  mediaPresentationDuration="PT2H"
  availabilityStartTime="2010-04-01T09:30:47Z"
  availabilityEndTime="2010-04-07T09:30:47Z"
  xsi:schemaLocation="urn:mpeg:DASH:schema:MPD:2011 3GPP-Re110-MPD.xsd"
  xmlns:xsi="http://www.w3.org/2001/XMLSchema-instance"
  xmlns="urn:mpeg:DASH:schema:MPD:2011">
  <ProgramInformation moreInformationURL="http://www.example.com">
    <Title>Example</Title>
  </ProgramInformation>
  <BaseURL>http://www.example.com</BaseURL>
  <Period start="PT0S">
    <AdaptationSet mimeType="video/3gpp">
      <ContentComponent contentType="video"/>
```

TABLE 1-continued

Example MPD File for 3GPP/DASH On-Demand Service

```
    <ContentComponent contentType="audio" lang="en"/>
    <Representation codecs="s263, samr" bandwidth="256000" id="256">
      <BaseURL>"rep1"</BaseURL>
      <SegmentList duration="1000" timescale="100">
        <Initialization sourceURL="seg-init.3gp"/>
        <SegmentURL media="seg-1.3gp"/>
        <SegmentURL media="seg-2.3gp"/>
        <SegmentURL media="seg-3.3gp"/>
      </SegmentList>
    </Representation>
    <Representation codecs="mp4v.20.9, mp4a.E1" bandwidth="128000" id="128">
      <BaseURL>"rep2"</BaseURL>
      <SegmentList duration="10">
        <Initialization sourceURL="seg-init.3gp"/>
        <SegmentURL media="seg-1.3gp"/>
        <SegmentURL media="seg-2.3gp"/>
        <SegmentURL media="seg-3.3gp"/>
      </SegmentList>
    </Representation>
  </AdaptationSet>
</Period>
<Period start="PT30S">
  <SegmentTemplate
    duration="10"
    initialization="seg-init-$RepresentationId$.3gp"
    media="http://example.com/$RepresentationId$/$Number$.3gp"/>
  <AdaptationSet mimeType="video/3gpp" codecs="mp4v.20.9, mp4a.E1">
    <ContentComponent contentType="video"/>
    <ContentComponent contentType="audio" lang="en"/>
    <Representation bandwidth="256000" id="1"/>
    <Representation bandwidth="128000" id="2"/>
  </AdaptationSet>
</Period>
</MPD>
```

Table 2 lists an example of MPD file for MPEG/DASH MPEG-TS Simple Profile. In this profile, the movie segment format is MPEG-TS (Transport Stream defined in ISO/IEC 13818-1). The segment URL is defined using template specified in element <SegmentTemplate>.

TABLE 2

Example MPD File for MPEG/DASH MPEG-2 TS Simple Profile

```
<?xml version="1.0"?>
<MPD
  xmlns:xsi=http://www.w3.org/2001/XMLSchema-instance
  xmlns="urn:mpeg:DASH:schema:MPD:2011"
  xsi:schemaLocation="urn:mpeg:DASH:schema:MPD:2011 DASH-MPD.xsd"
  type="static"
  mediaPresentationDuration="PT6158S"
  availabilityStartTime="2011-05-10T06:16:42"
  minBufferTime="PT1.4S"
  profiles="urn:mpeg:dash:profile:mp2t-simple:2011"
  maxSegmentDuration="PT4S">
  <BaseURL>http://cdn1.example.com/</BaseURL>
  <BaseURL>http://cdn2.example.com/</BaseURL>
  <Period id="42" duration="PT6158S">
    <AdaptationSet
      mimeType="video/mp2t"
      codecs="avc1.4D401F,mp4a"
      frameRate="24000/1001"
      segmentAlignment="true"
      subsegmentAlignment="true"
      bitstreamSwitching="true"
      startWithSAP="2"
      subsegmentStartsWithSAP="2">
      <ContentComponent contentType="video" id="481"/>
      <ContentComponent contentType="audio" id="482" lang="en"/>
      <ContentComponent contentType="audio" id="483" lang="es"/>
      <BaseURL>SomeMovie_</BaseURL>
      <SegmentTemplate
        media="$RepresentationID$_$Number%05$.ts"
        index="$RepresentationID$.sidx"
```

TABLE 2-continued

Example MPD File for MPEG/DASH MPEG-2 TS Simple Profile

```
            initialization="$RepresentationID$-init.ts"
            bitstreamSwitching="$RepresentationID$-bssw.ts"
            duration="4"
            startNumber="1"/>
        <Representation id="720kbps" bandwidth="792000" width="640" height="368"/>
        <Representation id="1130kbps" bandwidth="1243000" width="704" height="400"/>
        <Representation id="1400kbps" bandwidth="1540000" width="960" height="544"/>
        <Representation id="2100kbps" bandwidth="2310000" width="1120" height="640"/>
        <Representation id="2700kbps" bandwidth="2970000" width="1280" height="720"/>
        <Representation id="3400kbps" bandwidth="3740000" width="1280" height="720"/>
    </AdaptationSet>
  </Period>
</MPD>
```

Figure 7A:
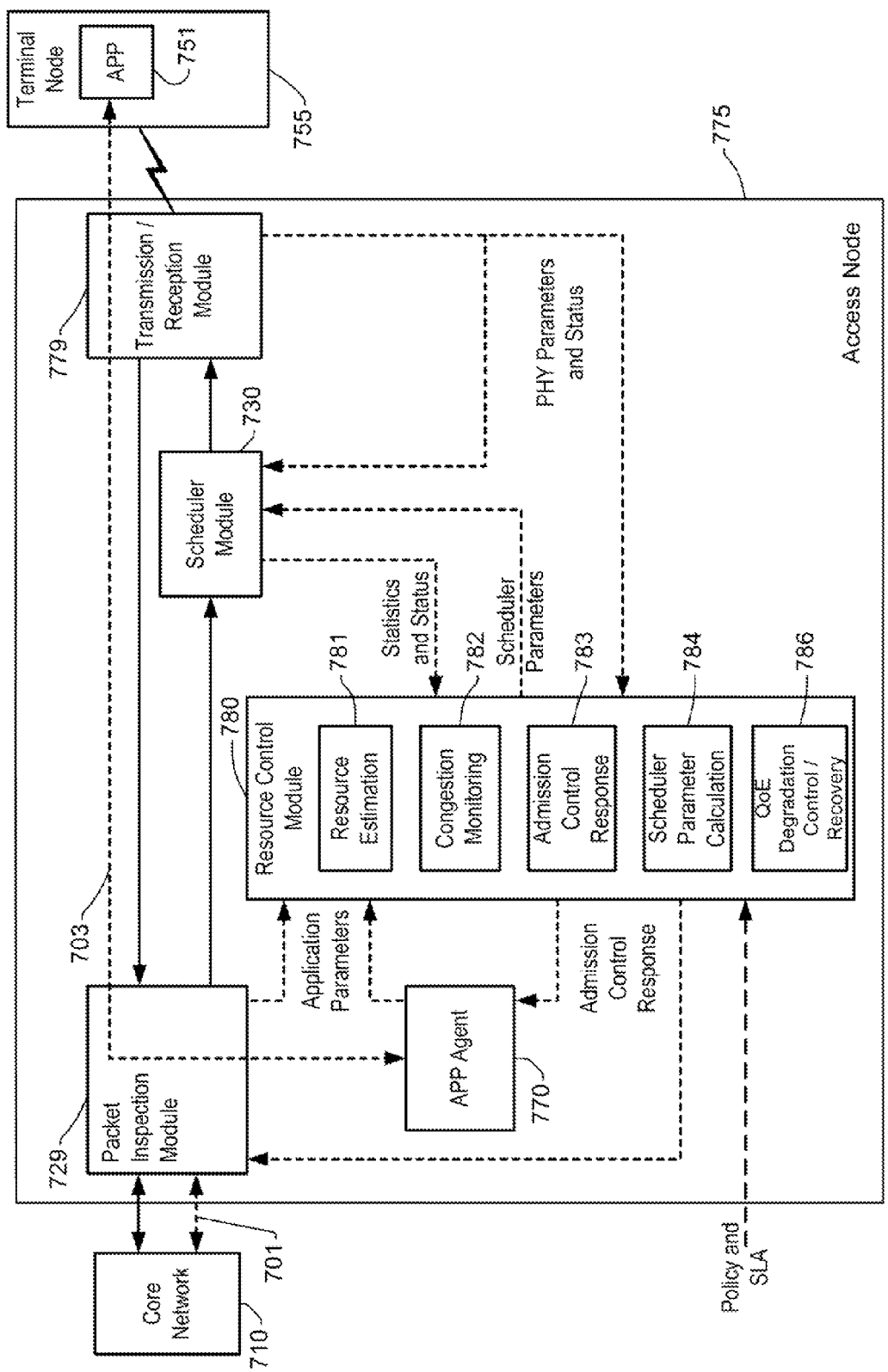
FIG. 7A is a block diagram of an access node in a wireless communication environment that supports video streaming in accordance with aspects of the invention.

FIG. 7A is a block diagram illustrating aspects of an access node 775 that supports video streaming in accordance with aspects of the invention. The access node 775 communicates with a terminal node 755 and a core network 710. The macro base station 110, the pico station 130, the enterprise femtocell 140, or the enterprise gateway 103 of FIG. 1, in some embodiments, is implemented using the access node 775. The access node 775 may be implemented, for example, using the access node 275 of FIG. 2. The core network 710 may also be a service provider network, the Internet, an enterprise network, a home network, or a combination of networks. To aid in understanding, in FIG. 7A, solid lines represent user data and dashed lines represent control data. The distinction between user data and control data is from the point of view of the access node 775. Since the access node 775 acts as a bridge, there may be control data from the terminal node 755 to some entity, such as a video server, in the core network 710 that is perceived by the access node 775 as user data.

The access node 775 of FIG. 7A facilitates communication between the terminal node 755 and entities in core network 710 and beyond (for example, entities accessed via the Internet such as video servers). An application 751 in the terminal node 755 communicates with a server application in, or connected to, the core network 710 via the access node 775. The application 751 provides some functionality or service for a user of the terminal node 755. For example, the application 751 may be a software program executed by the terminal node 755, such as a video client application. In an aspect, one or more application (APP) agents 770 may optionally be provided in the access node 775, and the application 751 in the terminal node 755 may communicate with an application (APP) agent 770 in the access node 775. The application 751 may be a module provided, for example, by the processor module 320 of the terminal node 300 of FIG. 3 using instructions from the storage module 330. The application (APP) agent 770 may be a module provided, for example, by the processor module 281 of the access node 275 of FIG. 2 using instructions from the storage module 283.

In an aspect in which an application (APP) agent 770 is optionally provided, the application 751 and the application (APP) agent 770 may communicate via an APP-agent cooperative communication control path 703. In this aspect, communications between the application 751 and the application (APP) agent 770 may provide improved communication system performance, for example, improved QoE for the user of the terminal node 755. In such an aspect, applications that provide communications on the APP-agent cooperative communication control path 703 may be considered "enhanced" or "cooperative" applications. In an aspect, application 751, may provide VQM input parameters to application (APP) agent 770, such as freeze/stall instance data, for sending to resource control module 780 to be used by QoE Degradation Control and Recovery Module 786 in the calculation of VQM values, as an alternative to having to calculate such VQM input parameters within access node 775. In another aspect, application 751 may provide VQM values to application (APP) agent 770, for sending to resource control module 780 to be used by QoE Degradation Control and Recovery Module 786, as an alternative to having to calculate such VQM values within access node 775.

Although FIG. 7A illustrates single instances of each element, in an embodiment, there may be multiple instances of various elements. For example, the access node may concurrently communicate with multiple terminal nodes, and each of the terminal nodes may have multiple applications that may concurrently cooperate with one or more application agents in one or more access nodes.

The access node 775 includes a packet inspection module 729, a scheduler module 730, and a transmission/reception module (transceiver) 779. The packet inspection module 729, the scheduler module 730, and the transmission/reception module 779 are used by the access node 775 in communicating with the terminal node 755. The transmission/reception module 779 provides communications with the terminal node 755. The transmission/reception module 779 may, for example, implement a radio access network physical layer. The access node 775 also includes a resource control module 780 that is responsible for various aspects of resource control. The application (APP) agent 770 may also communicate with the resource control module 780.

The packet inspection module 729 is in a data path between the core network 710 and the terminal node 755. In the downlink direction, the packet inspection module 729 receives data from the core network 710 and decides what to do with the data. For example, user data bound for the terminal node 755 may be segregated into queues at the scheduler module 730 for transmission to the terminal node 755 via the transmission/reception module 779. The segregation into queues may be based on various characteristics associated with the user data, such as logical link, IP source and destination addresses, or application class. In an embodiment, the packet inspection module 729 is part of or coupled to a data bridge/relay module. The packet inspection module 729 may also include a routing function performed before or after the data bridge/relay module. In an aspect, packet inspection module 729 also includes functionality for determination of buffer occupancy (BO) estimates as further described below with regard to FIG. 7B.

Some data from the core network may be control data intended for control and configuration of the access node 775. This data may be directed to various control or management modules of the access node 775, for example, the resource control module 780.

The scheduler module 730 implements some or all of the functionality required to allocate physical resources across the communication link between the access node 775 and the terminal node 755. The scheduler module 730 is typically associated with or part of a medium access control (MAC) layer. For the downlink direction, the scheduler module 730 decides which data to transmit and at what point in time. The resources may be allocated, for example, as subcarriers and timeslots. The scheduler module 730 may also process uplink resource requests from the terminal node 755 and grant uplink bandwidth. The scheduler module 730 may use PHY information from the transmission/reception module 779, such as modulation and coding scheme, to determine the amount of resources to allocate to specific user data. The scheduler module 730 may also inform the resource control module 780 of congestion occurring on the communication link or statistics relating to congestion monitoring (for example, buffer occupancy and egress rates). In an embodiment, the scheduler module 730 may receive updates to scheduler parameters, such as changes to weights and credits, from the resource control module 780.

The packet inspection module 729 may also detect applications and provide application information, such as application class, specific application, data rates, and durations, to the resource control module 780. In an embodiment, the packet inspection module 729 may receive admission control response information and aid in implementing the admission control response, such as blocking packets for a particular connection or session.

The resource control module 780 shown in FIG. 7A includes a resource estimation module 781, a congestion monitoring module 782, an admission control response module 783, a scheduler parameter calculation module 784 and a QoE degradation control and recovery module 786. The resource estimation module 781 estimates the expected resource needs of currently active applications. The resource estimation module 781 may use application parameters, such as expected data rate, and PHY parameters, such as changes in modulation and coding for the terminal node 755, to estimate the expected resource needs. Any excess in resources can be available to new applications or available to increase the resources allocated to a currently active application.

The congestion monitoring module 782 monitors the current state of congestion. The current state of congestion may vary from the resource estimation performed by the resource estimation module 781. For example, when a short-term change in data rate occurs (for example, a peak in the data rate for a variable data rate streaming video), information from the scheduler module 730 may indicate current congestion (for example, an increase in the scheduler buffer occupancy of scheduler 730 for an application or a decrease in buffer egress rate for an application) even though the long-term resource estimation does not indicate congestion. In an embodiment, the congestion monitoring module 782 may also maintain historical congestion information that may be used in predicting congestion.

The admission control response module 783 may create control responses to admit, deny, delay, or modify logical links, connections, and/or streams thereby creating control responses for sessions. The admission control response module 783 may create the control responses using various information, for example, policies (e.g., priority of users or acceptable level of user QoE), service level agreement (SLA) information, application parameters (e.g., specific application or data rate), resource estimates, APP-agent cooperative communications, and congestion indicators.

In this regard, the admission control response module 783 can make admission control responses that avoid adverse impacts on system performance, including impacts on QoE, and to improve QoE for existing user sessions, such as video streaming sessions. Information about bit rates, modulation and coding, and oversubscription policy can be used to avoid adverse impacts. For instance, the modulation and coding can be used to determine how many bits are available to transmit user data in a unit (e.g., a resource block in LTE) of resource allocation. For example, an oversubscription policy may allow the admission control response module 783 to accept sessions representing a higher total bandwidth than is actually available. This may happen due to knowledge that many sessions will not use the entirety of their allowed resources. For instance, in LTE a VoLTE (Voice over LTE) connection may be established that includes a GBR (Guaranteed Bit Rate) assignment made prior to knowing which audio codec will be used. Thus, the GBR may assume the worst case, i.e. the highest resolution and, therefore, the highest bit rate. However, the actual codec used may be more efficient (lower bit rate) and not consume all assigned bandwidth. Additionally, the use of silence suppression techniques may further reduce the actual bit rate below the maximum bit rate. The packet inspection module 729 may detect that a service is using less bandwidth than initially budgeted. This information may allow the admission control response module 783 to oversubscribe the guaranteed resource commitments of the channel. The admission control response module 783 may also use policy inputs in making oversubscription decisions.

The admission control response module 783 may, alternatively or additionally, determine availability of sufficient resources and indications of congestion from parameters. Example parameters include scheduler buffer occupancy, scheduler buffer egress rates, discard rates, and observed or estimated video or audio quality metrics, such as video stalls. The parameters may be derived from currently or recently active services, and may be provided by other functional modules within access node 775. If the admission control response module 783 determines that sufficient resources exist for a new session, the new session may be admitted. If the admission control response module 783 determines insufficient resources exist, a control response must occur to mitigate the oversubscription.

One control response the admission control response module 783 may make to mitigate oversubscription is denial of the new service. When the new service is to be started on an already existing bearer, the control response cannot be as simple as denying creation of a bearer. In an embodiment, the control response may be to discard or replace some of the session initiation packets, thereby overcoming the ability of the session protocol to initiate the session. The response may include discarding one or more packets related to the service request and sending a substitute message back to the service initiator. For example, an HTTP GET command issued by the terminal node may be identified by the packet inspection module 729 and held. Due to congestion conditions, the admission control response module 783 may create a control response to discard the service request. Additionally, the control response may create and send a substitute message to the scheduler module 730 which in turn sends the message to the terminal node. The substitute message, for example, may be an HTTP 413 Request Entity Too Large message, HTTP 500 Internal Server Error message, HTTP 503 Service Unavailable message, or HTTP 504 Gateway Timeout message. These messages may include a Retry-After parameter to signal a waiting period before the client should attempt to reinitiate the session, creating a control response to delay rather than deny the service. The Retry-After parameter may be set to a constant value or may be set depending on the severity congestion (current, predicted future congestion, or combination of congestion levels). Additionally or alternatively, a substitute message may have the TCP reset flag, a field within a TCP header, set to a value of 1, thereby initiating a closing of the underlying TCP connection.

Alternatively, the response from admission control response module 783 may include replacing a message accepting a service request with a message rejecting the service request. More specifically, if a client in the terminal node 755 is requesting a video clip using an HTTP GET command, the packet inspection module 729 may identify the HTTP 200 OK message issued from the data server (core network) 710. In response, the admission control response module 783 may create a control response to discard the message, replace it with a substitute message, and close the TCP connection. For instance, the admission control response module 783 may signal the packet inspection module 729 to detect and discard the HTTP 200 OK message and pass an HTTP 413 Request Entity Too Large message, HTTP 500 Internal Server Error message, HTTP 503 Service Unavailable message, or HTTP 504 Gateway Timeout message to the scheduler module 730 in its place. These messages may include a Retry-After parameter to signal a waiting period before the client should attempt to reinitiate the session, creating a control response to delay rather than deny the service. The Retry-After parameter may be set to a constant value or may be set depending on the severity congestion (current, predicted future congestion, or combination of congestion levels). A substitute message may have the TCP reset flag set to a value of 1, thereby initiating a closing of the underlying TCP connection. A second substitute message may also be created by the access node 775 and sent to the data server (core network) 710 to terminate any data transmissions related to the original terminal node request. The second substitute message may have the TCP reset flag set to a value of 1, thereby initiating a closing of the underlying TCP connection.

In another example, the decision to delay or deny the service may be made after one or more message transactions have been successfully completed between the terminal node 755 and the data server (core network) 710. For example, the admission control response module 783 may create a control response to delay or terminate the service after determining the application class or specific application of the service. Alternatively, a service may be delayed or terminated after the access node 775 determines the necessary resources required to support the service. For example, a streaming video service may be denied once it is determined that the average bitrate exceeds the available system capacity.

In another example, if a client in the terminal node 755 starts an RTSP streaming session, the packet inspection module 729 may identify the RTSP messages transferred between the server and the client. When the admission control response module 783 decides to deny a service, it may create a control response to change the status of RTSP response message corresponding to RTSP request message with SETUP method from 200 (OK) to 453 (Not Enough Bandwidth).

The admission control response module 783 may also create a control response to deny the setup of a TCP connection. For example, if the number of TCP connections allowed for a terminal node is exceeded, the admission control response module 783 may prevent setup of another TCP connection for that terminal node. The packet inspection module 729 may inspect packets to identify the setup of a TCP connection via detection of the packets used for TCP establishment (e.g., SYN, SYN-ACK, ACK) between a TCP client and a TCP server. The admission control response module 783 may create a control response to discard these messages if too many TCP connections have been established. Alternatively or additionally, the client (or the server) may be signaled to indicate the denial of service.

The system may choose to deny a service based on a variety of factors. For example, the system may base the decision on a new session's protocol (e.g., HTTP or FTP), application class (e.g., streaming video, conversational or two-way video, voice, internet browsing, peer-to-peer exchanges, gaming, or machine-to-machine exchange), or specific application (e.g., YouTube, Netflix, Facebook, FaceTime, Chrome, or BitTorrent). A service may be also denied based on the above methods in combination with user SLA or network policy.

The admission control response module 783 may also create a control response to delay a new service. The new service may be delayed, for example, until the system estimates that there will be sufficient resources. For example, a YouTube video session's creation protocol can contain information, such as metadata, that allows the packet inspection module 729 to determine the size or duration of the YouTube video. Session durations may be similarly determined for other video streaming applications and for non-video sessions. The admission control response module 783 can use the duration information, possibly combined with buffer occupancy and egress rates, to estimate when a video session may end and system resources may be freed. The admission control response module 783 may delay a new service, for example, by delaying session initiation protocol packets or by signaling the application, client, or server to delay session initiation. Thus, the session can be delayed until sufficient resources are available. Delaying the session may provide a better user QoE than denying the session.

The admission control response module 783 may also create a control response to modify a service so that the service will operate within the resources available. For example, in video applications, the server may send a list of video representations from which the client may choose. Each representation may have a different container file format, or a different video resolution, or a different bit rate. In an embodiment, the access node 775 may modify a list of possible representations in which a video is available. The possible representations can be modified to limit the list to those that will operate within the resources available.

Video files are usually large, and so it can be desirable for a client to be able to start playing a video file before the whole video file is received. To make this possible, YouTube servers, for example, provide video content in popular container formats such as MP4, 3GP and FLV where video metadata may be stored in the beginning of the file. A YouTube client can start playing as soon as the video metadata and a small amount of the movie data are received.

For each video, a YouTube server may provide multiple video representations with different URLs for the client to access. The YouTube server may signal the available representations in an XML content message. Example available video representations for a video clip are listed in the following table. In the URLs, the number after the "itag" field indicates a different video container file format and resolution available for the video clip. For example, the lines with itag=18 and itag=22 both indicate MP4 format, but with resolutions of 360 p and 720 p, respectively. In this case, a control response may be to intercept the XML content message, strip the higher data rate options that would cause congestion, and forward the modified message. This limits the client's choices to those for which sufficient resources exist. Content for other services and formats can be similarly modified.

| Type | URL |
|---|---|
| mp4 | http://redirector.c.youtube.com/<br>videoplayback?id=7fb266ccf8e4e36c&itag=18 . . . |
| 3gpp | http://redirector.c.youtube.com/<br>videoplayback?id=7fb266ccf8e4e36c&itag=17 . . . |
| x-flv | http://redirector.c.youtube.com/<br>videoplayback?id=7fb266ccf8e4e36c&itag=5 . . . |
| mp4 | http://redirector.c.youtube.com/<br>videoplayback?id=7fb266ccf8e4e36c&itag=22 . . . |
| 3gpp | http://redirector.c.youtube.com/<br>videoplayback?id=7fb266ccf8e4e36c&itag=36 . . . |

The admission control response module 783 may also create a control response to change scheduling priorities or scheduling resource allocation. For example, scheduling priority or weight of a new session or the bearer carrying the new session may be increased, for example, to allow degradation of other services, which may be more delay or packet loss tolerant, in order to allow admission of the new session. Once the period of congestion has subsided, the degraded services may be processed in a non-degraded manner.

The admission control response module 783 may also create a control response to admit a new session using each user's relative service level, for example, in combination with other methods. For example, if the new session is initiated by a user who has paid for a higher level of service (e.g., Gold service) as compared to the service levels of other currently served users (e.g., Silver service) the admission control response module 783 may use the above methods to determine the control response. In contrast, the system may refrain from applying the above methods (e.g., a new service request is denied) if the new session is initiated by a user who has the same service level as those currently being served. Similar actions may be taken if the new session is initiated by a user who has a lower service level as those currently being served.

The admission control response module 783 may initiate similar control responses when capacity is reduced. For example, capacity may be reduced when a terminal node moves away from the access node 775 and needs to operate with a more robust but less efficient modulation and coding scheme. In this case, the control response is not whether to admit or deny a device, data bearer, or individual session. Instead, the control response is whether to suspend, terminate, or modify communication with a device, a data bearer, or an individual session.

The admission control response module 783 may make decisions to suspend or terminate, for example, based on service level agreements (e.g., using the priorities expressed or implied by these agreements) or allocation and retention priorities. The admission control response module 783 may also make decisions to suspend or terminate based on knowledge of the applications being used. For instance, in the case of an interactive voice and video call, considering that the voice component is the more important to user quality of experience, the admission control response module 783 may suspend the video portion during congestion while continuing the voice portion. The video portion could be resumed once congestion is alleviated. This may allow the interactive voice and video call to proceed at a greater level of user satisfaction than if substantial packet loss occurred on both the voice and video portions of the call.

The admission control response module 783 may make decisions to modify a service. By modifying operational parameters associated with a service, the service may be preserved at a lower bandwidth. For example, the control response may be to reduce the resolution or data rate of a video service to lower the required bandwidth. A video scaling capability may exist at the data server (core network) 710 (or somewhere else in the system), and the admission control response module 783 can send a request or command to the video scaling capability to scale the video stream to a reduced resolution.

In an aspect, the admission control response module 783 may trigger the video client or application at the terminal node 755 to request video with a different playback bitrate. The request may be to the data server 710 or to an intermediary video scaling capability. This method may be used, for example, when the admission control response module 783 lacks the ability to directly command or make requests for video scaling. For example, rather than downloading an entire video file progressively with one HTTP GET request in one TCP connection, a client may use multiple HTTP requests on different TCP connections to download the video file in smaller fragments which may be of different sizes. This allows portions of the video to be requested using different parameters, including different playback bitrates. The admission control response module 783 may communicate with the client and instruct it to request subsequent portions of the video at a different bitrate, for example, due to congestion. In an embodiment, the admission control response module 783 may generate a control response to reduce the resources allocated to the video, thereby triggering the client to select a reduced data rate in compensation. Such a technique may also be used by clients employing adaptive streaming video protocols such as dynamic adaptive streaming over HTTP (DASH), Microsoft's Smooth Streaming, Apple's HTTP Live Streaming, or Adobe's Dynamic Streaming protocol.

Some video clients may contain logic that monitors the flow of received video data. The admission control response module 783 can be aware of whether a particular video client is likely to react to alterations in video or other packet flow to request increased or decreased video rates. The admission control response module 783 may be aware of how the video client is likely to react based on information from the packet inspection module 729. For example, the packet inspection module 729 may detect a DASH media presentation description (MPD) file on a particular logical bearer. Based upon this awareness, the packet inspection module 729 may infer that a subsequent video playback session on the same bearer will use a video client which may react to alterations in packet flow. When the video client is likely to react beneficially, the admission control response module 783 may constrain the flow of video to the client and trigger the client to request a lower data rate. Conversely, the admission control response module 783 may cause the flow of video to the client to be increased to trigger the client to request the video at an increased rate. The scheduler parameter calculation module 784 may calculate modifications to scheduler parameters, such as weights and credits. The scheduler parameter calculation module 784 may calculate the modifications using various information, for example, APP-agent cooperative communications, policies, SLA information, application parameters, resource estimates, congestion indicators, and control responses (e.g., admission control responses).

QoE degradation control and recovery module 786 provides functionality to enter/exit a QoE degradation control state and a QoE recovery state when a QoE metric associated with one or more video stream sessions to one or more terminal nodes 755 in the wireless network environment falls below a threshold QoE level. QoE degradation control and recovery module 786 dynamically interacts with the other modules and components shown in FIG. 7A in order to operate, as described in more detail in aspects provided herein.

The transmission/reception module 779, in addition to facilitating uplink and downlink data transfer, may monitor or maintain physical layer (PHY) parameters and status, such as modulation, coding, and signal-to-noise ratio (SNR) associated with communication with the terminal node 755. Capabilities of the access node 775 to communicate with terminal nodes depend in part on the PHY parameters and status. Information about PHY parameters and status may be made available to the scheduler module 730 to make scheduling decisions and to the resource control module 780 to calculate scheduler parameter adjustments or to determine admission control responses. The transmission/reception module 779 may also facilitate or generate communication between radio access protocol modules in the access node 775 and the terminal node 755.

In the uplink direction, the packet inspection module 729 receives user data from the terminal node 755 via the transmission/reception module 779 and forwards the user data to the core network 710. The packet inspection module 729 may also receive communications from the terminal node 755 destined for the application (APP) agent 770. The packet inspection module 729 can identify these communications and forward them to the application (APP) agent 770.

The application (APP) agent 770 and the application 751 establish the APP-agent cooperative communication control path 703. The APP-agent cooperative communication control path 703 can be, for example, a TCP connection. The APP-agent cooperative communication control path 703 is used for exchanging APP-agent cooperative communications. Routing of data on the APP-agent cooperative communication control path 703 may be facilitated by the packet inspection module 729. Alternatively, the routing may be facilitated by a routing function that can be internal or external to the access node 775.

APP-agent cooperative communications from the application 751 to the application (APP) agent 770 can include, for example, information that allows the access node 775 to improve admission control and scheduling. The communications between the application (APP) agent 770 and the application 751 can, for example, provide additional information to the resource control module 780.

As an introductory example of APP-agent cooperative communications, consider a communication network where the application 751 provides YouTube streaming video to the user of the terminal node 755. The streaming video may be available in multiple formats with different associated data rates. Information about the formats may be communicated by a YouTube specific application to a YouTube aware application agent that may, in turn, provide the information about the formats to the resource control module. The resource control module can use the application information to generate an admission control response that indicates which formats, if any, fit with current estimates of available resources. The YouTube aware application agent may process the admission control response into APP-agent cooperative communications to the YouTube specific application specifying which formats are currently allowable. In various embodiments, the specific choice of format may be made by the application agent or by the application and communicated back to application agent. The application agent may inform the resource control module of the chosen format and associated data rate. The resource control module updates resource estimates and scheduler parameters to reflect the chosen format.

FIG. 7A illustrates a particular allocation of functions to various modules and a particular distribution of modules in various communication nodes. Many other arrangements may also be used. For example, all or parts of the packet inspection module 729, the application (APP) agent 770, and the resource control module 780 could be in a gateway node in the core network, for example, in a serving gateway (S-GW) or a packet gateway (P-GW) in an LTE network. Additionally, there may be intermediate devices between the access node 775 and the core network 710 and terminal node 755. Many combinations of applications and application agents and their related functions may also be used. For example, there may be one application agent that communicates with all applications, one application agent for each particular application (e.g., a YouTube application agent, a Pandora application agent, etc.), one application agent for each terminal node, or one application agent for each application (e.g., a YouTube application agent for a first terminal node and another YouTube application agent for a second terminal node). When there are multiple applications and application agents, there may be individual communications connections (e.g., TCP/IP connections) between each pair of application and application agent. Alternatively, communication between multiple applications and application agents may be aggregated and carried via a reduced number of connections. For example, a single TCP/IP connection may be used to communicate between multiple application agents and applications for a specific terminal node.

The application (APP) agent 770 can perform connection life cycle management and segment buffering and reordering for TCP/IP connections and other connections using connection-oriented and byte stream based protocols, for example by using an instance of a TCP stack. Alternatively, the APP-agent cooperative communications may use a simplified communication connection, for example, UDP/IP.

Figure 7B:
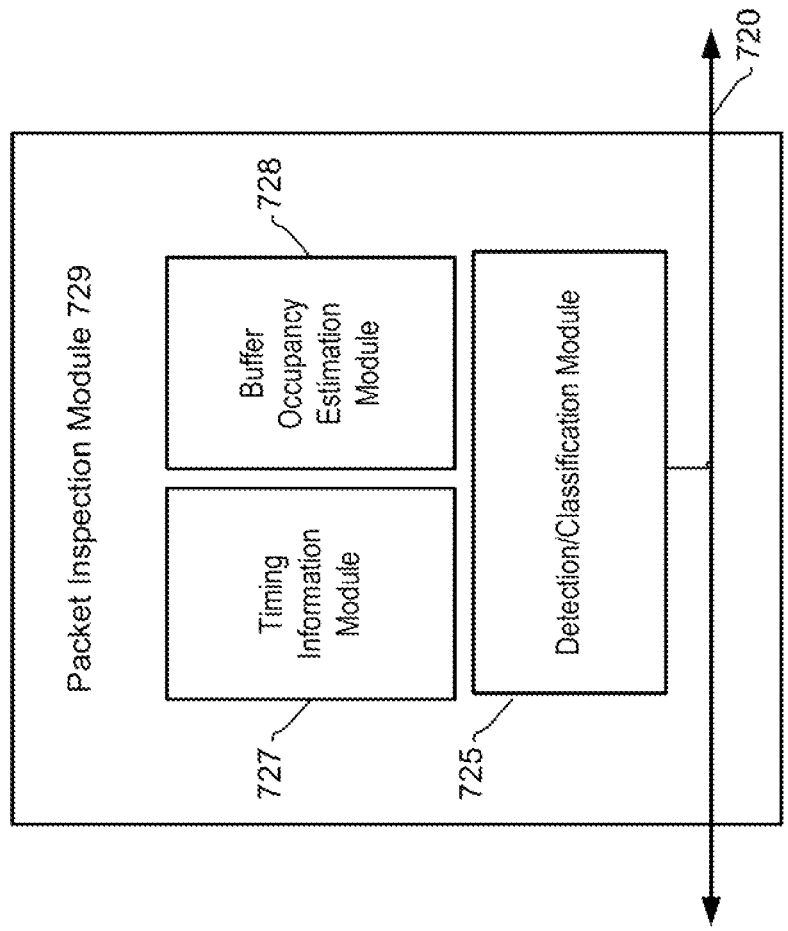
FIG. 7B is a block diagram of a packet inspection module in accordance with aspects of the invention.

FIG. 7B is a block diagram of a packet inspection module in accordance with certain aspects. As seen in FIG. 7B, packet inspection module 729 of FIG. 7A is shown in more detail. The packet inspection module 729 can inspect packets on connection 720 and analyze downstream packets and upstream packets on connection 720 in a communication node. Based on the analysis, the packet inspection module 729 can collect and determine parameters for estimating the video client buffer occupancy of a video session playing in a terminal node. For explanatory purposes, operation of the packet inspection module 729 at a wireless access node for video delivery will be described in detail. The packet inspection module 729 is, however, applicable to other network nodes and may be implemented in wireline communication networks and other services.

In an aspect, the packet inspection module 729 can detect and/or predict events that impact the video quality experienced by a user of a client device receiving the video. The video quality can be based on video freeze events, which are correlated with buffer occupancy in the client device. The packet inspection module 729 can collect and determine information about the estimated current playback time at the client and information about what video data has been delivered to the video client for estimation of the video client's buffer occupancy.

The packet inspection module 729 includes a detection/classification module 725. The detection/classification module 725 analyzes downstream and upstream packets to detect characteristics of the packets and classify the packets using the detected characteristics. For example, the detection/classification module 725 may characterize the packets by application class and specific application. The detection/classification module 725 may identify some packets for further analysis by other modules. The detection/classification module 725 may, for example, detect packets associated with a particular video stream and pass those packets to a timing information module 727.

The timing information module 727 analyzes packets associated with a video delivery to determine video-related timing information. The timing information module 727 detects various types of timing information. One type of timing information includes parameters associated with the video, such as video buffer model parameters and locations of video samples. Another type of timing information is the time when each video sample should be removed from the client-side video stream buffer and decoded. The timing information module 727 can also estimate the time when various packets are delivered to the client. The timing information module 727 may also detect information about the playback state of the client, such as pauses. Using the information detected by the timing information module 727, a client-side video stream buffer emulator can be utilized to mimic how the client consumes the video data.

Video buffer model parameters are defined at various syntax levels. For example, an H.264 video bitstream may use a generalized hypothetical reference decoder (HRD) buffer model with parameters specified in an HRD Parameters section in the video usability information (VUI) and in a Buffering Period section in the supplemental enhancement information (SEI). Similar parameters may also be specified in the container file format. For example, the progressive download information (pdin) box in ISO (International Organization for Standardization) Base Media File Format (BMFF) specifies multiple pairs of data rate and initial buffer delay. When similar information is presented in the container file level, information at the elementary stream level may be ignored.

A video sample in a container file format is one video frame. The time when a compressed frame should be removed from the video stream buffer and decoded is specified at various syntax levels. For example, an H.264 video bitstream has picture timing SEI that specifies "cpb_removal_delay" to indicate when a compressed video frame (an access unit) needs to be removed from the decoder video stream buffer (Coded Picture Buffer or CPB in H.264 terminology). Similar parameters may also be specified in the container file format. When similar information is presented in the container file level, information at the elementary stream level may be ignored. The timing information module 727 can estimate what video information has been delivered to the client in various ways. In particular, estimates of client-side buffer occupancy can use information about DTSs (Decode TimeStamps) of the video samples delivered to the client.

The timing information module 727 may count the video data bytes that are transmitted to the client to estimate the DTS of the most recent video sample transmitted to the client. In an aspect, the DTS of the most recent video sample transmitted to the client can be estimated by dividing the number of bytes transmitted by the average video bitrate. In another aspect, the timing information module 727 can more accurately determine what video samples have been delivered to the client and their corresponding DTSs by decoding the relationship between bytes transmitted, video sample size, and the DTS of each video sample. For example, the timing information module 727 can parse the video metadata to establish a table that can be used to map byte counts to the video samples and the corresponding DTSs of the video samples.

In an access node that handles numerous data connections and simultaneous video streaming sessions, counting the bytes in a video stream may require significant processing resources. For example, performing TCP segment processing (i.e., the handling of out-of-order, lost, and duplicate packets) on all Internet protocol (IP) packets containing TCP segments and parsing the container file metadata may a burdensome processing task. Control response decisions, such as scheduling parameters, may not need to change very frequently. Multiple optimization techniques for determining the video sample DTS can be used by the timing information module 727 to take advantage of infrequent control parameter changes. In an aspect, one optimization method is to parse the metadata asynchronously. In such an aspect, the packet inspection module 729 can store the metadata in a local buffer and parse the metadata in a low priority thread. Before the metadata is parsed, no scheduling decisions that require information from the metadata can be applied. This may be handled by, for example, initially setting the priority of new video sessions to a high value until the metadata is processed. Then, after the metadata is processed, the information can be used in congestion control.

In an aspect, another optimization method is to perform TCP segment processing only on packets containing the metadata and not on the packets containing actual media data (e.g., data in an ISO BMFF mdat box). Similarly, if the video stream is encrypted, the decryption of data may be performed only on the packets containing the metadata and not on the packets containing actual media data. The amount of video data transferred can be more efficiently calculated. The packet inspection module 729 may check TCP sequence numbers of the video packets to calculate the amount of video data transferred. The difference between the TCP sequence number of the initial video packet and the TCP sequence number of the most recently transmitted video packet and the payload length of the most recently transmitted video packet can be used to calculate the amount of data transferred. For example, if the TCP sequence number of the initial video packet is $S_0$, the TCP sequence number of the most recently transmitted video packet n is $S_n$, and the payload length of the video packet n is $L_n$, the amount of video data transmitted can be estimated as $V_n = (S_n - S_0) + L_n$. The sequence number in a TCP segment is a 32-bit number, and it will wrap around. Every time a TCP sequence number wrap around happens, 4294967296, which is ($2^{32}$), needs to be added to $V_n$ to get the estimated amount of video data transmitted. In one aspect, TCP segment reordering issues are ignored. The sequence number of the most recently transmitted video packet is always used even if some video packets before the most recently transmitted video packet are lost. In another aspect, the TCP sequence numbers are processed so only the sequence number of a TCP segment for which there are no earlier TCP segments missing is used in estimating the amount of video data transmitted.

In alternative or additional aspects, the packet inspection module 729 may check the acknowledgment number of the TCP segments in the upstream packets 723 for the same TCP connection. The difference between the acknowledgment number in the most recent TCP segment in the upstream packets and the acknowledgment number in the initial TCP segment in the upstream packets can be used to calculate the amount of data transferred in the downstream direction for the same connection. Checking the acknowledgment number of the TCP segments in the upstream packets can be very efficient because the volume of data for the upstream packets 723 can be much less than the volume of data for the downstream packets 721. Thus, the processing effort needed to detect and parse TCP segments in the upstream packets can be much lower than for the downstream packets. Furthermore, the acknowledgment number of a TCP segment in an upstream packet is representative of the data transferred successfully to the client. Impairments, such as packet loss, are thus accounted for when acknowledgment numbers are used. Accuracy of buffer occupancy estimates may thereby be improved. For example, in a TCP connection for transmitting video packets, the first TCP ACK from the client to the server, which acknowledges the receiving of the TCP segment "SYN+ACK" from the server, has the initial acknowledgment number $AN_0$. If another TCP ACK m is received in the upstream packet, and it has acknowledgment number equal to $AN_m$, it can be known that the amount of the data that has been received successfully by the client is $V_m'=AN_m-AN_0$. The acknowledgment number in a TCP segment is a 32-bit number, and it will wrap around. Every time a TCP acknowledgment number wraps around, 4294967296, which is ($2^{32}$), needs to be added to $V_m'$ to get the estimated amount of video data transmitted. TCP ACKs may be detected and processed, for example, by the scheduler module 730 of FIG. 7A.

The packet inspection module 729 includes a buffer occupancy estimation module 728. The buffer occupancy estimation module 728 can determine parameters for estimation of client-side video buffer occupancy using information from the timing information module 727. The buffer occupancy estimation module 728 may also determine the estimation of a client-side video buffer occupancy, or may pass necessary input parameters to another module in the system for determining the estimate of client-side video buffer occupancy. The buffer occupancy estimation module 728 can operate a client video stream buffer emulator which mimics the expected behavior of video playback on the video client. The emulator may operate differently for different video clients. For example, one video client may follow the information contained within the video data to decide how to manage the initial buffering period. Another video client may decide to buffer 15 seconds worth of video data before it starts decoding and playback regardless what is suggested in the video data. The type of video client may be signaled in the request message sent from the video client to the server. In one aspect, the timing information module 727 stores the behavior of well-known video clients. The timing information module 727 may detect the video client type by inspecting the messages sent from the video client to the video server and apply the video client behavior in the operation of the emulator.

The buffer occupancy estimation module 728 includes operations similar to a video buffer model. Although the term video playback may be used, the buffer estimation may be based on when the client removes video data from a buffer for decoding. The DTS of the video delivery must be larger than or equal to the DTS of the video playback, otherwise the video decoder will have no data to decode and the video will freeze.

In an example, at time t1 the first video sample has been completely transferred to the client. The buffer occupancy estimation module 728 may estimate buffer occupancy at the current time tc when video samples with DTSs up to Td have been delivered to the client and decoding has advanced to DTS Tc, where Td and Tc are expressed as time, for example, seconds of video delivered and seconds of video decoded, respectively. The value of Td can be determined by the timing information module 727 using one or more of the methods described above.

To determine the video decoding point Tc, the buffer occupancy estimation module 728 can calculate how long the video decoding on the client has been underway. In the example mentioned above, the buffer occupancy estimation module 728 assumes the client begins decoding the video when the first video sample has been completely delivered, time t1. Accordingly, the video decoding point Tc is the difference between the current time tc and time t1. Thus, the buffer occupancy estimation module 728 can calculate the estimated buffer occupancy as BO_t=Td−(tc−t1).

This buffer occupancy may be expressed in units of time (e.g., seconds). If no more data were delivered to the client, video decoding could continue for BO_t. If the buffer occupancy BO_t is zero or negative, the buffer has underflowed and video decoding processing is disrupted and this will eventually lead to a playback freeze event. When an estimated buffer occupancy is negative, it indicates that data that should have arrived at the buffer has not yet arrived. A physical buffer will not have a negative occupancy. The buffer occupancy can be converted from time to bytes, and a table that maps data byte counts to DTS may be used for such conversion. Alternatively, the conversion to bytes may also be estimated using the average bitrate of the video. For various uses, buffer occupancy in terms of time or bytes may be preferred.

In an aspect, buffer occupancy estimation module 728 may use another method to estimate buffer occupancy. In this example, at current time tc', video samples of DTSs up to Td' have been delivered to the client and video decoding has advanced to DTS Tc'. The value of Td can be determined as described for the first method. To determine the video decoding point Tc', the buffer occupancy estimation module 728 determines how long the video decoding process has been underway. In this method, the buffer occupancy estimation module 728 uses an initial buffer delay d0' to determine when the video decoding process is started. The timing information module 727 can determine the initial buffer delay d0' from the video stream parameters or from the client type, if the client type can be detected and its behavior is known to the timing information module 727. Since delivery of the video data started at time t0, the video decoding process started at time t0+d0. Accordingly, the time Tc' is the difference between the current time tc' and the decoding start time t0'+d0'. Thus, the buffer occupancy estimation module 728 can calculate the estimated buffer occupancy as BO_t'=Td'−(tc'−(t0'+d0')).

In yet another aspect, the buffer occupancy estimation module 728 may use a third method to estimate buffer occupancy, in which it is assumed that video data is delivered at a constant rate which may be an average rate. The buffer occupancy method of this third example is similar to the second method described above and determines the video decoding point Tc in the same way. The method of this third example estimates that video samples of DTSs up to Td" from the amount of data delivered. The DTS Td" can be calculated as Td"=D/R, where D is the amount of data delivered and R is the assumed constant video data rate. Thus, the buffer occupancy estimation module 728 can calculate the estimated buffer occupancy as BO_t"=Td"−(tc"−(t0"+d0")). The amount of data delivered to the client may be determined by the timing information module 727 as described above.

The above methods for estimating buffer occupancies produce estimates that may include errors in the information used. For example, an error in the initial buffer delay used can result in a corresponding error in the buffer occupancy estimate. Accordingly, the packet inspection module 729 may incorporate information from sources other than the video data (e.g., information about the client, information about the hardware used by the client, information about the user, and historical information) to determine the initial buffer delay. The buffer occupancy estimation module 728 may also adjust the video decoding point Tc to take into account playback freezes previously predicted by the estimated buffer occupancy.

The packet inspection module 729 may interact with a congestion monitoring module, such as congestion monitoring module 782 of FIG. 7A. The congestion monitoring module 782 analyzes estimated buffer occupancies from the buffer occupancy estimation module 728 to detect traffic congestion. Information about congestion can be used, for example, by other modules to adjust operation of the network node. Congestion is generally indicated when an estimated buffer occupancy is below a threshold level. The threshold level can be chosen to allow for processing and transport time necessary to adjust operation, for example the threshold value can take into consideration TCP packet transport, radio access network transport, or buffer occupancy estimation calculation time.

The congestion monitoring module 782 may use other information as well to detect congestion. For example, congestion evaluation may also use other information, such as the status of resources at the network node in which the packet inspection module 729 operates. When the estimated buffer occupancy in a client device is zero but the associated network node has no data to transmit to the client device, the congestion monitoring module 782 may determine that the traffic from the network node to the client device is not congested and that congestion exists upstream of the network node. Alternatively, congestion monitoring module 782 may compare the DTS of the most recent video sample to arrive at the network node from the video server, Td(arrive) and compare it to the estimated playback point of the video client, Tc. If Tc>Td(arrive), the congestion monitoring module 782 may conclude that congestion is occurring upstream of the network node. In these cases, the admission control response module 783 of FIG. 7A may send a message containing the video client's estimated buffer occupancy and information related to the network node's local buffer occupancy to one or more upstream nodes.

The congestion monitoring module 782 may use the buffer occupancy estimates to calculate performance metrics. Example metrics include a time-average buffer occupancy. On a per-session basis, the congestion monitoring module 782 may average the buffer occupancy estimates over some period of time, which may be an entire video session. Another example metric is the elapsed time of video freezes. The congestion monitoring module 782 may run a timer when the buffer occupancy estimate is below a threshold (e.g., zero) to generate a metric indicating the duration of video freezes. The metric may converted to a percentage by dividing the duration of video freezes by a total session time. Another example metric is a histogram of video freeze durations. The congestion monitoring module 782 may run a timer for each time the buffer occupancy estimate falls below a threshold, and then combine the duration times in a histogram. The histogram metric may be used, for example, as an input to a video mean opinion score (VMOS) estimate, for example, as described in ITU-T J.247 Annex C. Other metrics may also be calculated. The metrics can be aggregated, for example, to form a per-bearer, per-user, per-cell, or per-network quality metric. The aggregated metrics can be both on an instantaneous basis and over various time intervals.

The performance metrics derived from the buffer occupancy estimates may be used in various ways. The packet inspection module 729 may, for example, transmit the metric to a server that manages the network operations. The server could, for example, be in a core network or could be a cloud-based server. The server could aggregate metrics from multiple access nodes. The metrics may be compared to a threshold level. When the comparison indicates problematic network performance, an alarm may be sent to the network operator. The alarm may be generated, for example, local to a network node that includes the packet inspection module 729 or at a server that aggregates metrics from multiple network nodes. Alternatively or in addition, the metrics may be sent to the originating video server in support of dynamic adaptation methods such as rate throttling and traffic shaping which may be used to alleviate temporary network congestion. The metrics may be further analyzed to assess chronic performance problems. The analysis can be used to determine potential areas for network capacity enhancements. The analysis can also be used to evaluate compliance to or violations of service level agreements. The service level agreements may be, for example, with end users or over-the-top (OTT) service providers (e.g., a carrier may commit to meeting a certain quality level for particular types of video sessions).

The packet inspection module 729 may also interact with an admission control response module 783 which may receive information about congestion from the congestion monitoring module 782 and can include the congestion information in control responses for the network node the packet inspection module 729 serves. The admission control response module 783 may also receive the estimated buffer occupancy information. The control responses can adjust scheduling parameters to enhance users' QoE, as discussed in more detail below. For example, when a video client's estimated buffer occupancy is below a low threshold, scheduling priority for packets to be transmitted to the client, or scheduling resources allocated to the video stream through the use of scheduling parameters, weights or credits, can be increased. When the video client's estimated buffer occupancy is above a high threshold, scheduling priority for packets to be transmitted to the client or scheduling resources can be decreased. The packet inspection module 729 may establish a piece-wise linear relationship between scheduling priority (or an application factor used in determining scheduling priority or scheduling resource allocation) and estimated buffer occupancy. Other mathematical relationships between estimated buffer occupancy and scheduling priority or resource allocation may be used.

The packet inspection module 729 may send an indication of congestion to a video client. In response to the congestion indication, the video client may reduce the rate of data it requests thereby reducing congestion. For example, based upon estimated buffer occupancy, the packet inspection module 729 may create a control response resulting in the setting of the two Explicit Congestion Notification (ECN) bits in IP packets to a value indicating congestion. The control response indicating congestion can trigger the video client to effect a video codec rate reduction. The use of ECN bits in IP packets is described in IETF RFC 3168 (09/2001): "The Addition of Explicit Congestion Notification (ECN) to IP."

Figure 8:
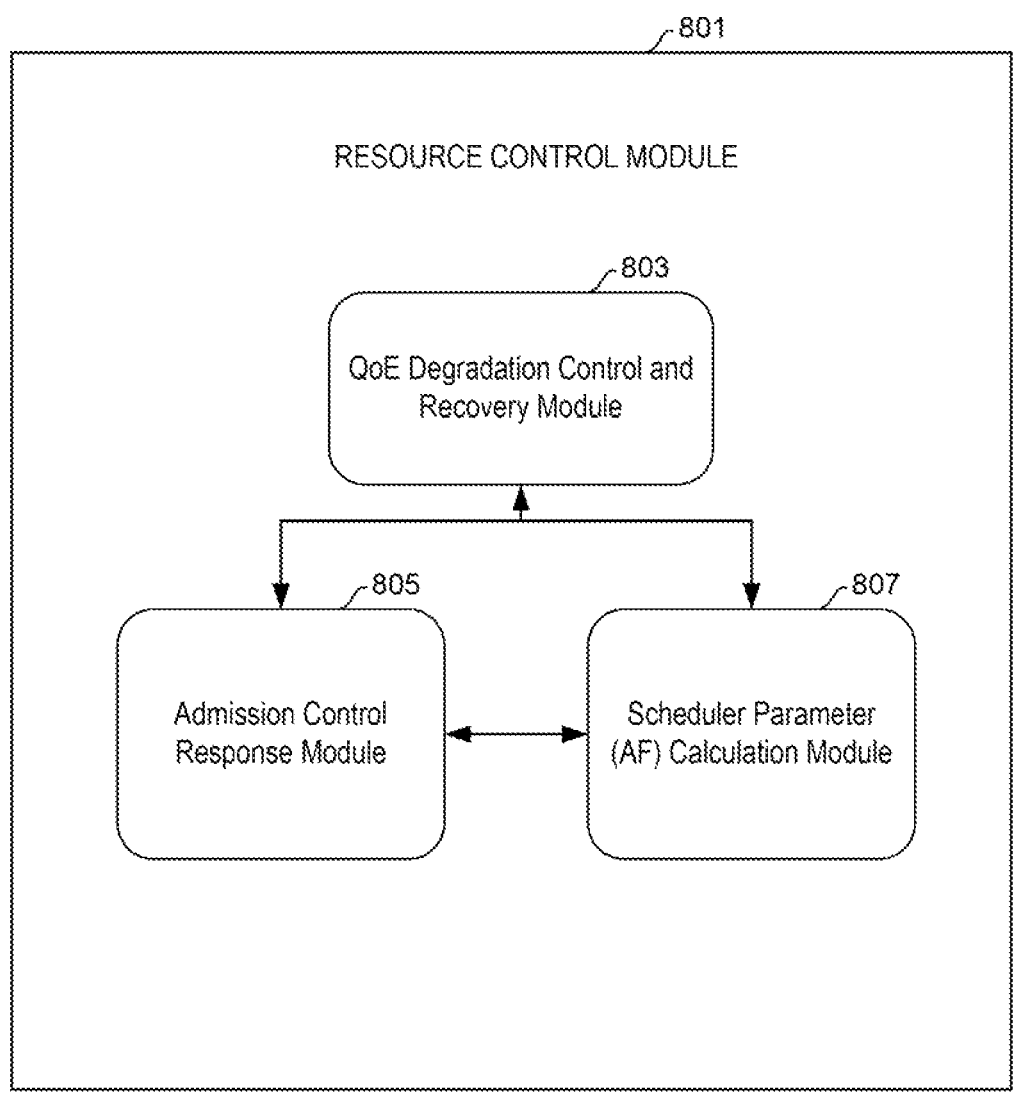
FIG. 8 is a block diagram of a resource control module in accordance with aspects of the invention.

FIG. 7A illustrates a particular allocation of functions to various modules and a particular distribution of modules in various communication nodes. It should be appreciated that many other arrangements for such functionality may also be used. For example, some modules or parts of modules can be distributed differently within the access node, or may be distributed to different nodes. For example, some modules of FIG. 7A, except the admission control response module 783, may be located in a core based gateway, such as an LTE serving gateway (S-GW), and the admission control response module 783 may be located in an eNB served by the S-GW. In addition, the gateway from the example above may serve one or more eNBs. That is, the modules in FIG. 7A, except for the admission control response module 783, may perform functions in support of video streams transported to one or more eNB. Alternatively, all modules including the admission control response module 783 may be located in a core based gateway with control responses transmitted to one or more access nodes. The illustrated modules of FIG. 7A may also provide additional functions. Although modules of the packet inspection module 729 may be described herein regarding a single video session, they may analyze multiple video sessions or multiple types of data concurrently. FIG. 8 is a block diagram depicting the interaction of various modules within resource control module 801 for operation in a QoE degradation control state and a QoE recovery state according to aspects of the invention. Resource control module 801 can be implemented in an access node, such as resource control module 780 in access node 775 of FIG. 7A, or resource control module 801 can be implemented in gateway or other network device in communication with an access node.

The modules shown in resource control module 801 of FIG. 8 include QoE degradation control and recovery module 803, admission control response module 805 and scheduler parameter calculation module 807. Although resource control module 801 can include other modules, such as those shown in FIG. 7A, the purpose of FIG. 8 is to show the mutual interaction between all three of the aforementioned modules in an aspect of the invention when operating in a QoE degradation control state and a QoE recovery state according to aspects of the invention as described further herein. In aspects of the invention, QoE degradation control and recovery module 803 oversees the entry into and exit of different QoE video stream degradation operation states including a QoE degradation control state and a QoE recovery state.

For example, in an aspect of the invention, when QoE degradation control and recovery module 803 operates in a QoE degradation control state it coordinates closely with scheduler parameter calculation module 807 to manage the scheduling of radio resources of an access node for multiple existing video stream sessions in order to maximize an overall QoE parameter, such as a video quality metric or other criteria, in a congested state. In another example in an aspect of the invention, when QoE degradation control and recovery module 803 operates in a QoE recovery state it coordinates closely with admission control response module 805 to determine whether or not to accept requests for new video streaming sessions.

As mentioned above, QoE degradation control and recovery module 803 oversees the entry into and exit from different states including a QoE degradation control state and a QoE recovery state, according to aspects of the invention.

In an aspect of the invention, the aforementioned operational states operate in a video streaming environment in which a wireless communication system accommodates multiple mobile users of terminal nodes (UEs), and each user can be viewing one or more video streams. In addition to viewing video streams, users can be downloading other types of traffic which may not be as time or latency sensitive (such as HTTP data generated by web page browsing, FTP data and email). In some aspects, the QoE degradation control and QoE recovery algorithms discussed herein are applied to the subset of sessions carrying video streams and may be a part of higher scope algorithms that handle different types of traffic as well as management of resources on a connection and user level. The different video streams are transported over logical network connections. For example, in an LTE network, video streams may be transported using either GBR bearers (Guaranteed Bit Rate) with different GBR values, or with non-GBR bearers, such as a Best Effort connection with or without a rate cap, such as an AMBR (aggregate maximum bitrate). The videos being streamed may be of different bit rates, different resolutions or different encodings. In addition, the video clip durations for content being viewed by different users may be different, and may also have different start and end times. The aforementioned streamed videos can be transferred using an HTTP Progressive Download method as a single file with fixed bit rate encoding throughout the video clip, or using an adaptive streaming method, such as DASH, in which the client can change its requested representation, and hence the required bit rate, from segment to segment, wherein a video segment is defined as the video content of a selected duration of time. An example of an adaptive streaming method is described above with regard to FIG. 5. The video representation, and thus the encoded bit rate, is client selected. In case of fixed bit rate streaming in aspects of the invention, a video quality metric (VQM) may be calculated in reference to a perfect transmission using the selected source coding. In other words, if there are two video streams of different source coding, and hence different original qualities, running on a non-congested channel, they may both get the same VQM value, even though the source quality of one video stream is superior to the other video stream. In the case of the adaptive HTTP streaming (such as DASH), a VQM may be affected by the client selecting a lower representation due to congestion.

It should be appreciated that aspects of the invention described herein for operation of the QoE degradation control state and the QoE recovery state are not limited to a specific video quality metric (VQM) calculation algorithm, but may be implemented based on one of multiple VQM calculation algorithms in which the resultant VQM value correlates well with the user's satisfaction with the received video quality. In this regard, the VQM value as used herein may be considered to be a measure of the user "happiness" or "satisfaction" with the received video quality.

In an aspect, the access node operates in a QoE degradation control state when the access node determines that an overall QoE parameter, such as a video quality metric, for multiple video streaming sessions has dropped below a quality threshold level. The QoE degradation control state operates to adjust scheduling parameters for one or more video streams which may result in an increase or decrease to their respective QoE (such as allowing video freezing/skipping) in order to maximize an overall QoE parameter of all video streams. In other words, QoE degradation control state operates in a state of resource congestion that impacts QoE of video streams so as to distribute QoE degradation among the existing video streams in a manner that maintains an overall user satisfaction level (QoE over all existing video streams supported by the access node) as high as possible. In aspects of the invention, the QoE degradation control state implements these goals by using a video quality metric (VQM) as a measure of QoE, wherein the VQM is used to determine scheduling parameters, such as application factors, weights, credits, etc., to apply during the scheduling of radio resources for the video streams.

In an aspect, the access node operates in a QoE recovery state when the access node determines that a QoE parameter, such as a video quality metric, for its served video streaming sessions has fallen below a minimum acceptable level. The QoE parameter may be based on just one of the video streams, or on at least some of the video streams. In other words, the resource congestion has increased to the extent that it is not possible to distribute QoE degradation among the existing video streams in a manner that will maintain overall user satisfaction level above a minimum acceptable level for all users. The QoE recovery state operates to select one or more video streams for application of a load reduction action (such as video bit rate modification, or termination) to decrease the overall video resource load so that the remaining video streams can continue in a manner that maintains an overall user satisfaction level above the minimum acceptable level.

As described above with respect to the QoE degradation control state, a VQM (among other factors) may be used as the QoE parameter or metric in the QoE recovery state. It should be appreciated that some aspects and functionality of the QoE recovery state and the QoE degradation control state may be conducted each of the other states, respectively, as needed in order to maximize the QoE within that particular state. Also, in an aspect, the QoE recovery state can be triggered before the overall QoE falls below acceptable levels.

In aspects of the invention, the QoE degradation control state is entered into, and exited from, according to an overall QoE metric, such as a cell-wide (across the access node) VQM value. As congestion increases, the access node (cell) may enter the QoE degradation control state. Likewise, as the system is recovering from resource congestion, it will exit from the QoE degradation control state. One or more thresholds may be established using this cell-wide QoE metric to define the state entry and exit conditions.

In an aspect, the VQM for each running video stream may be measured continuously and the average VQM of all video streams across the access node (cell) is calculated. When the system is in a normal operating state, the average VQM should be high (at or close to a maximum value). If the average VQM goes below a predetermined entrance threshold for a proofing period, the system then transitions to the QoE degradation control state. In another aspect, the VQM for each running video stream may be measured continuously and, if one of the video stream VQM values goes below a predetermined entrance threshold for a proofing period, the system then transitions to the QoE degradation control state.

The system exits the QoE degradation control state and returns to the QoE degradation avoidance state when the average VQM goes above an exit threshold for a proofing period. The entrance and exit thresholds may be set to different values in order to build hysteresis into the system.

Similarly, in aspects of the invention, the QoE recovery state is entered into, and exited from, according to an overall QoE metric, such as a cell-wide (across the access node) average VQM value. As congestion increases, the access node (cell) may enter the QoE recovery state when the existing multiple video streams cannot be maintained with the overall QoE metric (VQM value) above a minimum acceptable threshold (L). Likewise, as the system recovers to a less severe state of resource congestion, it will revert back to the QoE degradation control state. One or more thresholds may be established using this cell-wide QoE metric to define the state entry and exit conditions for this state.

In the an aspect, when operating in the QoE degradation control state, and one (or more) video streams have a VQM below the minimum acceptable threshold (L) for a time period more than a certain time interval (T), then entry into the QoE recovery state is triggered. Setting the level "L" is a one way to adjust whether the QoE recovery state is proactive or reactive. In this regard, if "L" is set to be at the level of unacceptable QoE, then the QoE recovery state will start operation in reaction to the problem. If however, "L" is set higher than the unacceptable level, then the QoE recovery state is triggered before reaching unacceptable quality levels.

There can be multiple levels set to combine the reactive response with the proactive response. A trigger of a higher threshold level starts the proactive response and the QoE recovery state runs in a less aggressive manner. If the quality continues to degrade and the second threshold (lower VQM) is reached, then the QoE recovery state operates in a reactive manner and acts more aggressively by selecting load reduction actions that have a greater impact to reduce the required resource load for the multiple video streams. The period "T" is a proofing period to make sure that a transient drop in VQM does not unnecessarily trigger the QoE recovery state.

Other VQM-based trigger conditions for entry into and exit from the QoE recovery state are possible, such as:

when the VQM of a single video stream crosses a threshold;

when a number of video streams or a percentage of the total number of video streams running on the base station all have VQMs which cross a threshold;

when the average VQM among all the video streams, or the average on a subset of the video streams (e.g. an average across the "N" lowest VQM video streams) crosses a threshold;

when a weighted average of VQM (all or lowest "N") crosses a threshold. The weights can be based on the user's service level agreement (SLA) or policy. For example, a "gold" user with a high SLA will have a stronger effect to trigger the system to enter the QoE recovery state. Or, in another aspect, the user's SLA will influence the value of the threshold to be used to evaluate this user's video stream. In this manner, a custom threshold value is set per user or per SLA; and a cost function can be utilized which is based on a plurality of the above factors, and with each factor being weighted, for example, by the user's SLA, and the cost function result can be compared with a predefined threshold.

Figure 9:
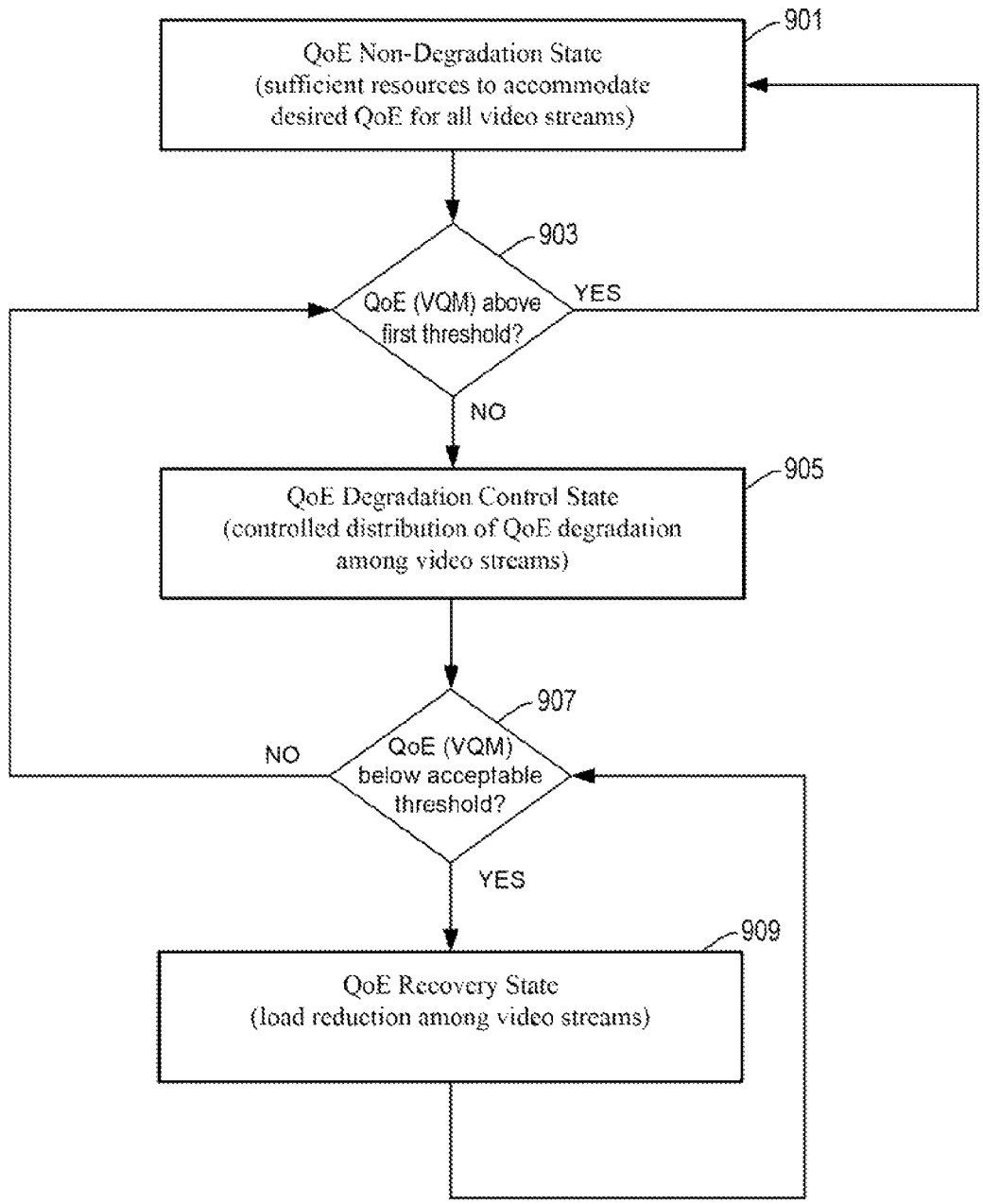
FIG. 9 is a flowchart illustrating an entry and exit scheme for a video streaming degradation control state and a video streaming recovery state in accordance with aspects of the invention.

FIG. 9 is a flowchart that illustrates an entry and exit scheme for the QoE degradation control state and the QoE recovery state in accordance with aspects of the invention. In step 901 of FIG. 9, the access node operates in a QoE non-degradation state when all existing video streams can be maintained at a desired QoE level, which may be represented by a threshold VQM value. In step 903 the access node determines if the multiple existing video streams can be maintained with a QoE parameter, such as a VQM value, above a first threshold level. If the answer is Yes, then the access node stays in the QoE non-degradation state 901. If the answer is No, then the access node enters the QoE degradation control state in step 905 in which QoE degradation is distributed among the multiple existing video streams in a way to maximize the overall QoE (cell based) of all video streams. In an aspect, the access node may wait to enter the QoE degradation control state in step 905 until the QoE parameter is below the first threshold level for a proofing time period in step 903.

In step 907 it is determined if congestion has increased such that the QoE level of multiple existing video streams, such as a VQM value, is below a second threshold level. The second threshold level is lower than the first threshold level. In this regard, the first threshold level is considered to be a QoE level below which the QoE is less than the desirable QoE level, and the second threshold value is considered to be a QoE level below which the QoE is not acceptable. If the answer in step 907 is Yes, then the access node moves to the QoE recovery state 909. If the answer is No, then the access node reverts to step 903 to determine whether to go back to the QoE non-degradation state 901 or to stay in the QoE degradation control state 905. In QoE recovery state 909, the process continuously goes to step 907 to determine whether to exit the QoE recovery state 909. In an aspect, the access node may wait to enter the QoE recovery state 909 until the QoE parameter is below the second threshold level for a proofing time period in step 907. In an aspect, a different QoE threshold may be used in step 903 to determine whether to exit the QoE degradation control state 905. For example, the access node may not exit the QoE degradation control state 905 until the QoE level is above a third threshold in step 903, wherein the third threshold is higher than the first threshold. In an aspect, a different QoE threshold may be used in step 907 to determine whether to exit the QoE recovery state 909. For example, the access node may not exit the QoE recovery state 909 until the QoE level is above a fourth threshold in step 907, wherein the fourth threshold is higher than the second threshold.

As mentioned above, it should be appreciated that the state management scheme illustrated in FIG. 9 is exemplary and that other state management schemes and variations may be implemented consistent with aspects of the invention. In this regard, methods, functions and actions of one of the QoE degradation control state 905 and the QoE recovery state 909 may be utilized in the other state as necessary in order to maximize QoE within that state, respectively. For example, some of the video streams supported by the access node may be the subject of load reduction actions during operation of the QoE degradation control state. Similarly, some of the video streams may have adjusted scheduling parameters, such as application factors, weights, credits, priorities, etc. during operation of the QoE recovery state.

Figure 10:
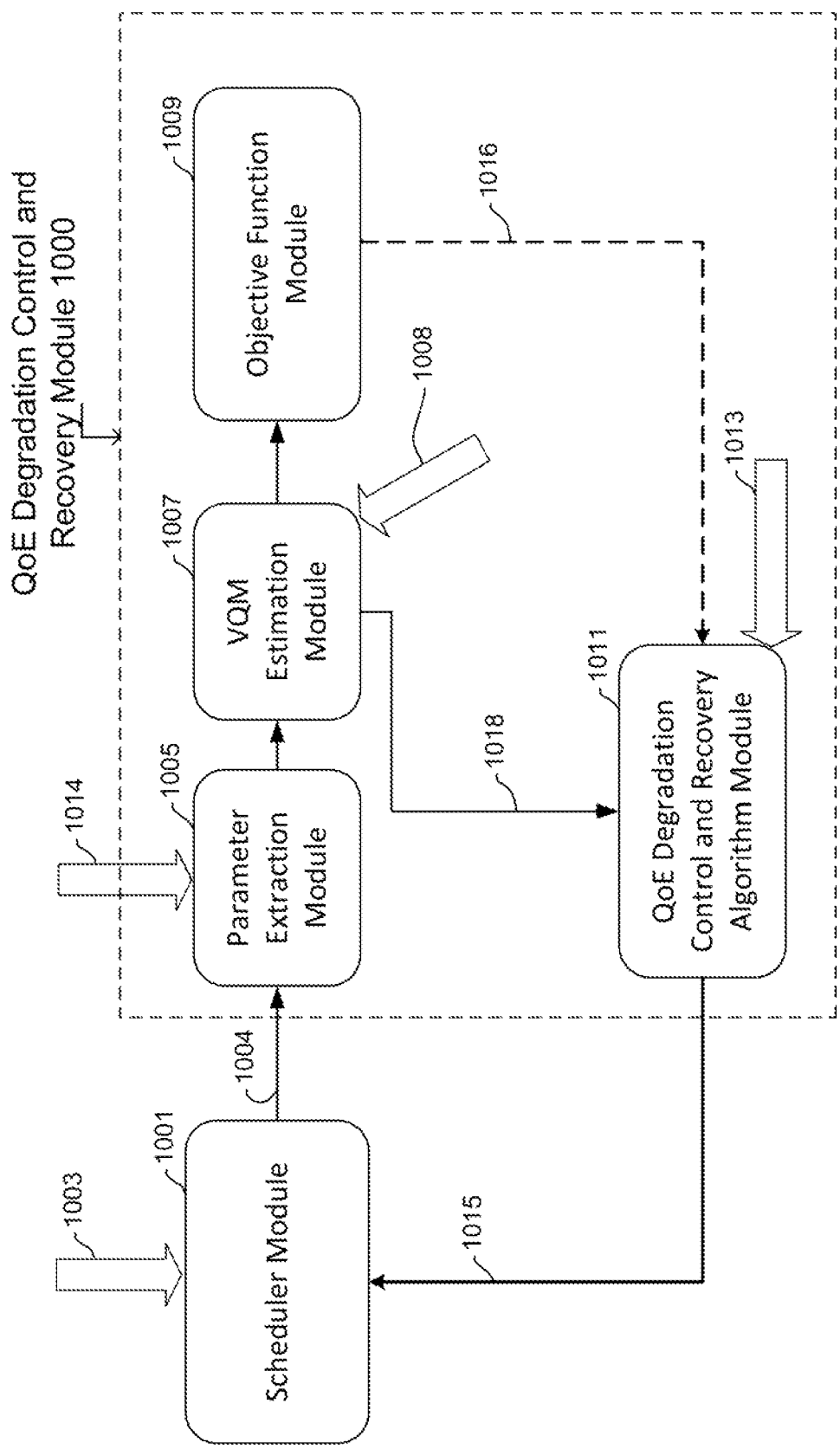
FIG. 10 is a block diagram illustrating a quality of experience video streaming degradation control and recovery module in accordance with aspects of the invention.

FIG. 10 is a block diagram illustrating a QoE degradation control and recovery module that may be implemented in an access node, or other network device, in accordance with aspects of the invention. As seen in FIG. 10, scheduler module 1001 is a MAC scheduler responsible for managing the radio resource allocations for all the traffic streams (including video, voice, data, etc.) between the access node and one or more terminal nodes (UEs) in a wireless network environment. In an aspect, traffic streams for scheduling are included in arrow 1003 of FIG. 10. Scheduler module 1001 has different factors that affect its function, some of which may be set by a management interface, such as the quality of service (QoS) and the service level agreement (SLA) parameters for different terminal nodes, connections, or bearers. Other scheduler factors are external factors (included in input 1003) including the channel variations, packet arrival times and sizes, transmission errors, and MCS assignment for all terminal nodes, etc. Scheduler module 1001 may assign weights, credits, debits or priorities for each connection such that resources are allocated based on the different factors. In aspects of the invention, QoE degradation control and recovery algorithm module 1011 manipulates the weights, credits, debits or priorities using, for example application factors (AFs) and forwards them to scheduler module 1001 (represented by arrow 1015), upon which scheduler module 1001 uses the AFs to adjust the distribution of weights, credits or debits associated with different data traffic streams for scheduling of radio resources to the different bearers/connections carrying the data traffic streams.

QoE degradation control and recovery module 1000 is shown in FIG. 10 as a dashed box, and encompasses the functionality associated with blocks shown therein. QoE degradation control and recovery module 1000 may be provided in a resource control module within an access node, such as resource control module 780 of FIG. 7A, and it may have access to and communication with all other functional blocks within the access node (such as those shown in FIG. 7A) to perform its functions.

Figure 12:
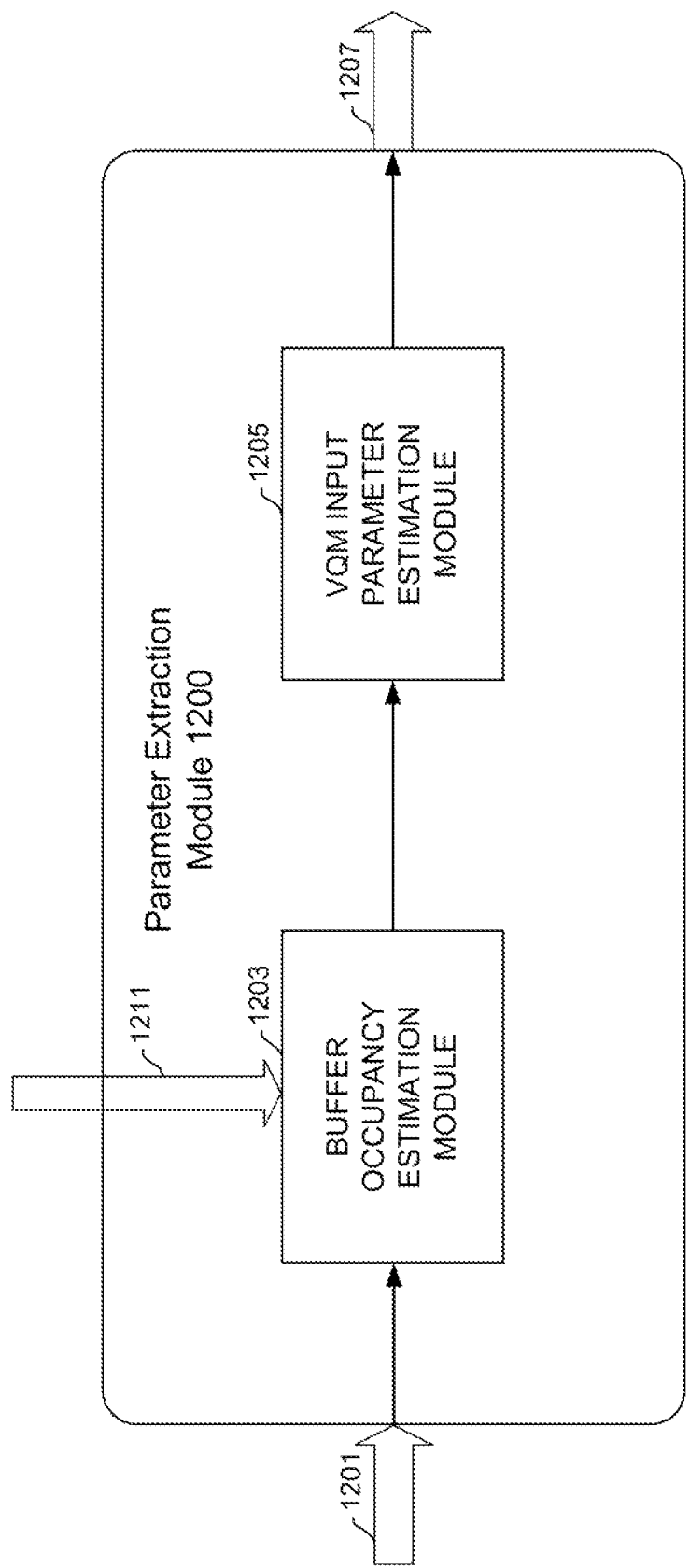
FIG. 12 is a block diagram illustrating a parameters extraction module in accordance with aspects of the invention.

Based on the operation of scheduler module 1001, radio resources are assigned for the different bearers/connections which result in bytes served for each bearer carrying a video stream. This "bytes served" parameter is passed, along with possibly other information such as packet delivery times, from the scheduler (represented by arrow 1004) to parameter extraction module 1005. Parameter extraction module 1005 uses the bytes served parameter and other scheduler information to calculate an estimate of the various video quality metric (VQM) input parameters needed by VQM estimation module 1007 to calculate VQM values. In this regard, parameter extraction module 1005 may perform packet inspection techniques on the traffic streams scheduled by scheduler module 1001 to be sent to the various terminal nodes (UEs) to obtain or calculate other relevant information related to each traffic stream. For example, in the case of video streaming, the packet inspection techniques can be used to obtain or calculate video stream characteristics, such as what kind of video content is being transferred, such as a live broadcast or an on-demand content, and such as the video bit rate, the remaining playback time, video representation, manifest information, etc. In alternative aspects, some or all of the aforementioned relevant information may be obtained from external modules, such as from packet inspection module 729 of FIG. 7A, as represented by arrow 1014. Such information is used by parameter extraction module 1005 to provide the different VQM input parameters needed by VQM estimation module 1007. The parameters provided by parameter extraction module 1005 depend on the needs of the particular VQM estimation technique that is utilized in VQM estimation module 1007. In this regard, it should be appreciated that one of several known VQM estimation techniques may be used in VQM estimation module 1007. In an aspect, a more detailed example of parameter extraction module 1005 is shown in FIG. 12, as discussed further herein.

Examples of such VQM estimation techniques are provided in the following references: [1] Guraya, Fahad Fazal Elahi, et al, "A non-reference Perceptual Quality Metric based on Visual Attention model for Videos," 10th International Conference on Information Sciences Signal Processing and their Applications (ISSPA), 2010; [2] Winkler, Stefan; Sharma, Animesh; and McNally, David: "Perceptual Video Quality and Blockiness Metrics for Multimedia Streaming Applications," Proceedings of the International Symposium on Wireless Personal Multimedia Communications, 2001; and [3] "Objective perceptual multimedia video quality measurement in the presence of a full reference" ITU Standard J.247, which are incorporated by reference herein in their entirety.

VQM estimation module 1007 determines VQM value(s) associated with the various video streams based on the different VQM input parameters provided by parameter extraction module 1005, as well as other input information shown by arrow 1008. VQM estimation module 1007 provides the determined VQM value(s), to objective function module 1009, which calculates the objective function that the system is directed to maximize (or improve). In an aspect, VQM estimation module 1007 may also provide additional video metrics and related information to objective function module 1009. In the system of FIG. 10, the resulting parameter(s) calculated by the objective function module 1009 are provided as an input (see dashed arrow 1016) to QoE degradation and recovery algorithm module 1011 for use during a tuning process to adjust function parameters used in the QoE degradation control state. VQM estimation module 1007 also provides the determined VQM values directly to QoE degradation and recovery algorithm module 1011, as shown by arrow 1018. QoE degradation and recovery algorithm module 1011 uses the VQM values, as well as other metrics and information (represented by arrow 1013), to readjust scheduling parameters (e.g. a set of application factors (AFs)) that are then provided (shown by arrow 1015) to scheduler module 1001. As mentioned above, scheduler module uses the scheduling parameters, which may be in the form of weights, credits, debits, AFs, etc., to adjust the allocation of network resources to each of the video streams being served by the access node.

Figure 14:
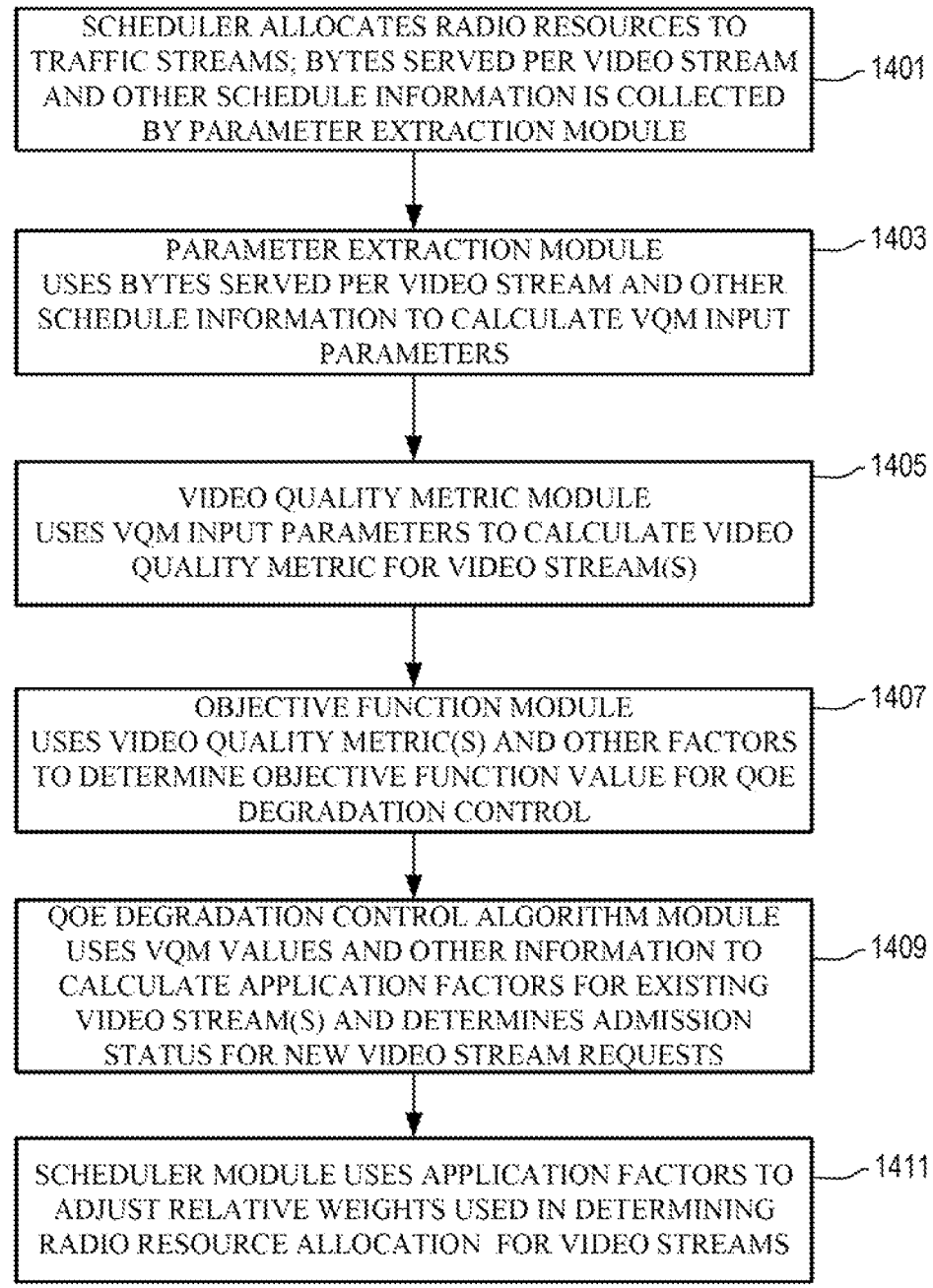
FIG. 14 is a flowchart illustrating functional steps for quality of experience video streaming degradation control and recovery in accordance with aspects of the invention.

FIG. 14 is a flowchart illustrating functional steps for QoE degradation control in accordance with aspects of the invention. In step 1401, the scheduler module 1001 allocates radio resources to the various traffic streams, and "bytes served" per video stream and other relevant traffic schedule information 1004, such as packet delivery times and other scheduler statistics and information, may be collected by, or passed to, the parameter extraction module 1005. In step 1403, parameter extraction module 1005 uses the "bytes served" per video stream and other relevant traffic schedule information to calculate VQM input parameters. Next, the VQM estimation module 1007 uses the VQM input parameters and other input information 1008 to calculate a VQM value for the video stream(s) in step 1405.

In step 1407, the objective function module 1009 uses the VQM values and other factors to determine an objective function value for QoE degradation control, which may be used in a tuning process by QoE degradation control and recovery algorithm module in the QoE degradation control state. In step 1409, QoE degradation control and recovery algorithm module 1011 uses VQM values and other information 1013 to calculate scheduling parameters such as an application factor (AF) for each of the existing video stream and also determines admission status for new video stream requests. In this regard, in an aspect, QoE degradation control and recovery algorithm module 1011 may communicate and coordinate with other modules, such as admission control response module 783 of FIG. 7A to determine and control admission status of new video stream requests during the QoE degradation control state. Then, in step 1411, scheduler module 1001 uses, for example, application factors (AFs) to adjust relative weights used in determining radio resource allocation for each of the video streams being serviced by the access node. In this manner, VQM values are used to predict QoE for users of the video streams at their respective terminal nodes (UEs), and are used to drive the allocation of radio resources for the plurality of video streams in a manner that maximizes an overall QoE (VQM) metric.

In an exemplary aspect, parameter extraction module 1005 and VQM estimation module 1007 are designed to support a specific VQM estimation technique known as the Psytechnics full reference model, described more fully in the above-cited "Objective perceptual multimedia video quality measurement in the presence of a full reference" ITU Standard J.247 (hereinafter referred to as the "Psytechnics model"). The version of the Psytechnics full reference model used in this example is modified as follows:

- The VQM estimation is focused on the temporal impairments in the video stream and not on the spatial impairments. This is achieved by only focusing on frame freezing and frame skipping inputs for the VQM estimation.
- The VQM estimation is modified to work in a real-time (online) manner rather than in a batch fashion (as it is described in the cited Psytechnics model). This is achieved by using a sliding time window and estimating the VQM value based on input parameters determined within the window, then sliding the time window and re-estimating the VQM value. For example, the window may slide every time video frames are scheduled for delivery to the terminal node (UE) receiving the video stream.

Further to the exemplary aspect described above, the VQM estimation module 1007 uses the modified Psytechnics model to calculate a VQM value, in which case the VQM estimation module 1007 requires at least two input parameters, the frame freezing incidents and the frame skipping incidents of the video stream. These two input parameters are estimated and provided by the parameter extraction module 1005 of FIG. 10. In this exemplary aspect, the estimation of those two VQM input parameters is performed in two stages.

FIG. 12 shows the two stages of a parameter extraction module 1200 in more detail. As seen in FIG. 12, parameter extraction module 1200 is comprised of two modules: a buffer occupancy estimation module 1203 and a VQM input parameter estimation module 1205. In an aspect, as described above with respect to FIG. 10, buffer occupancy estimation module 1203 may use packet inspection techniques to inspect the scheduled video stream packets in order to collect video stream characteristics and determine an estimated client-side buffer occupancy (BO) value. Such packet inspection techniques are described in detail above with regard to FIGS. 7A and 7B. In an alternate aspect, some or all of the video stream characteristics may be provided to buffer occupancy estimation module 1203 from an external module (shown by arrow 1211), such as from packet inspection module 729 of FIG. 7A.

The VQM input parameter estimation module 1205 uses this BO value to estimate both the buffer freezing incidents and the buffer skipping incidents occurring in the video stream, which are required inputs for the VQM estimation module 1007. These incidents are identified in terms of a starting point and a duration of the skipping frames and the freezing frames. The starting point and duration may be expressed in terms of at least one of time and frame number. The algorithm of this stage is based on assumption about the video client's (at the receiving terminal node) behavior upon its video stream playback experiencing a video buffer underflow (buffer occupancy estimate equals, or is below, zero).

Some video clients may stall (or freeze playback) until they build some depth for their buffer and then resume playback. This prevents the loss of any frames but incurs delays. The resulted playback duration ends up being longer than the original video. In this case, no skipped frames are identified and only frame freezing occurs. For example, the YouTube video player, used for on demand video playback, uses this technique.

Other video clients maintain the same video duration and the stalled frames are followed by some "skipped frames" so that the video playback can catch up with the original video source. The playback duration remains the same as the original video. This technique is typically used for streaming of live events or streaming using UDP transport protocol. This is the type of video client behavior that will be used in this example.

Packet inspection techniques conducted by buffer occupancy estimation module 1203, or by packet inspection module 729, in the access node can detect the characteristics of the scheduled video streams being played and their related transport protocol, and hence can predict the expected video client playback behavior at the terminal node. For example, if UDP is used, or if the video stream is determined to be part of a live event, the latter video client behavior described in the above paragraph ("frame skipping" is assumed. For example, a live event type of video stream can be detected by inspection of the MPD/Manifest file associated with the video stream.

For video streams associated with clients exhibiting the latter playback style (i.e. a frame skipping behavior), the frame freezing incidents and skipping incidents estimates are calculated as follows:
 a. An estimate for the BO estimate is calculated by buffer occupancy estimation module 1203, and passed to the VQM input parameter estimation module 1205.
 b. VQM input parameter estimation module 1205 determines the timing and duration of freeze frames based on the BO estimate as described in more detail below.

Figure 13:
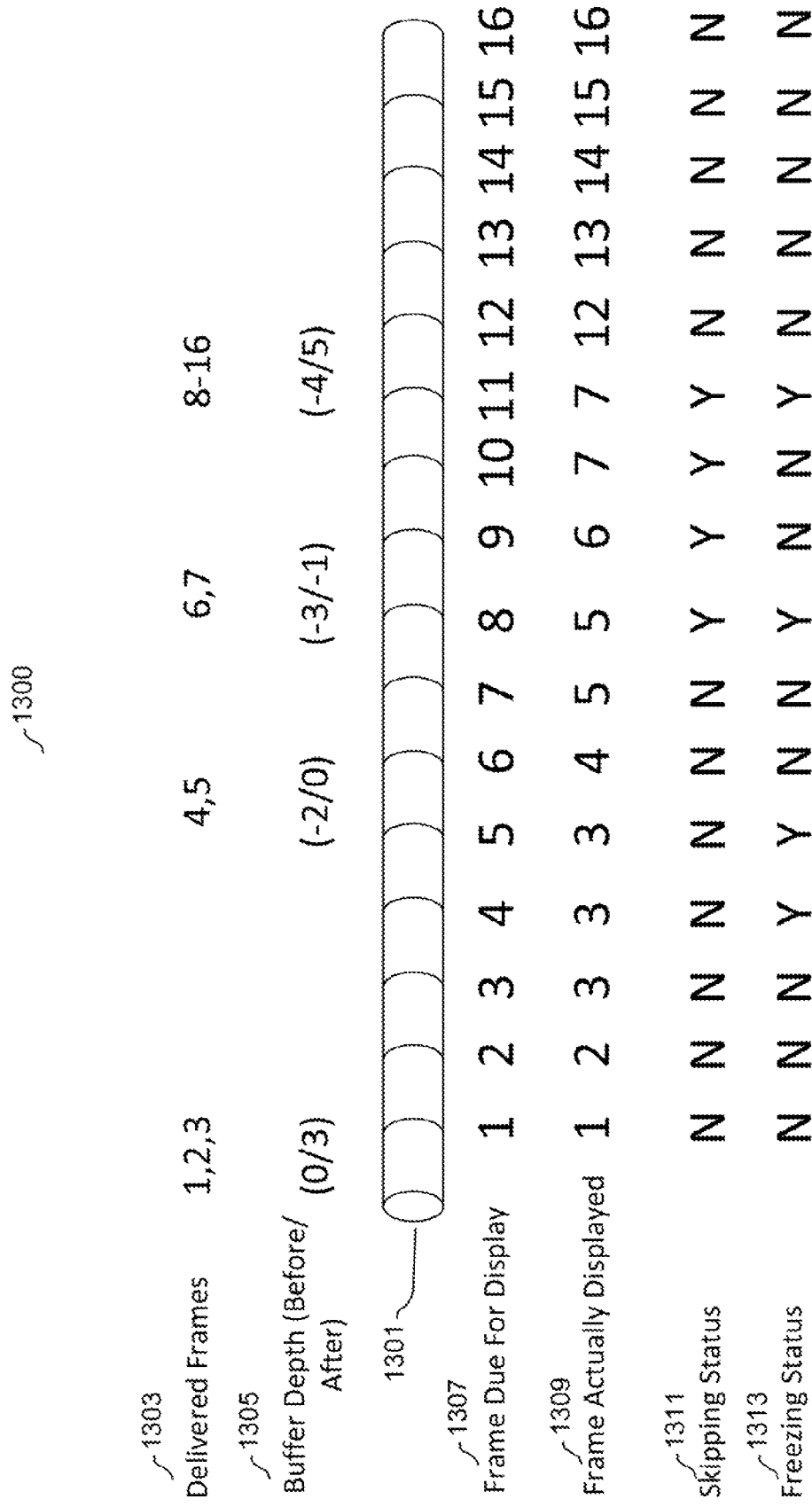
FIG. 13 is a diagram illustrating the function of a video quality metric input parameter estimation module in accordance with aspects of the invention.

FIG. 13 shows an example of the above described behavior based on a set of 16 video frames due for display 1307 across 16 time slots 1301, as follows:
 Frames (1, 2, 3) have been delivered (1303) to the UE at time slot 0, and the playback buffer size is incremented from zero to 3. Hence these frames are expected to be actually displayed (1309) in their proper time (Actual Display=Due For Display).
 Frames (4, 5) have been delivered (1303) late by 2 frames. Hence frame 3 is expected to be frozen (1303) for 2 timeslots beyond its play timeslot.
 Just prior to the delivery of frames (4, 5) the BO is equal to (−2) and once the frames are delivered, BO is incremented to zero. Frames (4, 5) are to be actually displayed (1309) later than their planned time.
 Frames (6, 7) have also been delivered (1303) delayed in time, and hence frame 5 is expected to be frozen (1313) until their delivery.
 Frames (6, 7) are also expected to be actually displayed (1309) delayed from their proper time. Since the following frames are also late, frame 7 is expected to be frozen (1313) until the new batch of frames is delivered.
 Frames (8-16) are delivered (1303) to the UE, and this should bring the buffer occupancy to being positive again, and frames (12-16) are expected to actually be displayed (1309) in time, while frames (8-11) are expected to be skipped (1311).
 Based on the above scenario, the estimate for this example is that frames (8, 9, 10, 11) are skipped and frames (3, 5, 7) are frozen for (3, 2, 2) timeslots respectively.

In an aspect, the access node estimates the frame freezing and skipping as follows: at the delivery of frames to the terminal node (UE), the buffer occupancy estimation module 1203 calculates an estimate for the client playback buffer depth (BO) value, and passes to the VQM input parameter estimation module 1205 both a BO value before the new delivery of the frames ($BO^b_n$) and a BO value after the delivery ($Bo^a_n$) (as shown in FIG. 13).

Note that "n" represents an index to the reporting transaction (starts with zero and increments every time an estimate is reported).

Note that, $$BO^a_n = BO^b_n + NF_n$$

where $NF_n$ represents the number of frames delivered to the UE.

The duration of freezing instance is then calculated as follows, $$\text{Freezing Duration} = f_n = \begin{cases} 0 & \text{if } BO^b_n \geq 0 \\ 0 & \text{if } BO^b_n \geq BO^b_{n-1} \\ BO^b_{n-1} - BO^b_n & \text{otherwise} \end{cases}$$

The duration of skipping instance is calculated as follows, $$\text{Skipping Duration} = s_n = \begin{cases} -BO^b_n & \text{if } BO^b_n < 0, BO^a_n > 0 \\ 0 & \text{otherwise} \end{cases}$$

The estimates for frame freezing and frame skipping incidents, $f_n$ and $s_n$, along with their respective timing information, are passed to the VQM estimation module 1007 which will calculate a real-time (online) estimate for the VQM value.

Note that in the case of video client behavior similar to the YouTube video client for on-demand videos, no frame skipping occurs, and only frame freezing incidents are reported.

It should be appreciated that other algorithms can be used to determine timing and duration of freezing and skipping events based on the BO estimate.

Figure 15:
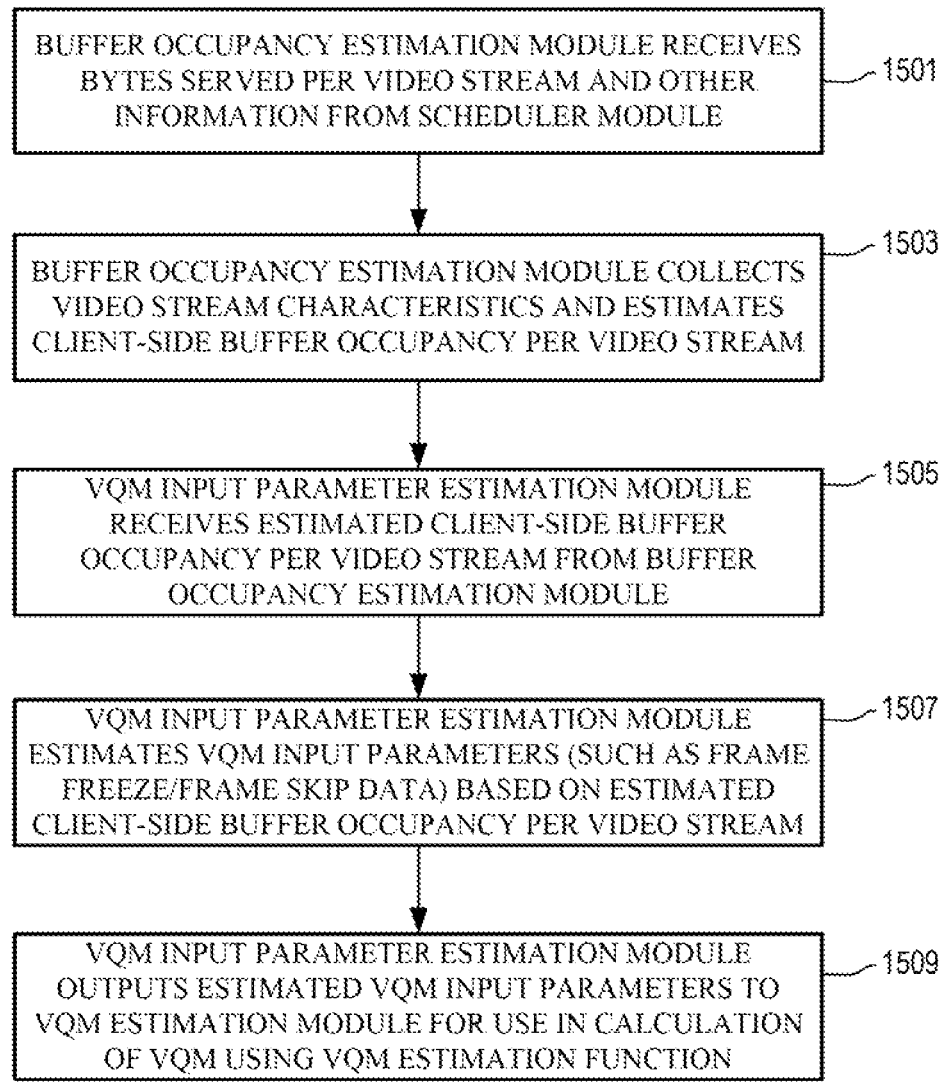
FIG. 15 is a flowchart illustrating functional steps for parameter extraction in accordance with aspects of the invention.

FIG. 15 is a flowchart illustrating functional steps for parameter extraction in accordance with aspects of the invention. In step 1501, the buffer occupancy estimation module receives "bytes served", packet delivery times, and other relevant information, per video stream from scheduler module 730. Then, in step 1503, the buffer occupancy estimation module collects video stream characteristics, such as video stream type, representation information and manifest file information, and estimates client-side buffer occupancy per video stream. As mentioned above, the buffer occupancy estimation module may use packet inspection techniques to collect some or all of the aforementioned video stream characteristics information, or may obtain it from an external module such as packet inspection module 729. VQM input parameter estimation module receives the estimated client-side buffer occupancy per video stream from buffer occupancy estimation module 728 in step 1505.

In step 1507, VQM input parameter estimation module estimates VQM input parameters, such as frame freeze incident data and frame skip incident data, based on the estimated client-side buffer occupancy per video stream and other information. Lastly, in step 1509, VQM input parameter estimation module outputs the estimated VQM input parameters to the VQM estimation module which then calculates VQM value(s) using a VQM estimation technique.

Returning to FIG. 10, the objective function module 1009 is not restricted to utilizing a particular objective function, and is capable of utilizing different types of objective functions. The objective function can be considered as an implementation of a QoE policy to maximize an overall (cell-wide across an access node) QoE metric, such as an overall VQM, for a plurality of video streams being delivered by the access node in a radio resource constrained wireless communication environment.

In this regard, in one aspect the objective function calculates the variance of VQM for a plurality of active video streams, as shown in the equations below. When used in the system depicted in FIG. 10, the system seeks to minimize the variance of VQM across the plurality of video streams supported by the access node. This provides some fairness to video users (terminal nodes) based on VQM, which is a measure of the QoE perceived by the users.

$$\text{objective function} = -\sigma_{VQM}^2 = -\frac{1}{N} \cdot \sum_{all\ Streams} (VQM - \overline{VQM})^2$$

Where $$\overline{VQM} = \frac{1}{N} \sum_{all\ Stream} VQM$$

And N is the number of video streams

The dynamics of the system shown in FIG. 10 using this "VQM variance" objective function will be that, as the VQM value for a video stream drops, more resources are assigned to it to recover this VQM drop at the expense of other video streams with better VQM values. The other factors driving the scheduler (e.g. inputs 1003 and possibly factors set by a management interface to resource control module 780 of FIG. 7A) will maintain that no one video stream will use more resources than it is allowed to, and fairness is not violated over the long term.

In another aspect, the objective function calculates the sum of the VQM values for each active video stream, as shown in the equation below. When used in the system depicted in FIG. 10, the system seeks to maximize overall QoE ("maximum aggregate VQM") for the video stream users (at the terminal nodes), even if this comes at the expense of lowering the QoE for some users.

$$\text{objective function} = \sum_{all\ Streams} VQM$$

The dynamics of the system shown in FIG. 10 using this "maximum aggregate VQM" objective function is that, if the VQM of a video stream drops, the radio resources are reassigned in a way to maximize the value of the aggregate VQM of the various video streams.

The drawback of using this objective function is that it may result in a bias against the high bit rate video streams, because taking resources from a high bit rate video stream and assigning them to lower bit rate video streams will produce more streams with a higher VQM at the expense of the VQM of the high bit rate video stream. In an embodiment, limits can be implemented to prevent too great of a sacrifice from high bit rate video streams.

In another aspect, the objective function calculates a scaled aggregate VQM, as shown in the equations below. When used in the system depicted in FIG. 10, the system seeks to maximize overall QoE for the video stream users (at the terminal nodes), but each video stream may be weighted uniquely based on the predetermined required treatment for that video stream, such as the service level agreement (SLA) or the guaranteed bit rate (GBR) value for the assigned logical link (e.g. LTE bearer) carrying the video stream. Other factors related to the video stream can also be used for the weighting.

$$\text{objective function} = \Sigma_{all\ Streams} \alpha_i \cdot VQM_i$$

Where $\alpha_i$ is a weighting factor for video stream 'i' and it is a function of some factors such as bearer GBR (for GBR bearers) and user SLA. In case of a non-GBR bearer, user SLA and AMBR (if exists) can be used in the definition of $\alpha_i$.

In another aspect, the objective function is calculated using a combination of aggregate VQM and VQM variance, as shown in the equations below. When used in the system depicted in FIG. 10, the system drives to maximize the aggregate VQM of all video streams while minimizing the VQM variance among the video streams. This will realize the benefits of high overall VQM while making sure that high bit rate streams are not severely affected by a reduction of radio resource allocation. A parameterization is used to balance the mix of the two objectives, as shown:

$$\text{objective function} = \sum_{all\ streams} VQM - \Phi \cdot \sigma_{VQM}^2$$

where $$\sigma_{VQM}^2 = \frac{1}{N} \cdot \sum_{all\ Streams} (VQM - \overline{VQM})^2$$

and $$\overline{VQM} = \frac{1}{N} \sum_{all\ Stream} VQM$$

In an aspect, the objective function can be applied to a subset of all video streams such as, for example, only video streams associated with gold level SLA video streams.

Figure 16:
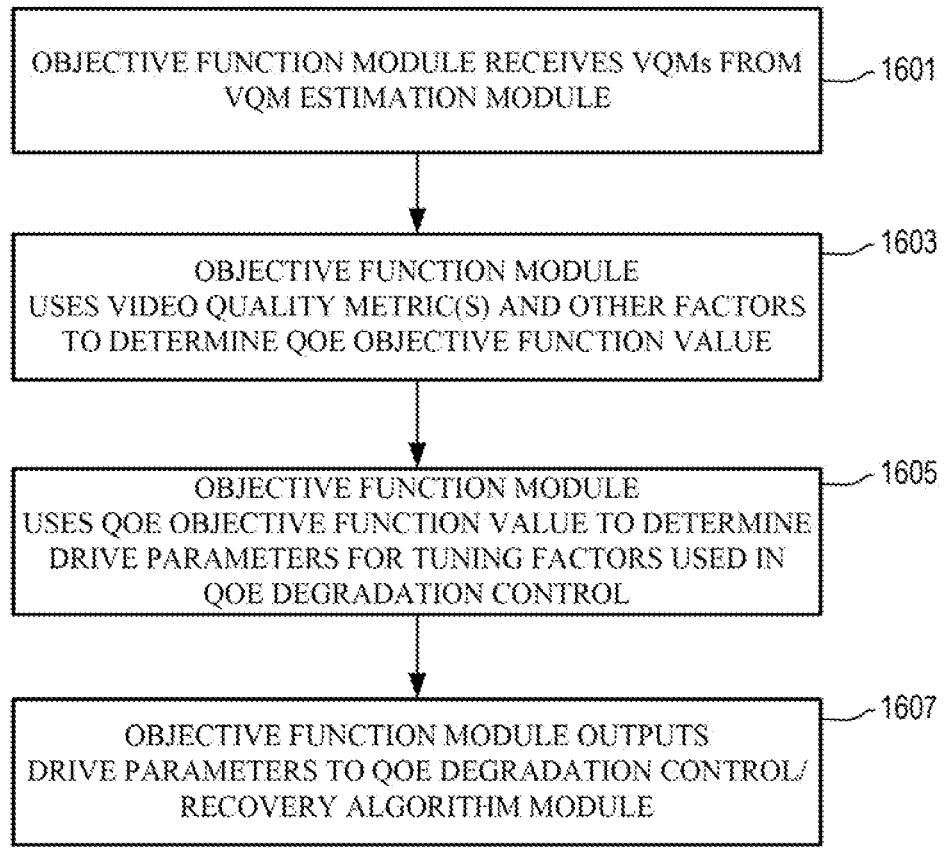
FIG. 16 is a flowchart illustrating functional steps of an objective function module in accordance with aspects of the invention.

FIG. 16 is a flowchart illustrating the general functional steps of an objective function module in accordance with aspects of the invention. In step 1601, objective function module receives VQM values from the VQM estimation module. The objective function module then uses the VQM values and other factors to calculate the QoE objective function value in step 1603. In step 1605, the objective function module uses the QoE objective function value to determine parameters for use in a tuning process in the QoE degradation control state. Then, in step 1607, the objective function module outputs parameters to the QoE degradation control and recovery algorithm module. In this manner, a VQM-based objective function is used to adjust the QoE degradation control and recovery algorithm which determines application factors used in scheduling of radio resources to the various video streams supported by the access node.

Figure 17:
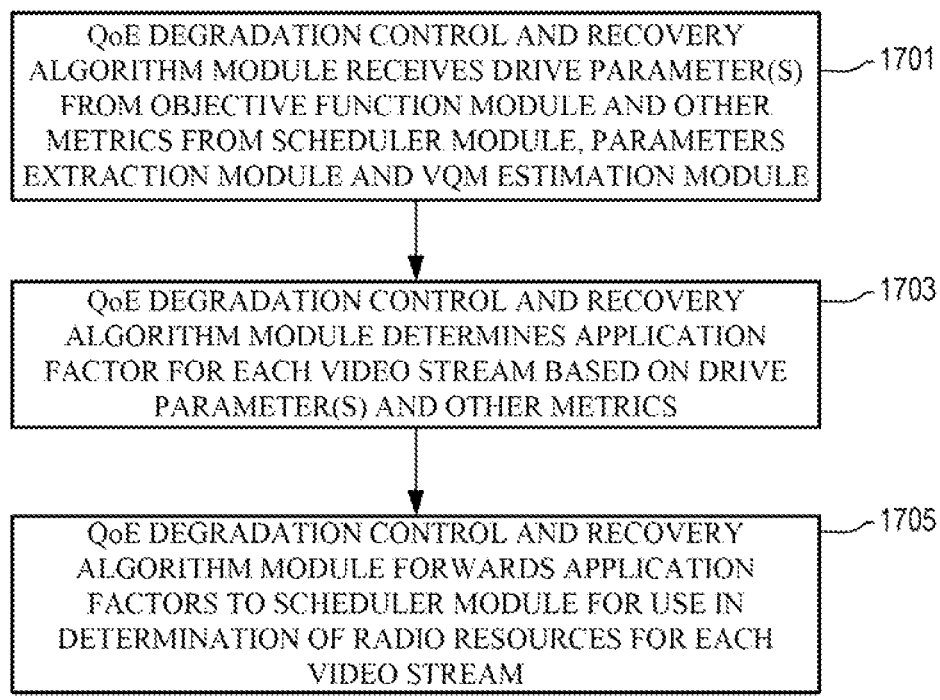
FIG. 17 is a flowchart illustrating functional steps of an quality of experience degradation control and recovery algorithm module in accordance with aspects of the invention.

The functionality of QoE degradation control and recovery algorithm module 1011 of FIG. 10 is now described in more detail in FIG. 17 in accordance with aspects of the invention. In step 1701, the QoE degradation control and recovery algorithm module receives parameter(s) from objective function module and other metrics from the scheduler module, the parameters extraction module and the VQM estimation module. In step 1703, the QoE degradation control and recovery algorithm module determines an application factor for each video stream based on the VQM values and other metrics and information. Then, in step 1705, the QoE degradation control and recovery algorithm module forwards the application factors to the scheduler module for use in adjusting the allocation of radio resources for each of the video streams.

In an aspect, the QoE degradation control and recovery algorithm module 1011 operates in a QoE degradation control state which uses an application factor (AF) calculation algorithm for the video streams supported by the access node. In this aspect, the application factors (AFs) calculation algorithm derives the AFs based on the hybrid objective function discussed above. Based on that objective function, the application factor is affected by several factors described below. In other aspects, the QoE degradation control state uses a scheduler parameter calculation algorithm that may calculate weights, credits, priorities, etc. for use by the scheduler module.

1. Current buffer occupancy estimate (BO). As used herein, the term buffer occupancy estimate is intended to mean an estimate of the client-side buffer occupancy, wherein the estimate is determined at the access node. The BO estimate may be expressed as seconds of buffered video playback time, and may be an instantaneous value, and therefore may not carry history of the video playback quality; however, the BO estimate value has a predictive nature of the video quality. It can predict the likelihood of temporal impairments (and hence QoE degradation) in the near future.

2. Video quality metric (VQM). The VQM may be represented as a value between 1 (unwatchable) to 4 (excellent).

3. Bit rate for the streamed video (B). This is the bitrate (measured in, for example, bits per second) of the video stream. A number of different video stream characteristics may be used to calculate B, including: the current bit rate which is the video bit rate at the instant of taking the measurement; the average bit rate for the whole video clip; the average bit rate for the current segment (calculated as segment size divided by the duration of the segment); and the average bitrate over a specified time period. The bit rate (B) is a measure of the heaviness of the video stream, and reflects the resources that are required to compensate for a drop in its VQM value. Since the system aims, in part, to raise the overall aggregate value of VQM, then the higher the bitrate of a video stream, the higher the chance that the video stream's VQM is sacrificed to improve other video streams with lower bit rates. Accordingly, it can be appreciated that this relationship applies in the reverse as well.

4. Served bit rate (S). This is the bit rate (measured, for example, in bits/second) actually served (scheduled) on the air interface for this video stream. It may be an average-based over a defined interval.

5. Channel Quality (Q). The channel quality works in hand with the bit rate to evaluate the number of radio resources needed to carry the video stream. The channel quality in the AF algorithm may be expressed in bits per radio resource for the logical link carrying the video stream.

6. Utilization of the "Committed bit rate" or "Guaranteed bit rate" (U/GBR). The user utilization of the GBR is measured by the ratio of the total used bit rate (U) to the GBR value. Used bit rate refers to the actual bit rate consumed by a user over a logical link (e.g. LTE bearer) and may include both video and non-video services. In case of Non-GBR bearers in which there is no given value to the GBR, an effective GBR value may be used. For example, in an LTE network Effective GBR=UE AMBR/Number of video streams run by the UK If no AMBR value is assigned for the UE, then a default value may be used. Alternatively, for non-GBR bearers, any terms or factors which require a GBR value may be omitted from the calculation. In an aspect, an AF algorithm to calculate an application factor for a connection carrying a video stream could be as follows, $$AF=AF_o \cdot f(BO, VQM, S, B, Q, U/GBR)$$

Where $f(x, y, z, \ldots)$ is a function chosen to best fit the relationship between the different factors above.

In an aspect, one implementation for the above formula could be as follows, $$AF = AF_0 \cdot \frac{C}{(\alpha \cdot BO + BO_{min})^m (\beta \cdot VQM)^n (\gamma \cdot S/Q)^l (\partial \cdot B)^p (\theta U/GBR)^q}$$

Note that $BO_{min}$ is a constant to avoid the cases where BO is zero. Also note that VQM cannot be set to zero.

Additionally, the following constraint prevents saturation of AF values:

$$\sum_{all\ n} AF_n = N \cdot AF_0$$

Where $AF_0$ is the average Application Factor for the case if all streams were to be treated similarly.

($\alpha$, $\beta$, $\gamma$, $\partial$ and, $\theta$) are scaling factors;

(m, n, l, p and q) are exponent factors; and

C is a constant to make sure that restriction on the sum of AF is satisfied

In an aspect, the AF algorithm can be tuned by use of an algorithm tuning procedure for selection of proper values for the scaling and exponential factors. This may be done in an iterative fashion (e.g. on a network emulator running multiple, real-time video streams). Before starting the algorithm tuning procedure, the value of the average application factor $AF_0$ is identified as a system parameter that will remain constant. Since the objective of the algorithm is to favor some video streams over other video streams, and assuming that the AFs will be modulating scheduler weights, credits, or priorities, then a value of 1 could be selected for $AF_0$ which implies, when all video streams are treated equally by this protocol, that the algorithm effect is completely muted. Initial values for the range or sets of factors used in the tuning procedure (e.g. 32 sets of factors described in the example below) are obtained.

The algorithm tuning procedure starts with all video streams running with unimpaired VQM values. The system as in FIG. 10 is initialized, and every time the access node (base station) obtains a packet containing video frames to be sent to the UE (terminal node), a new calculation of the client-side buffer occupancy estimate (BO) is triggered. The new value for the BO triggers a calculation for the video quality metric VQM. Then, the application factor is calculated as defined above in terms of the constant C, and the value for C is calculated from the restriction on the sum of all AFs. The value of the VQM for the different video streams is tracked and the hybrid objective function described above is calculated throughout the procedure. The previous four steps are repeated throughout the procedure.

The above described algorithm tuning procedure is repeated for different sets of scaling and exponent values, and then the set of parameters is selected which maximizes the objective function. For example, 32 trials may be conducted, each with a different set of scaling and exponent values. For each trial, the time varying results of the objective function calculation may be averaged into a scalar, objective metric. The scaling and exponent values corresponding to the trial with the highest scalar objective metric may then be selected for use. The algorithm tuning procedure may be repeated for different sets of video clips and number of video streams to ensure that the selection of parameters do not change significantly with the change of experiment conditions.

The direct AF calculation algorithm operates to fulfill the hybrid objective function by maximizing the aggregate VQM value while maintaining the variance of VQM to a minimum. In an aspect, this is achieved in part by including in the calculation of the application factor the bitrate of the video, and the used MCS in addition to the other factors (such as BO and VQM), which results in the reduction of radio resources assigned to the video streams with high demand.

In another aspect, the QoE degradation control and recovery algorithm module 1011 operates in a QoE degradation control state which uses a relative application factor (AF) adjustment algorithm for the video streams supported by the access node. In this aspect, the relative AF adjustment algorithm uses the same inputs as the above-described direct AF calculation algorithm, but the relative AF adjustment algorithm applies an intermediate result, W, to the set of AFs in a proportional manner (i.e. increased or decreased by a percentage). The changes in the application factor (AF) are thereby made more smooth and continuous.

In this relative AF adjustment algorithm a value W will be calculated for each stream, $$W = f(BO, VQM, S, B, Q, B/GBR)$$

where the GBR factor may be replaced by the effective GBR for non-GBR bearers. Calculation of effective GBR for non-GBR bearers is described above. An alternative approach is to remove the term using the GBR from the relationship (e.g., by setting that term's exponent q=0 in the equation below).

In an aspect, one possible implementation for the formula is as follows:

$$W = (\alpha \cdot BO + BO_{min})^m (\beta \cdot VQM)^n (\gamma \cdot S/Q)^i (\partial \cdot B)^p (\theta \cdot U/GBR)^q$$

In a scenario with N video streams, an (N×3) table is created. Each row consists of a stream number and its corresponding W value and current AF. It can be appreciated that other formats can be used for storing this data. The matrix is then sorted by W value from highest to lowest. As used herein, the term "sorted" may include physically sorting the data into a rearranged manner, or logically sorting the data. Then, for every defined period "T":

W is re-calculated for all video streams, and the matrix is re-sorted;

the AF of the video stream with the largest W value (i.e. the first row of the sorted table) is multiplied by a factor of p (where p is <1); and the AF of the video stream with the smallest W (i.e. the last row of the sorted table) is increased by the amount discounted from the top stream.

This technique can be generalized by also taking p/2 from the second video stream from the top and adding it to the second video stream from the bottom, and p/4 for the third, p/8 from the $4^{th}$ and so on.

As for the previous AF algorithm, a tuning procedure may be used to calculate the scaling and the exponential parameters used in this relative AF adjustment algorithm. Also, the value of "p" and "T" may be selected to be small enough to make sure that the changes to the AFs are smooth and continuous. In an aspect, the relative AF adjustment algorithm operates to raise the AF for the video streams that have lower W scores. The W score is measured as a nonlinear function of the VQM, BO, and the amount of radio resources required by the video stream. As the video stream's VQM or BO decreases, the W score for the video stream is decreased. The W score is reduced further for the less data demanding video streams because those video streams benefit more from a given increase in resource allocation (i.e. a boost of their AF value).

In another aspect, the QoE degradation control and recovery algorithm module 1011 operates in a QoE degradation control state which uses a closed-loop AF calculation/adjustment algorithm for the video streams supported by the access node. In this aspect, the closed-loop AF calculation/adjustment algorithm extends the other above-describe AF algorithms by adding an objective function feedback to the AF algorithm. This objective function feedback can be applied to either one of the other AF algorithms.

Figure 11:
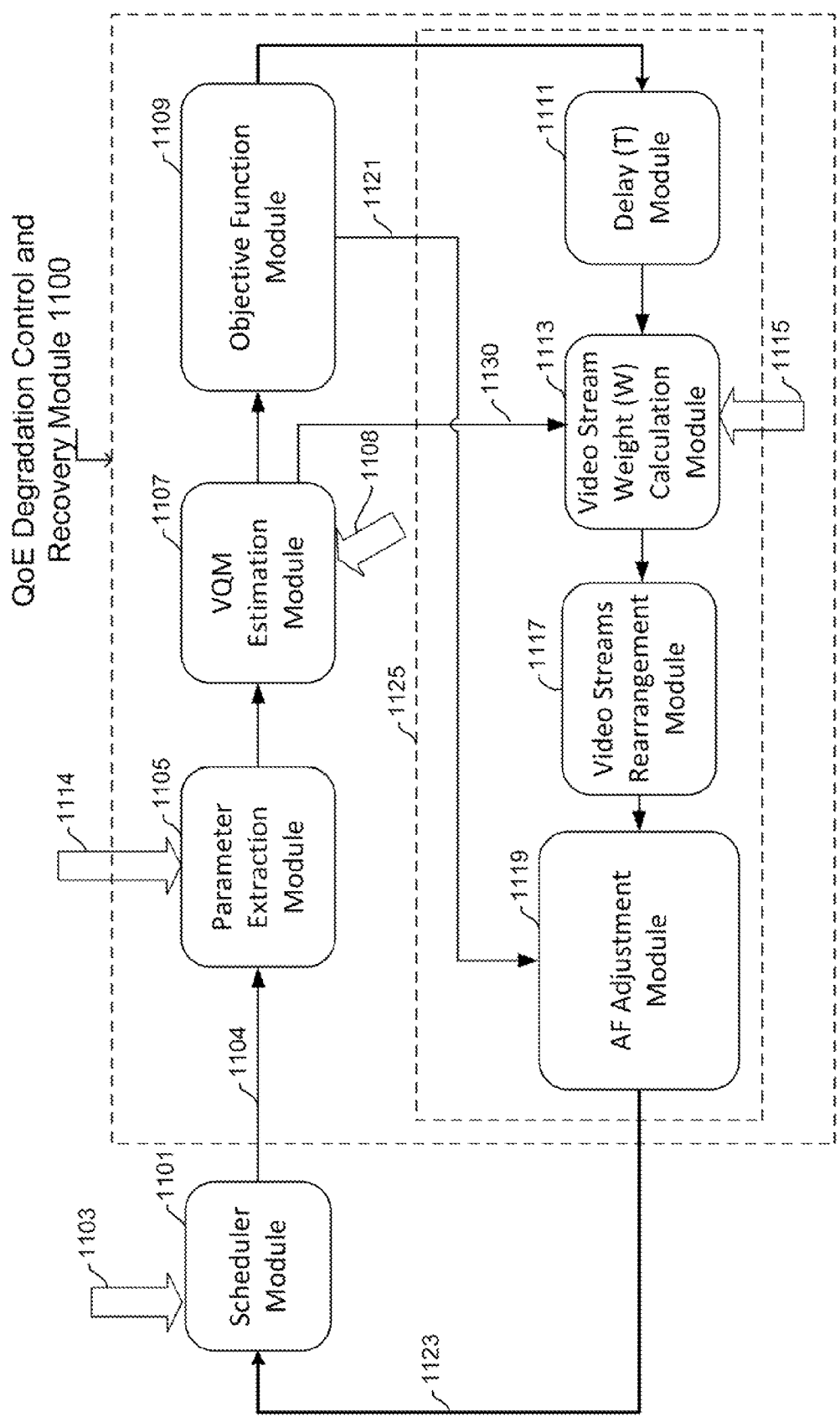
FIG. 11 is a block diagram illustrating a quality of experience video streaming degradation control and recovery module in accordance with aspects of the invention.

FIG. 11 is a block diagram which illustrates the QoE degradation control and recovery module 1100 using a closed-loop AF calculation/adjustment algorithm. Items 1101-1108 are similar to their counterparts described above with respect to FIG. 10. Objective function module 1109 is responsible for the objective function calculation, and it generates different output parameters for use in the AF adjustment algorithm. These parameters include: the delay duration "T" which controls the speed of the feedback loop to the AF adjustment algorithm; and the percentage of adjustment "p" (represented by the arrow 1121) which defines the rate of adjustment of the application factor.

As the objective function module 1109 calculates the period "T", it passes it to delay module 1111 to manage the speed of the feedback loop. "T" is assumed to be large enough to allow the previous settings of the application factors to take effect and thereby influence the BO and VQM of the video streams, and hence the objective function and the "W"s for the different video streams. However, "T" should be small enough to make sure the system is responsive to the changes in factors such as channel variations, packet arrivals, and load variations. In this regard, a smaller value of T may allow the system to be more predictive of the impacts of certain changes at the PHY layer, additions of new services, etc.

A "W" value is calculated for each video stream in the video stream weight calculation module 1113. As described above, the formula to calculate "W" requires a set of metrics (represented by the arrow 1115) and the determined VQM value (1130), and other information such as buffer occupancy estimate, from VQM estimation module 1107. The values for "W" are used to rearrange the video streams in video stream rearrangement module 1117 which uses, for example, the matrix sorting technique described above. Based on the "P" (represented by arrow 1121), the AF's are readjusted in AF adjustment module 1119 as described in the AF algorithm above and then passed (1123) to scheduler module 1101 for use in allocation of radio resources to the various video streams being supported by the access node (base station).

It should be noted that this closed-loop AF algorithm is operating in a continuous manner because packet arrivals, new added streams, and variation in channel conditions and associated selection of modulation and coding will affect the operation of the system, and hence the values of VQM and the calculation of W for the different video streams.

Figure 18:
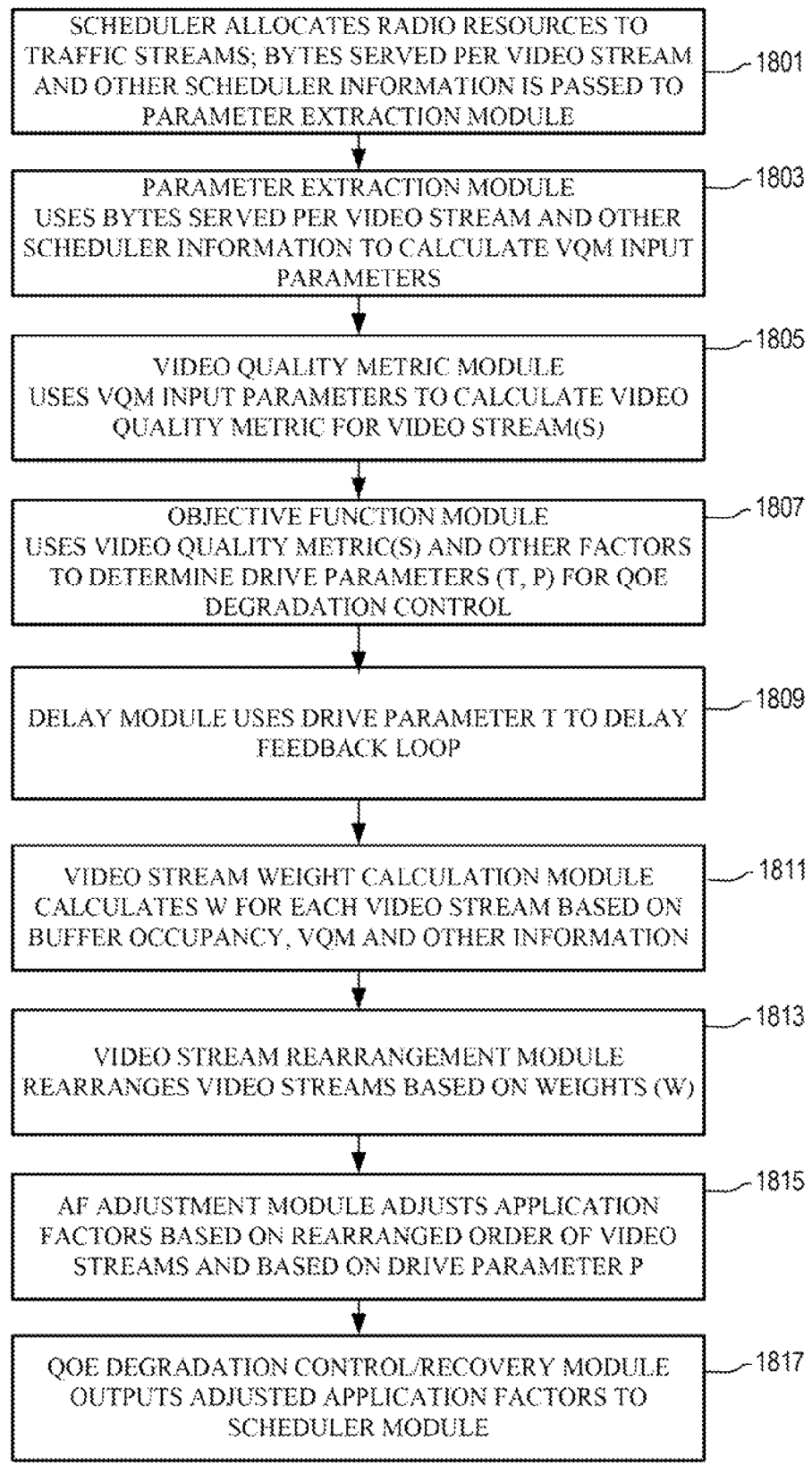
FIG. 18 is a flowchart illustrating functional steps for quality of experience video streaming degradation control in accordance with aspects of the invention.

FIG. 18 is a flowchart illustrating general functionality of the QoE degradation control and recovery module using a closed-loop AF calculation/adjustment algorithm according to an aspect of the invention. In step 1801, the scheduler module allocates radio resources to the traffic streams and then a "bytes served" value per video stream and other scheduler information is passed to parameter extraction module. Next, in step 1803, the parameter extraction module uses bytes served per video stream and other scheduler information, along with video stream characteristics data, to calculate VQM input parameters, which can include a buffer occupancy estimate for each video stream. The video quality metric module then uses the VQM input parameters to calculate video quality metrics (VQMs) for the video streams in step 1805.

In step 1807, the objective function module uses the video quality metrics and other factors to determine parameters (T, p) for use by the AF algorithm in the QoE degradation control state. Parameters T and p may be calculated as a function of the delta between the target value for the objective function and the actual value. Such a function may result in a rapidly converging loop with minimal overshoot. Accordingly, $$p=f(\text{target objective function}-\text{actual objective function})$$

One possible function would be a linear relationship, such as, $$p=\mu \cdot (\text{obj}_{target}-\text{obj}_{actual})$$

where μ is a constant
A similar relationship and function may be applied to the calculation of T. The delay module uses the parameter T to delay the feedback loop in step 1809. In step 1811, the video stream weight calculation module calculates a W value for each video stream based on the buffer occupancy, VQM value and other information. The video stream rearrangement module rearranges the video streams based on their respective weights (W) in step 1813. The video streams may be rearranged by physical rearrangement of the video stream data or may be rearranged in a logical manner, for example by the use of indices, pointers or indicators. Next, in step 1815, AF adjustment module adjusts application factors (AFs) based on the rearranged order of the video streams and based on the parameter P via, for example, the technique used by the relative AF adjustment algorithm. In step 1817, the QoE degradation control and recovery algorithm module (AF adjustment) outputs the adjusted application factors (AFs) to the scheduler module which uses them to adjust weights, credits, debits, etc. for allocation of radio resources to the video streams being supported by the access node (base station).

During operation in the QoE degradation control state, requests for new video streams may be detected by the access node from one or more of the terminal nodes being serviced by the access node. In an aspect, detection of new video streams or requests for new video streams may be performed by packet inspection module 729 of FIG. 7A. Considering that the QoE degradation control state is by definition a congestion induced state in which action is being taken to distribute QoE degradation among the many existing video streams in an effort to maximize an overall QoE metric, the access node should be judicious in accepting any new video stream requests.

In aspects of the invention, for systems operating in the QoE degradation control state, the following techniques may be performed when a new video stream request is detected. Note that, though the methods below relate to video streams, the techniques are similarly applicable to requests for new, non-video streams for existing users and new users.

By definition, a system in the QoE degradation control state can handle the current load and provide an acceptable overall user QoE above a certain threshold, as described above. In an aspect, one response to the detection of new video streams is to accept them and transport packets from new video streams as long as the system remains within this state. If the load is increased beyond the system's capacity to maintain an acceptable QoE, the state will shift operation to the QoE recovery state (as described above), which has more restrictive rules for acceptance of new video streams.

In one aspect, the access node (base station) accepts the new connection or video stream request if it is running on a 'good' radio channel, which is a radio connection utilizing an efficient modulation and coding scheme. In this manner, the system is continuously trying to improve its utilization of resources by accepting new flows with good channel conditions, even if this later results in the system transitioning to the QoE recovery state, which may cause the system to drop the less efficient streams (i.e. the streams with worse channel conditions).

In one aspect, the access node (base station) uses a utility function to calculate a score for each new connection/stream. This utility function may be based on factors such as channel conditions, user SLA, user admission and retention priority (ARP) policy, bearer GBR (or effective GBR for non-GBR bearers as described earlier in the document) and current VQM. The utility function's score will be compared to a certain threshold, and if the score is greater that the threshold, then the video stream is accepted. For treatment of new video streams, the term 'accepted' relates to the access node decision to transport packets from the new video stream subject to the procedures applied to existing video streams. In this regard, a new video stream may be allowed to be transported until sufficient information is obtained (e.g. manifest file information, meta data, etc.) in the access node to support a decision whether to accept the video stream for continued transport. This threshold can either be a fixed value or a value that is driven through a probabilistic means. Manipulating the threshold value will manage the aggressiveness level of the acceptance of new streams by the access node. One example of this utility function is:

$$\text{utility function} = \omega_{user} \cdot \omega_{bearer} \cdot \omega_{stream} \cdot \omega_{VQM}$$

where:

$\omega_{user}$ is the weight for the user relying on its SLA (for example, it can be 1.0 for Gold users, 0.7 for Silver users, and 0.5 for Bronze users);

$\omega_{bearer}$ is the weight for the bearer which is calculated based on bearer QoS parameters such as the GBR and how much of this is currently in use (i.e. how much is the network commitment to this bearer fulfilled as described by the term U/GBR, defined above). In another example, this can be set to:

$$\omega_{bearer} = 1 - \left(\frac{\text{served bit rate for this bearer}}{\text{Bearer } GBR}\right)$$

$\omega_{stream}$ is the weight for the video stream which is calculated based on the stream's expected bit rate, B. For example, $$\omega_{stream} = \begin{cases} 1.2 - (B/3 \text{ Mbps}) & B < 3 \text{ Mbps} \\ 0.2 & B \geq 3 \text{ Mbps} \end{cases}$$

and $\omega_{VQM}$ is a weight reflecting the current level of system QoE. This parameter, for example, may be equal to the current average VQM value across all video streams.

As described above with respect to the flowchart in FIG. 9, when the radio resource congestion in the wireless network further deteriorates such that the overall QoE metric falls below a minimum acceptable threshold, the operational state enters a QoE recovery state. This QoE recovery state addresses the need to take some action to reduce the required radio resource load to ensure acceptable video stream QoE for the users at the terminal devices (UEs).

The QoE recovery state operates at the following levels:
Video stream level. Even if a video stream is mixed with non-video data, algorithms in the base station can detect the video streams and QoE recovery techniques can be applied on a per video stream level.
TCP connection level. A video stream normally utilizes more than one TCP connection, and some of the algorithms below address QoE recovery on the TCP connection level. This may mean that QoE recovery algorithms may act on a single video segment within a larger streaming video representation or clip.

In this QoE recovery state, the solution to an unacceptable degradation of QoE is to apply QoE recovery techniques on one or more of the video streams in order to reduce the load and thereby maintain the quality of the remaining video streams above a certain threshold.

Figure 19:
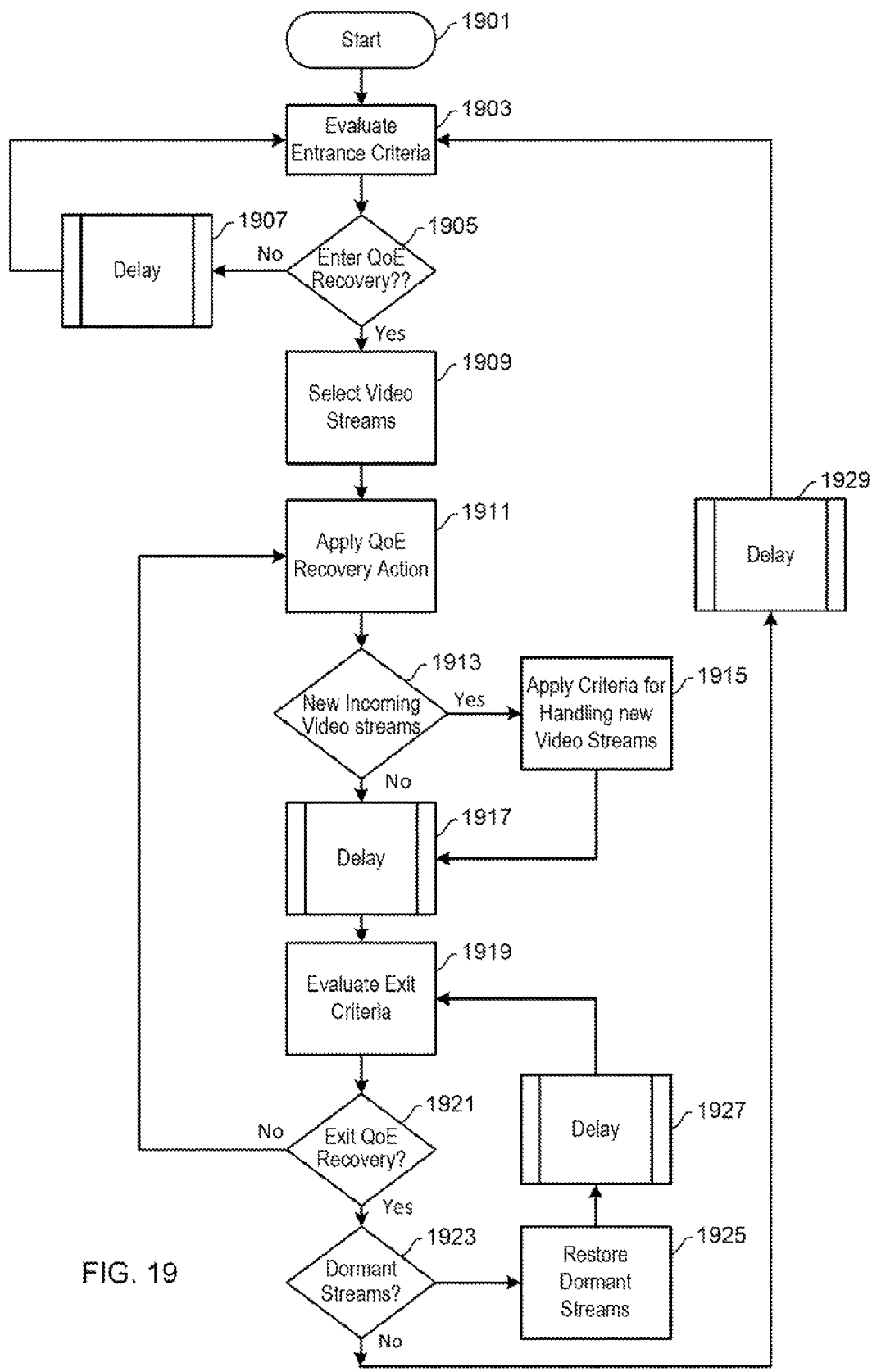
FIG. 19 is a flowchart illustrating functional steps for a quality of experience video streaming recovery state in accordance with aspects of the invention.

FIG. 19 is a flowchart illustrating functional steps of a QoE recovery state in accordance with aspects of the invention. This flowchart starts in step 1901 in which the system is operating in the QoE degradation control state. In step 1903, entrance criteria, such as an overall VQM value, are evaluated for determining if entry into the QoE recovery state is necessary. In step 1905, it is determined whether to enter the QoE recovery state based on the evaluation of the entrance criteria. Steps 1901 to 1905 are conducted in the QoE degradation control state, prior to entry into the QoE recovery state. If the determination in step 1905 is "yes", then the operation enters the QoE recovery state in step 1909. If the determination in step 1905 is "no", the operation moves to step 1907 in which a time delay is applied before returning to step 1903 to again evaluate the entrance criteria.

In one aspect, regarding the entrance criteria and trigger conditions, a threshold VQM is defined that represents unacceptable quality (L). As the QoE degradation control state is running, and one (or more) video streams have VQM values that fall below this threshold for a period more than a certain interval (T), entry is triggered into the QoE recovery state. Setting the level "L" may be a way to define whether the QoE recovery algorithm is proactive or reactive. If "L" is set to be at the level of unacceptable QoE then the algorithm will start operation in reaction to the problem. If however, "L" is set higher than the unacceptable level, then the algorithm will start operation before reaching unacceptable quality levels.

In an aspect, there can be multiple threshold levels to combine the reactive response with the proactive response. A trigger of a higher threshold level may start the proactive response and then the QoE recovery state runs in a less aggressive manner in which, for example, load reduction actions are selected that have a less severe impact on existing video streams being served by the access node. If the quality continues to degrade and we reach the second threshold (lower VQM) then the QoE recovery state operates in a reactive manner and acts more aggressively to reduce the load. In an aspect, the time period "T" mentioned above is a proofing period to prevent a transient drop in VQM from triggering the QoE recovery state.

In other aspects, other VQM-based trigger conditions are possible for entry into the QoE recovery state, such as: when the VQM of a single video stream crosses a threshold; when a number of video streams or a percentage of the total number of video streams supported by the access node (base station) all have VQMs which cross a threshold; when the average VQM among all the video streams, or the average on the lowest "N" VQM video streams cross a threshold; when a weighted average of VQM (all or lowest "N") crosses a threshold. The weights can be based on the user SLA or policy. For example, a "gold" user with high SLA may have a stronger influence to trigger the system to enter the QoE recovery state. In another aspect, the user SLA will influence the value of the threshold to be used against the user, thereby creating a custom threshold value per user.

In another aspect, as a general rule to accommodate all of the above factors (or a subset of them), a cost function can be utilized based on one or more of the above factors and weighted (e.g. by the user SLA). The cost function value is then compared with a predefined threshold to determine whether to enter the QoE recovery state.

When the QoE recovery state is entered, the video streams are reviewed and certain video streams (at least one) are selected for application of a load reduction action. In one aspect, the method of selecting the video stream(s) on which to apply action may be based on one or more of the following criteria:

Select one or more video streams with low VQM values, i.e. below their defined threshold (or a subset of them in case we have multiple).
Select one or more video streams with high bitrates, in the order of highest bitrate first.
Select one or more video streams based on the duration of the completed playback or remaining time for playback. For example, select the streams with the least amount of view time completed, or the longest time remaining. The reverse logic can also be considered.

Select, or increase the chance of selecting, video streams which are currently in an initial buffering state, since the user has not yet invested time in viewing the video.

Select or increase the chance of selecting "On-demand" video streams as compared to live streams.—Select video streams based on the RF channel conditions on which the video stream is carried to the terminal node (UE). For example, the video streams with the most robust modulation and coding scheme (MCS) may be selected, since those will be using more resources per byte of payload data than video streams transported on channels using a less robust, higher order MCS.

Apply fairness in the selection method. If a video stream has been selected once, apply a lower probability of being selected in following occasions. This can also be applied per user (i.e. if a user has one of their streams affected once, they will be less likely to have any of their streams to be affected again in the near future).

Include the user SLA and ARP policy setting as a criterion in the selection. This may be used as either a selection criteria or an influencing factor. For example, a bronze SLA user may have an increased probability of being selected as compared to a gold SLA user. Alternatively, SLA and ARP policy may be used as a decisive factor. For example, a gold user may never have a video stream selected.

Video streams which can adapt their video bitrate, such as DASH, and which are not currently streaming at their lowest bitrate may be assigned an increased probability of selection.

It should be noted that the term "select" as used above may refer to selection of a video stream for load reduction action, or may refer to increasing the probability of selection of a video stream for load reduction action.

In an aspect, one of the above criteria may be used as a method to select video streams on which to apply some action. Alternatively, two or more of these criteria may be combined into a weighted utility function which may be evaluated for each candidate video stream to determine whether to select the video stream. In this case, the method to select video streams on which to apply some action will be based on the video stream(s) with the lowest utility score. One example of such a utility function for selection is now described. Assume we have video streams A through E with the attributes as shown in the following table:

TABLE 3

| Stream | VQM | BitRate (in bps) | Channel Quality | Time of Playback (in minutes) | Remaining Time of video stream (in minutes) | Live/ On Demand | Last time this stream was a subject of QoE Recovery Action |
|---|---|---|---|---|---|---|---|
| A | 4 | 300K | Excellent | 30 | 5 | L | Never |
| B | 3 | 2M | Fair | 10 | 90 | OD | Never |
| C | 3.5 | 1.5M | Good | 60 | 2 | OD | 15 m |
| D | 2.6 | 700K | Good | Initial Buffering | 90 | OD | Never |
| E | 3.7 | 300K | Bad | 5 | 35 | L | Never |

Weights are assigned for each factor as follows, note that the fourth column shows whether this factor increases or decreases the utility function (improves the chance/reduces the chance of being selected).

TABLE 4

| Factor | Unit of Measure | Weight | +/− from cost function |
|---|---|---|---|
| VQM | from 1 to 4 | 0.7 | Increase |
| Bit Rate | in 100 kbps | 0.5 | Decrease |
| Channel Quality | bad = 1, Excellent = 5 | 0.8 | Increase |
| Time Playback | Time in minutes, Initial Buffering = 0 | 0.1 | Increase |
| Remaining Time | Time in minutes | 0.1 | Decrease |
| Live/On Demand | Live = 30, OD = 5 | 1.0 | Increase |
| Last time it was affected | Duration in Minutes, Never = 100 | 0.2 | Increase |

Based upon the above utility function exemplary and exemplary weights, the results can be calculated as follows:

TABLE 5

| Stream | Utility Function | Score | Rank |
|---|---|---|---|
| A | 4 × 0.7 − 3 × 0.5 + 5 × 0.8 + 30 × 0.1 − 5 × 0.1 − 30 × 1.0 + 100 × 0.2 | −2.2 | 2 |
| B | 3 × 0.7 − 20 × 0.5 + 2 × 0.8 + 10 × 0.1 − 90 × 0.1 − 5 × 1.0 + 100 × 0.2 | 0.7 | 3 |
| C | 3.5 × 0.7 − 15 × 0.5 + 3 × 0.8 + 60 × 0.1 − 2 × 0.1 − 5 × 1.0 + 15 × 0.2 | 1.15 | 4 |
| D | 2.6 × 0.7 − 7 × 0.5 + 3 × 0.8 + 0 × 0.1 − 90 × 0.1 − 5 × 1.0 + 100 × 0.2 | 6.72 | 5 |
| E | 3.7 × 0.7 − 3 × 0.5 + 1 × 0.8 + 5 × 0.1 − 35 × 0.1 − 30 × 1.0 + 100 × 0.2 | −11.11 | 1 |

The rank of each stream is determined by, for example, sorting (either physically or logically) the score from lowest to highest. The lowest score is assigned rank=1, the second lowest score, rank=2, and so on. Then the video streams with the lowest rank (due to having the lowest utility function score) are selected for application of at least one load reduction action. The table above shows the ranking of the video streams. Accordingly, the first video stream to be selected on which to apply some action will be video stream E, followed by video stream A, followed by video stream B, and so on.

Once the video streams are selected in step 1909, the operation moves to step 1911 in which a QoE recovery action (load reduction action) is applied to the selected streams. In this regard, one or more of the following actions can be applied for selected video streams:

1. Modify a video stream rate. This is applicable to adaptive streaming algorithms (such as DASH), where the video client can switch between different representations from segment to segment. Each representation runs with a different bitrate. As part of QoE recovery state, the base station (access node) can influence or force the video client to switch to a different representation with lower bit rate to reduce the load for that video stream. One way to influence the video client to downgrade its rate is by reducing or terminating the allocation of radio resources applied to video stream such that the video client detects a reduction in capacity and switches to a lower bit rate representation, as described in more detail above. Once the video client switches to lower bit rate representation, the base station may provide radio resources to satisfy this bit rate without raising the BO for the video client so that it does not switch back to the high bit rate representation.

2. Send a video stream to dormancy. In this action, the selected video stream is not provided with any radio resources on a temporary basis. This dormant state ("dormancy") results in a stall for the video playback on the client side. If congestion is reduced, the dormant video streams are brought back to an active state. During dormancy, the base station may store (cache) packets for the video stream, to be delivered to the video client after being removed from dormancy. In the case of LTE, packets in the cache may be protected from discard by an ageout function in the PDCP (Packet Data Convergence Protocol) layer, by caching packets before they enter the PDCP layer. Alternatively, the base station may discard these packets and rely on higher layers (TCP) to retransmit these packets. If the video stream remains dormant for a specific period without being brought back to an active state, or killed by the client, the base station may terminate this video stream. In another aspect, one different option is to allow dormancy of a maximum duration, and if congestion is not relieved at the end of this duration, this video stream is brought back to an active state, and a different video stream is selected to go into dormancy.

3. Terminate a video stream. In this action, the selected video stream is disconnected by the base station on a permanent basis. This may be done by breaking the corresponding TCP connections or by discarding traffic such that the TCP connection is broken by one of the endpoints. This step may be done as a first response or as a backup response when other less aggressive approaches, such as a load reduction action in which the video stream rate is modified, fail to resolve the overload of radio resources.

4. Force Handover to a different base station. This action may affect all traffic transported to a user at a terminal node (UE) and not merely the selected video stream. In another aspect, a single video stream may be offloaded to an alternate network (e.g. a Wi-Fi network) on a device which has the capability of simultaneous connection to multiple networks, such as a device using DSMIPv6 (Dual Stack Mobile Internet Protocol version 6) and IFOM (Internet Protocol Flow Mobility).

5. Pause the Server. In this action, a "pause" command is sent to the video server from the access node (base station), as if it was sent by the video client at the terminal node to cause the video server to suspend transmission of packets to the video client. The selected video may remain in a paused state until the congestion level improves (e.g. the cell leaves the QoE recovery state), until the expiration of a fixed duration timer, or some combination of the two. In an aspect, in the case that the pause period is a fixed value, and this period passes before the congestion is relieved, then this video stream is resumed and another video stream is selected to be paused. The pause timer value may be set dynamically, based upon the severity of cell congestion. The pause timer value may also be a function of a network policy and take into account a user's SLA and/or ARP settings. This action may be applicable to those video servers that support messaging from the client side to the server side in order to pause the video streaming. Examples of such video servers are: (1) Flash media servers in which the video client can send to the video server a NetStream.Pause.Notify message to cause the video server to stop sending video packets towards the video client until a NetStream.Resume.Notify message is sent to resume video streaming; (2) Video servers/clients that use RTSP for streaming can use the PAUSE/PLAY commands in messages from the video client to the video server to pause streaming from the video server and to resume the streaming; and (3) Wowza servers with the nDVR-addOn allows the video client to pause the video streaming on the video server side.

In an aspect, the above methods may be enhanced by optionally sending a notification to the subscriber's video client that there will be a certain delay due to network congestion. The notification can include the expected pause time, and the video client may present this to the user to inform about the expected stall time. This notification may also be used to temporarily prohibit the user of the affected video stream ("the affected user) from certain, bandwidth intensive actions for a period of time. For example, the notification may be used by an internet browser or smartphone app to prohibit the affected user from refreshing or retrying the affected video stream. Similarly, the notification may be used to prohibit the affected user from requesting a different video stream. In an aspect, one or more of the above mentioned load reduction (recovery) actions can be combined. For example, some video streams may be paused, while others may utilize influencing the video client to downgrade the bit rate. The selection of the proper action for each stream can be based on different factors in the video stream and/or on the severity of the radio resource congestion. When the congestion is severe, then a big reduction in load may be needed and therefore some video streams will be paused, sent to dormant state, or even terminated. When congestion is still low, or the QoE recovery state is applied as a proactive measure, minor load reduction may be used such as modification of bit rate for DASH streams.

In an aspect, load reduction action can be applied either on all selected video streams simultaneously, or distributed across time. By distribution, it is meant that the action is applied on a subset of video streams and the results are monitored, and if the load situation still requires further action then more video streams are acted upon.

In an aspect, the system proactively calculates the potential "load reduction effect" of a selected load reduction action on a specific set of video streams and thereby can use the calculated load reduction effect to determine the number of video streams necessary to act upon in order to restore acceptable user QoE for the supported video streams. Such a load effect calculation method is based on estimation of the amount of the radio resources saved by the particular QoE load reduction (recovery) actions on different video streams. The method compares the results of the load effect calculation with the shortage of radio resources that is causing this level of congestion. In an example of such a method:

a. The load is estimated based on the amount of data in the access node queues waiting to be transmitted and the growth of data in these queues and also on the modulation/coding scheme for the corresponding users. For example, the load for each stream/queue can be evaluated via measuring the incoming traffic in bytes (ingress bytes to the base station) for that stream/queue and normalizing it with the number of bytes per radio resource for the used modulation/coding for the corresponding user to get the load in radio resources. This is done over a sliding window of frames, and an average is taken. The window size should be selected to provide a good averaging to avoid meaningless time variation in incoming traffic. The total load is then the summation of individual streams/queues load. Accordingly, $$\text{Average load for a stream} = \frac{1}{\text{Sliding Window Size}} \cdot$$
$$\sum_{\text{throughout the window}} \frac{\text{Ingress Bytes for the stream in bytes}}{\text{Number of bytes per radio resources for this user}}$$
$$\text{Average total load} = \frac{1}{\text{Number of streams}} \sum_{\text{all streams}} \text{average stream load}$$

b. The congestion is the difference between the load and the current air link capacity, which is measured in the number of available radio resources.

c. The expected load reduction for every video stream (or a subset) is calculated by the contribution of this video stream to the load. For example, in the above equations, this load reduction may be calculated by the average load of the stream.

d. A necessary set of video streams to be acted upon is then determined by calculating the minimum number of video streams needed such that the sum of all of the video streams' individual load reduction is greater than the congestion, as defined above. The video streams may be evaluated and selected in an order based upon the utility function method above.

This method provides an estimate to the expected required action to be applied to exit the QoE Recovery state.

For example, consider a network with 8 video streams, A through H, and no background traffic. Each video stream has a playback rate of 1 Mbit/s. To maintain impairment-free playback, the network must support a transport rate of greater than or equal to the playback rate. It is assumed that the link capacity is composed of 100 radio resources (such as 'RB' radio blocks in LTE technology). Initially, and based on the modulation schemes used to transport the video streams, each radio resource can carry 100 Kbps, which means the load for each stream is 10 radio resources. This will add up to a total load of 80 radio resources, resulting in the air link being 80% loaded and with no quality of experience (QoE) degradation for all of the video streams.

In this example, it is next assumed that the channel conditions for 5 of these video streams (stream-A through stream-E) have worsened and therefore have started to use more robust modulation and coding schemes. Now, each of the 5 video streams requires 20 radio resources to transport its video traffic. This results in congestion because the total load now is raised to 130% of the air link capacity (5×20+ 3×10=130 radio resources). It is further assumed in this example that the QoE starts to fall significantly and therefore the system state enters the QoE recovery state when the loading reaches 110% of the link capacity. In this example, the base station can decide on the possible load reduction actions to implement on selected video streams in order to bring the load back into levels that will diminish the QoE degradation. In an aspect, such load reduction actions in this example could include: (1) temporarily disconnect (send to dormant) video streams A and H, saving 30 radio resources (20+10) resulting in a load of 100% of the link capacity; and (2) reduce the rate of video streams A and B by 50% while terminating video stream H, saving 20 radio resources (5+5+10) also resulting in a load of 110% of the link capacity. This example illustrates that knowledge of the link capacity and the current load, as well as the loading that caused the transition into the QoE recovery state, can assist in determining the load reduction actions necessary to recover the system.

After the load reduction (recovery) actions are applied to selected video streams, the operation moves to checking whether new video streams or requests for new video streams have been detected at the access node (base station) transmitted from one or more terminal nodes (UEs) in step 1913. If new video streams or requests for new video streams have been detected, then in step 1915 the QoE recovery state can utilize different methods for handling new video streams. In one aspect, an aggressive approach is used to reject all new video connection/stream requests while the system is in the QoE recovery state. In another aspect, the decision of "accepting" the new connection/stream requests is based on the channel conditions of the new connection/stream. In an aspect, it may be more efficient for the system to replace connections with bad channel conditions with new connections with better channel conditions. For treatment of video streams in the QoE recovery state, the term 'reject' relates to the access node decision and subsequent action to prevent a new video session from continuing operation via methods described above. Similarly, the term 'accepting' relates to the access node decision to transport packets from the new video stream subject to the procedures applied to existing video stream.

In another aspect, a delay is applied when a new connection/stream requests is detected. Deep congestion may last for a short period of time, after which the new connection/stream request could be accepted. In an aspect, a new connection/stream request may be delayed by discarding the request and making use of the timers and inherent retransmission in the upper protocol layers, such as TCP. This introduces a delay before the video client request is received by the video server or the response from the video server reaches the video client. In this method, the load is maintained for this delay period assuming that the deep congestion period passes before the retransmitted request is accepted. If this option is used and congestion is not relieved before the retransmission, then the base station may utilize one or more of the other load reduction recovery actions.

In another aspect, a utility function is evaluated for each incoming connection/stream request. The utility function is based on one or more factors such as channel conditions, current VQM value, user SLA, user ARP policy, and bearer GBR (or effective GBR for non-GBR bearers). The decision for acceptance of this new connection/stream will be based on a comparison of the value of this utility function and a threshold. An example of this utility function is:

$$\text{utility function} = \omega_{user} \cdot \omega_{bearer} \cdot \omega_{stream} \cdot \omega_{VQM}$$

where:
- $\omega_{user}$ is the weight for the user relying on its SLA (for example, it can be 1.0 for Gold users, 0.7 for Silver users, 0.5 for Bronze users)
- $\omega_{bearer}$ is the weight for the bearer which is calculated based on bearer QoS parameters such as the GBR and how much of this is currently in use (i.e. how much is the network commitment to this bearer fulfilled). For example this can be set to, $$\omega_{bearer} = 1 - \left(\frac{\text{served bit rate for this bearer}}{\text{Bearer } GBR}\right)$$

$\omega_{stream}$ is the weight for the video stream which is calculated based on the stream's expected bit rate. For example, $$\omega_{stream} = \begin{cases} 1.2 - (B/3 \text{ Mbps}) & B < 3 \text{ Mbps} \\ 0.2 & B \geq 3 \text{ Mbps} \end{cases}$$

$\omega_{VQM}$ is a weight reflecting the current level of system QoE. This parameter, for example, may be equal to the current average VQM value across all video streams.

It is noted that additional requests for video streams may be generated when the user reacts to a load reduction (recovery) action, such as application of a delay, a pause, a temporary disconnect (e.g., sending a stream to dormancy), a permanent disconnect, etc., by refreshing the connection at the terminal node (UE). The base station may monitor for and detect this type of additional video stream request and reject any such new related requests until the congestion level is improved and the QoE recovery state is exited. This can be achieved by monitoring the bearers on which a video stream has been acted upon, and which may carry a new request due to a user refresh. In an aspect, the new request is either discarded right away, or delayed for a period to await the exit of the QoE recovery state before forwarding the request to the video server.

After the check for and/or handling of requests for new video streams, a delay 1917 is applied to provide time for the load reduction actions and any accepted new video streams to impact the system before evaluating exit criteria for exit of the QoE recovery state in step 1919.

In an aspect, the criteria for exiting the QoE recovery state is based on a reversed entry condition for this state, with some applied hysteresis. That is, the exit criteria may be the same as the entrance criteria (one or more) but with a threshold set to a higher value than the entrance threshold for the QoE recovery state. In an aspect, the exit condition for the QoE recovery state may require a proofing period.

In step 1921, it is determined based on the evaluation of the exit criteria if QoE recovery state can be exited. If not, the process returns to step 1911 in which additional load reduction (recovery) actions can be applied. If it is determined in step 1921 that the QoE recovery state can be exited, then the process passes to step 1923 to check if there exist any dormant video streams (video streams previously placed into dormancy in step 1911). If there are dormant video stream, then the QoE recovery state is not exited until all dormant video streams are restored (as represented in steps 1923, 1925 and 1927). The restoration of dormant video streams results in the transmission of the cached packets (if any) and the resumption of radio resource allocation for those streams. In an aspect, step 1925 may limit restoration to a single video stream at a time. In another aspect, step 1925 may select a set of dormant video streams for restoration based on the estimated radio resources needed by each video stream and the current level of congestion.

After video stream restoration in step 1925 and an applied delay in step 1927, the exit criteria is re-evaluated (step 1919) to determine whether the system can handle the newly increased load and possibly more video stream restoration. In an aspect, the dormant video streams may be restored in the order they were taken off line or in an order which is a function of SLA/ARP policy associated with each video stream.

When all of the dormant streams are restored and the exit criteria from the QoE recovery state still holds ("NO" in step 1923), the system exits the QoE recovery state and reverts to the QoE degradation control state, whereby the process in FIG. 19 passes through delay 1929 and returns to the step of evaluating the entrance criteria for the QoE recovery state (1903) in order to monitor for the next trigger to enter the QoE recovery state.

The foregoing described aspects and features are susceptible to many variations. Additionally, for clarity and concision, many descriptions of the aspects and features have been simplified. For example, the figures generally illustrate one of each type of device (e.g., one access node, one terminal node), but a communication system may have many of each type of device. Similarly, many descriptions use terminology and structures of a specific standard such as HTTP, LTE, and the like. However, the disclosed aspects and features are more broadly applicable, including for example, other types of video transfer protocols and other types of communication systems.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein can be implemented or performed with a processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of any method or algorithm and the processes of any block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described as transmitting data to (or receiving from) a second device when there are intermediary devices that couple the first and second device and also when the first device is unaware of the ultimate destination of the data.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent particular aspects and embodiments of the invention and are therefore representative examples of the subject matter that is broadly contemplated by the present invention. It is further understood that the scope of the present invention fully encompasses other embodiments that are, or may become, obvious to those skilled in the art and that the scope of the present invention is accordingly not limited by the descriptions presented herein.

What is claimed is:

1. A method for degradation control management of a plurality of video streams associated with a plurality of user terminals in a communication network based at least in part on an overall video quality metric, the method comprising:
    determining a video quality metric for each of the plurality of video streams based on at least a set of video quality metric input parameters, and calculating an overall video quality metric based on the determined video quality metrics for the plurality of video streams;
    determining, with an objective function, at least one objective parameter based on at least the overall video quality metric, wherein the objective function determines the at least one objective parameter in a manner that maximizes a sum of the determined video quality metrics for all of the plurality of video streams;
    calculating a scheduling parameter for each of the plurality of video streams using a degradation control algorithm that is based on at least the determined video quality metric for the respective video stream and on the at least one objective parameter; and
    scheduling network resources for each of the plurality of video streams based on at least the scheduling parameter for the respective video stream.

2. The method of claim 1, wherein the objective function determines the at least one objective parameter in a manner that targets a maximum value of the overall video quality metric.

3. The method of claim 1, wherein the objective function determines the at least one objective parameter in a manner that targets a minimum variance among the determined video quality metrics for all of the plurality of video streams.

4. The method of claim 1, wherein the sum of the determined video quality metrics for all of the plurality of video streams is maximized by applying a weight factor to the determined video quality metric for each of the plurality of video streams.

5. A method for degradation control management of a plurality of video streams associated with a plurality of user terminals in a communication network based at least in part on an overall video quality metric, the method comprising:
    inspecting packets associated with each of a plurality of video streams to determine video stream characteristic information for each of the plurality of video streams; and
    calculating a set of video quality metric input parameters based on at least the video stream characteristic information;
    determining a video quality metric for each of the plurality of video streams based on at least a set of video quality metric input parameters, and calculating an overall video quality metric based on the determined video quality metrics for the plurality of video streams;
    determining, with an objective function, at least one objective parameter based on at least the overall video quality metric;
    calculating a scheduling parameter for each of the plurality of video streams using a degradation control algorithm that is based on at least the determined video quality metric for the respective video stream and on the at least one objective parameter; and
    scheduling network resources for each of the plurality of video streams based on at least the scheduling parameter for the respective video stream,
    wherein the determined video stream characteristic information includes the calculation of an estimated client-side buffer occupancy value for each of the plurality of video streams, and wherein the estimated client-side buffer occupancy value is utilized in the determination of the video quality metric for each of the plurality of video streams.

6. The method of claim 5, wherein the video quality metric input parameters are determined for each of the plurality of video streams based on at least the estimated client-side buffer occupancy value for each of the plurality of video streams.

7. The method of claim 6, wherein the determined video quality metric input parameters include at least one of a freezing instance data and a skipping instance data corresponding to each of the plurality of video streams.

8. The method of claim 1, wherein the video quality metric input parameters include at least one of a freezing instance data and a skipping instance data corresponding to each of the plurality of video streams.

9. The method of claim 1, wherein, in the step of determining video quality metrics for the plurality of video streams, one of multiple video quality metric algorithms is utilized, based on the set of video quality metric input parameters, to determine the video quality metric for each video stream.

10. The method of claim 1, wherein the step of determining the video quality metrics is conducted on a periodic basis, and the set of video quality metric input parameters is determined in a current time period.

11. The method of claim 1, wherein, in the step of calculating a scheduling parameter for each of the plurality of video streams, the degradation control algorithm further utilizes at least one of an estimated client-side buffer occupancy value, a served bit rate value, a required bit rate value, a channel quality indication value, or a guaranteed bit rate utilization value for the corresponding video stream.

12. The method of claim 1, wherein the at least one objective parameter determined by the objective function includes a delay duration value and an scheduling parameter adjustment percentage indicator, and wherein the step of calculating a scheduling parameter for each of the plurality of video streams is conducted periodically based on the delay duration value, and wherein the step of calculating a scheduling parameter for each of the plurality of video streams further includes the steps of:
calculating a video stream weight value for each of the plurality of video streams using the degradation control algorithm; and
determining the scheduling parameter for each video stream by applying the scheduling parameter adjustment percentage indicator to a previous value of the scheduling parameter for the video stream based on the respective video stream weight value.

13. The method of claim 1, further including the steps of:
detecting a request for a new video stream session from one of the plurality of user terminals; and
determining whether to accept the new video stream session based on whether the plurality of video streams associated with the plurality of user terminals can be maintained with the overall video quality metric above a threshold level.

14. The method of claim 13, wherein the step of determining whether to accept the new video stream session is further based on a current modulation and coding scheme being utilized on a communication channel over which the new video stream is requested.

15. The method of claim 13, wherein the step of determining whether to accept the new video stream session is further based on a score that is calculated for the new video stream using a utility function that is based on at least one of a channel condition indicator value, a service level agreement indicator value, a user admission and retention priority (ARP policy value, a bearer guaranteed bit rate value, or a current overall video metric value.

16. An access node for communicating with a plurality of user terminals in a communication network, the access node comprising:
a transceiver module configured to communicate with the plurality of user terminals; and
a processor coupled to the transceiver module and configured to:
determine a video quality metric for each of a plurality of video streams respectively associated with each of the plurality of user terminals, the determination of the video quality metric being based on at least a set of video quality metric input parameters, and calculating an overall video quality metric based on the determined video quality metrics for the plurality of video streams;
determine, with an objective function, at least one objective parameter based on at least the overall video quality metric in a manner that maximizes a sum of the determined video quality metrics for all of the plurality of video streams;
calculate a scheduling parameter for each of the plurality of video streams using a degradation control algorithm that is based on at least the determined video quality metric for the respective video stream and on the at least one objective parameter; and
schedule network resources for each of the plurality of video streams based on at least the scheduling parameter for the respective video stream.

17. The access node of claim 16, wherein the processor is further configured to determine, with the objective function, the at least one objective parameter in a manner that targets a maximum value of the overall video quality metric.

18. The access node of claim 16, wherein the processor is further configured to determine, with the objective function, the at least one objective parameter in a manner that targets a minimum variance among the determined video quality metrics for all of the plurality of video streams.

19. The access node of claim 16, wherein the processor is further configured to maximize the sum of the determined video quality metrics for all of the plurality of video streams by applying a weight factor to the determined video quality metric for each of the plurality of video streams.

20. The access node of claim 16, wherein the video quality metric input parameters include at least one of a freezing instance data and a skipping instance data corresponding to each of the plurality of video streams.

21. The access node of claim 16, wherein the processor is further configured to determine the video quality metric for each of the plurality of video streams by utilizing one of multiple video quality metric algorithms that is based on the set of video quality metric input parameters.

22. The access node of claim 16, wherein the processor is further configured to determine the video quality metrics on a periodic basis, and the set of video quality metric input parameters is determined in a current time period.

23. The access node of claim 16, wherein the processor is further configured to calculate a scheduling parameter for each of the plurality of video streams by the degradation control algorithm utilizing at least one of an estimated client-side buffer occupancy value, a served bit rate value, a required bit rate value, a channel quality indication value, or a guaranteed bit rate utilization value for the respective video stream.

24. The access node of claim 16, wherein the processor is further configured to determine the at least one objective parameter by the objective function includes utilizing a delay duration value and an scheduling parameter adjustment percentage indicator, and to calculate a scheduling parameter for each of the plurality of video streams periodically based on the delay duration value, and to calculate a scheduling parameter for each of the plurality of video streams by:
calculating a video stream weight value for each of the plurality of video streams using the degradation control algorithm; and
determining the scheduling parameter for each video stream by applying the scheduling parameter adjustment percentage indicator to a previous value of the scheduling parameter for the video stream based on the respective video stream weight value.

25. The access node of claim 16, wherein the processor is further configured to:
detect a request for a new video stream session from one of the plurality of user terminals; and
determine whether to accept the new video stream session based on whether the plurality of video streams associated with the plurality of user terminals can be maintained with the overall video quality metric above a threshold level.

26. The access node of claim 25, wherein the processor is further configured to determine whether to accept the new video stream is based on a current modulation and coding scheme being utilized on a communication channel over which the new video stream is requested.

27. The access node of claim 25, wherein the processor is further configured to determine whether to accept the new video stream based on a score that is calculated for the new video stream using a utility function that is based on at least one of a channel condition indicator value, a service level agreement indicator value, a user ARP policy value, a bearer guaranteed bit rate value, or a current overall video metric value.

28. An access node for communicating with a plurality of user terminals in a communication network, the access node comprising:
- a transceiver module configured to communicate with the plurality of user terminals; and
- a processor coupled to the transceiver module and configured to:
  - inspect packets associated with each of a plurality of video streams to determine video stream characteristic information for each of the plurality of video streams by calculating an estimated client-side buffer occupancy value for each of the plurality of video streams;
  - calculate a set of video quality metric input parameters based on at least the video stream characteristic information;
  - determine a video quality metric for each of the plurality of video streams respectively associated with each of the plurality of user terminals, the determination of the video quality metric being based on at least the set of video quality metric input parameters and utilizing the estimated client-side buffer occupancy value, and calculate an overall video quality metric based on the determined video quality metrics for the plurality of video streams;
  - determine, with an objective function, at least one objective parameter based on at least the overall video quality metric in a manner that maximizes a sum of the determined video quality metrics for all of the plurality of video streams;
  - calculate a scheduling parameter for each of the plurality of video streams using a degradation control algorithm that is based on at least the determined video quality metric for the respective video stream and on the at least one objective parameter; and
  - schedule network resources for each of the plurality of video streams based on at least the scheduling parameter for the respective video stream.

29. The access node of claim 28, wherein the processor is further configured to determine the video quality metric input parameters for each of the plurality of video streams based on at least the estimated client-side buffer occupancy value for the respective one of the plurality of video streams.

30. The access node of claim 29, wherein the determined video quality metric input parameters include at least one of a freezing instance data and a skipping instance data corresponding to each of the plurality of video streams.

* * * * *